United States Patent
Shin et al.

(10) Patent No.: US 8,504,035 B2
(45) Date of Patent: *Aug. 6, 2013

(54) SYSTEM AND METHOD FOR POPULATION TRACKING, COUNTING, AND MOVEMENT ESTIMATION USING MOBILE OPERATIONAL DATA AND/OR GEOGRAPHIC INFORMATION IN MOBILE NETWORK

(75) Inventors: Hyung Sik Shin, Palo Alto, CA (US); Motoharu Miyake, Sunnyvale, CA (US); Fujio Watanabe, Union City, CA (US)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/291,730

(22) Filed: Nov. 8, 2011

(65) Prior Publication Data

US 2012/0115476 A1    May 10, 2012

Related U.S. Application Data

(60) Provisional application No. 61/413,362, filed on Nov. 12, 2010, provisional application No. 61/415,781, filed on Nov. 19, 2010, provisional application No. 61/411,842, filed on Nov. 9, 2010.

(51) Int. Cl.
*H04W 24/00* (2009.01)
*G05D 1/02* (2006.01)
*G06F 15/16* (2006.01)

(52) U.S. Cl.
USPC ......... 455/435.1; 455/456; 701/300; 709/235

(58) Field of Classification Search
USPC ....... 701/300, 117; 340/928; 705/1; 455/456; 709/235
See application file for complete search history.

(56) References Cited

U.S. PATENT DOCUMENTS

| | | | |
|---|---|---|---|
| 5,523,950 | A | 6/1996 | Peterson |
| 6,236,933 | B1 | 5/2001 | Lang |
| 6,842,620 | B2 | 1/2005 | Smith et al. |
| 6,879,907 | B2 | 4/2005 | Feldman et al. |
| 6,965,827 | B1 | 11/2005 | Wolfson |
| 7,426,437 | B2 * | 9/2008 | Breed et al. ............... 701/301 |
| 7,493,208 | B1 * | 2/2009 | Craine ...................... 701/117 |
| 7,546,128 | B2 | 6/2009 | Smith et al. |
| 7,565,155 | B2 | 7/2009 | Sheha et al. |
| 7,756,534 | B2 | 7/2010 | Anupam et al. |

(Continued)

OTHER PUBLICATIONS

Schlaich, J. et al., "Generating Trajectories from Mobile Phone Data," TRB 89th Annual Meeting, Transportation Research Board of the National Academies, Washington, D.C., 2010, 18 pages.

(Continued)

*Primary Examiner* — Nizar Sivji
(74) *Attorney, Agent, or Firm* — Blakely, Sokoloff, Taylor & Zafman LLP

(57) ABSTRACT

Methods and apparatuses are disclosed herein for population tracking, counting and/or movement estimation. In one embodiment, the method comprises receiving mobile phone operational data indicative of user equipment location, where the event data includes location area update messages and periodic registration messages; and performing travel estimation based on the mobile phone operation data, including performing interpolation on data associated with one or more individuals in a population to estimate intermediate positions of a trajectory of each of the one or more individuals for a specified time period based on a shortest path mesh sequence estimation algorithm.

20 Claims, 45 Drawing Sheets

U.S. PATENT DOCUMENTS

| | | | | |
|---|---|---|---|---|
| 2002/0027512 | A1* | 3/2002 | Horita et al. | 340/988 |
| 2002/0194016 | A1* | 12/2002 | Moribe et al. | 705/1 |
| 2004/0119609 | A1* | 6/2004 | Solomon | 340/928 |
| 2006/0031566 | A1* | 2/2006 | Ohnishi et al. | 709/235 |
| 2006/0173841 | A1 | 8/2006 | Bill | |
| 2006/0235833 | A1 | 10/2006 | Smith et al. | |
| 2006/0293046 | A1 | 12/2006 | Smith | |
| 2008/0081641 | A1 | 4/2008 | Smith et al. | |
| 2009/0070024 | A1* | 3/2009 | Burchard et al. | 701/117 |
| 2009/0312032 | A1* | 12/2009 | Bornstein et al. | 455/456.1 |
| 2012/0115475 | A1 | 5/2012 | Miyake et al. | |
| 2012/0115505 | A1 | 5/2012 | Miyake et al. | |

OTHER PUBLICATIONS

Friedrich, M. et al., "Generating OD Matrices from Mobile Phone Trajectories," TRB 89th Annual Meeting, Transport Research Board of the National Academies, Washington, D.C., 2010.

S. Uppoor, S., et al., "Scalable Routing Technique Using Road Hierarchy for Vehicular Networks," In Proc. Int. Conf. on Intelligent Transport Systems Telecommunications, pp. 403-407, 2009.

G. Szucs and G. Sallai, "Route Planning with Uncertain Information using Dempster-Shafer theory," in Proc. IEEE Int. Conf. on Management and Service Science, 2009, pp. 1-4.

Wang, Qianyu et al., "Research and Realization of the Optimal Path Algorithm with Complex Traffic Regulations in GIS," in Proc. IEEE Int. Conf. on Automation and Logistics, 2007, pp. 516-520.

Shimizu, H. et al., "An Analysis of Mean Link Travel Time in Urban Road Networks and Its Applications," in Proc. SICE, 2007, pp. 1438-1443.

Gangwu, Jiang et al., "The Shortest Path Algorithm Based on Hierarchical Road Network," in Proc. Int. Conf. on ITS Telecommunications, 2006, pp. 156-158.

A. W. Zhimin and B. L. Xianfeng, "The Model and Algorithm for Finding the Optimal Route in a Dynamic Road Network," in Proc. IEEE Conf. on Intelligent Transportation Systems, vol. 2, 2003, pp. 1495-1498.

* cited by examiner

SYSTEM AND METHOD FOR POPULATION TRACKING, COUNTING, AND MOVEMENT ESTIMATION USING MOBILE OPERATIONAL DATA AND/OR GEOGRAPHIC INFORMATION IN MOBILE NETWORK

PRIORITY

The present patent application claims priority to and incorporates by reference the corresponding provisional patent application Ser. No. 61/413,362, titled, "System and Method for Population Movement Estimation and Counting Using Mobile Network Operational Data" filed on Nov. 12, 2010; provisional patent application Ser. No. 61/415,781, titled "Methods for Dynamic Travel Behavior Estimation Using Geographic Information in Mobile Network" filed Nov. 19, 2010; and provisional patent application Ser. No. 61/411,842, titled, "System and Method for Population Tracking and Counting Using Mobile Operational Data" filed Nov. 9, 2010.

FIELD OF THE INVENTION

The present invention relates to the field of population movement estimation, tracking and counting using operational data of a mobile network operator, geographic information and/or transport network information such as geographic map information and traffic information using data generated in mobile network.

BACKGROUND OF THE INVENTION

In order to obtain a social support ecosystem, mobile spatial statistics is an emerging research field focused on tracking a user's mobility using data from cellular phones.

Today, cellular phones are carried and used by almost everyone. Even while they are not actively used, cellular phones transmit certain periodic event data to their associated base stations (BSs) as its registration, location area update, and keep alive messages. These messages are captured at the base station and provide sector-level location information for the users at a given time. The mobile network operators, upon collecting such event data from all their subscribers, may analyze these data and extract useful information. Such information may be helpful for improving urban planning, traffic planning, and disaster prevention. Another example use of the mobile-phone event data, along with some other accompanying information (e.g., gender, age etc. of the subscribers), is to obtain important information such as age/gender/demographic characteristics/address distributions within a given geographical area and time interval, which are normally gathered through the time-consuming census process periodically performed by governments.

Several objectives can be achieved using the operational data of the subscribers to realize the above-mentioned applications: 1) obtaining the geographical distribution of subscribers at a given time instant (hourly, daily, weekly, monthly, etc.), and 2) obtaining the flow of people between different geographical areas. For the first objective, the goal is to obtain the population in a municipality (or mesh, hexagonal sector, etc.) at a given time of the day, while the goal for the second objective is to determine the number of people flowing into a municipal/mesh/sector, their stay times, and their movement distance.

Accurately achieving these objectives using the mobile-phone operational data is a challenging task due to the limited information available in the event data. The event data transmitted by the mobile phones only provide a sector-level location information, where the sector size may range from few hundreds of meters to few kilometers. This is different than a GPS signal, and does not provide the most accurate of location information even if the mobile-phone sends hundreds of event data. Accurate mapping of a subscriber's location within a given sector requires non-trivial signal processing techniques that, for example, involve the use of geographical information systems (GIS) data, some user's trajectory source/destination position, and estimated trajectory. A second important challenge is that the event data is collected with low frequency.

The periodic messages (e.g., periodic location update) are transmitted by the user equipments (UEs) on time intervals that will be on the order of an hour, and the exact frequency of periodic messages can be customized. While a longer time interval between two periodic messages provides lower messaging overhead and less battery consumption at the UE, it also limits the tracking accuracy of the users.

If a UE is mobile and crosses the boundary of a location area (LA) which is composed of several sectors, the UE transmits another operational message referred to as a location update (LAU) message to its associated BS which will be located at the next location area.

A third example for the event data transmitted by the UE are power-on and power-off messages for the UEs. Compared to the periodic message and LAU messages, these are less frequently transmitted, but provide sector-level location information for a UE in a way similar to the periodic message and the LAU message. The other examples for the operational messages transmitted by the UE are phone call/receive and SMS message sent/receive.

Since the use of mobile spatial statistics to obtain population counting/tracking is a relatively new research area, there are only limited number of related works available in the literature. Many of the available prior art references that are related to mobile spatial statistics are about traffic monitoring systems. Such prior art references identify the traffic jams and congestion in an on-line manner using the operational data of the UE in a cellular system. These operational data is then shared among the users who would like to optimize their travel time with the knowledge of the traffic jam information. In order to estimate the traffic jams, the prior art accurately estimates the velocities of the mobile users, sometimes with the help of GIS data. However, the goal in these prior art references is not to track individual users' trajectories, but to detect traffic congestions.

Other prior art references disclose generating trajectories from mobile phone data have been discussed. In particular, one prior art reference discloses a general framework for estimating the trajectories from mobile phone's operational data. As disclosed, given the GIS data and the location area code (LAC) sequences of the users, the Needleman-Wunsch algorithm is applied to determine the best GIS sequence corresponding to the trajectory samples. The basic goal is to compare a given estimated LAC trajectory sequence with various possible GIS sequences, and find the best sequence match. Moreover, a concept of geographical mesh is not used, and the algorithm tries to find trajectories between different LACs. Another prior art reference discloses generating origin-destination matrices from mobile phone's trajectories.

Other prior art references disclose methods of estimating the shortest-path trajectory between an origin and a destination. Possible shortest path algorithms considered in these prior arts are the Dijkstra's algorithm, the A* algorithm, and the Dempster-Shafer method. However, typical applications of these methods are online shortest-path route estimation and recommendation to the user for choosing the best path, e.g., for car navigation. No notion of a geographical mesh is disclosed. Moreover, the available location data samples in these references are typically obtained from GPS devices rather than mobile-phone's operational data. The GPS information provides accurate location information. On the other hand, not all the UEs are equipped with GPS devices. Even if GPS is embedded in the UE, not all users allow the GPS information to be used by the operator. Therefore, the usage of GPS information requires additional complexities such as protecting user's privacy to transfer the location data from the UEs to the BSs (e.g., network) as opposed to the already existing operational data of the UE. This is because the operational data generated by the UE is inevitable information required to establish communications between the UE and the network. How to apply the shortest path algorithms with the limitations of the UE's operational data in consideration is not a trivial task.

SUMMARY OF THE INVENTION

Methods and apparatuses are disclosed herein for population tracking, counting and/or movement estimation. In one embodiment, the method comprises receiving mobile phone operational data indicative of user equipment location, where the event data includes location area update messages and periodic registration messages; and performing travel estimation based on the mobile phone operation data, including performing interpolation on data associated with one or more individuals in a population to estimate intermediate positions of a trajectory of each of the one or more individuals for a specified time period based on a shortest path mesh sequence estimation algorithm.

In another embodiment, the method comprises receiving mobile phone operational data indicative of user equipment location, where the mobile phone operational data includes location area update messages and periodic registration messages; filtering the mobile phone operational data based on time and area to select a portion of user equipment location information to produce filtered mobile phone operation data; performing travel estimation based on the filtered mobile phone operation data, including performing interpolation on data associated with one or more individuals in a population to estimate intermediate positions of a trajectory of each of the one or more individuals for a specified time period using a shortest path estimation algorithm that determines a shortest path between pairs of points based on weights; and counting a number of individuals in population at a given time and at a given area.

In yet another embodiment, the method comprises receiving mobile phone operational data indicative of user equipment location, where the mobile phone operational data includes location area update messages and periodic registration messages; filtering the mobile phone operational data based on time and area to select a portion of user equipment location information to produce filtered mobile phone operation data; performing travel estimation based on the filtered mobile phone operation data, including performing interpolation on data associated with one or more individuals in a population to estimate intermediate positions of a trajectory of each of the one or more individuals for a specified time period using a shortest path estimation algorithm that determines a shortest path between pairs of points based on geographic information associated with the user terminals, weights associated with geographic areas, and probabilities associated with likelihoods of a user terminal moving between geographic areas; and counting a number of individuals in population at a given time and at a given area.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
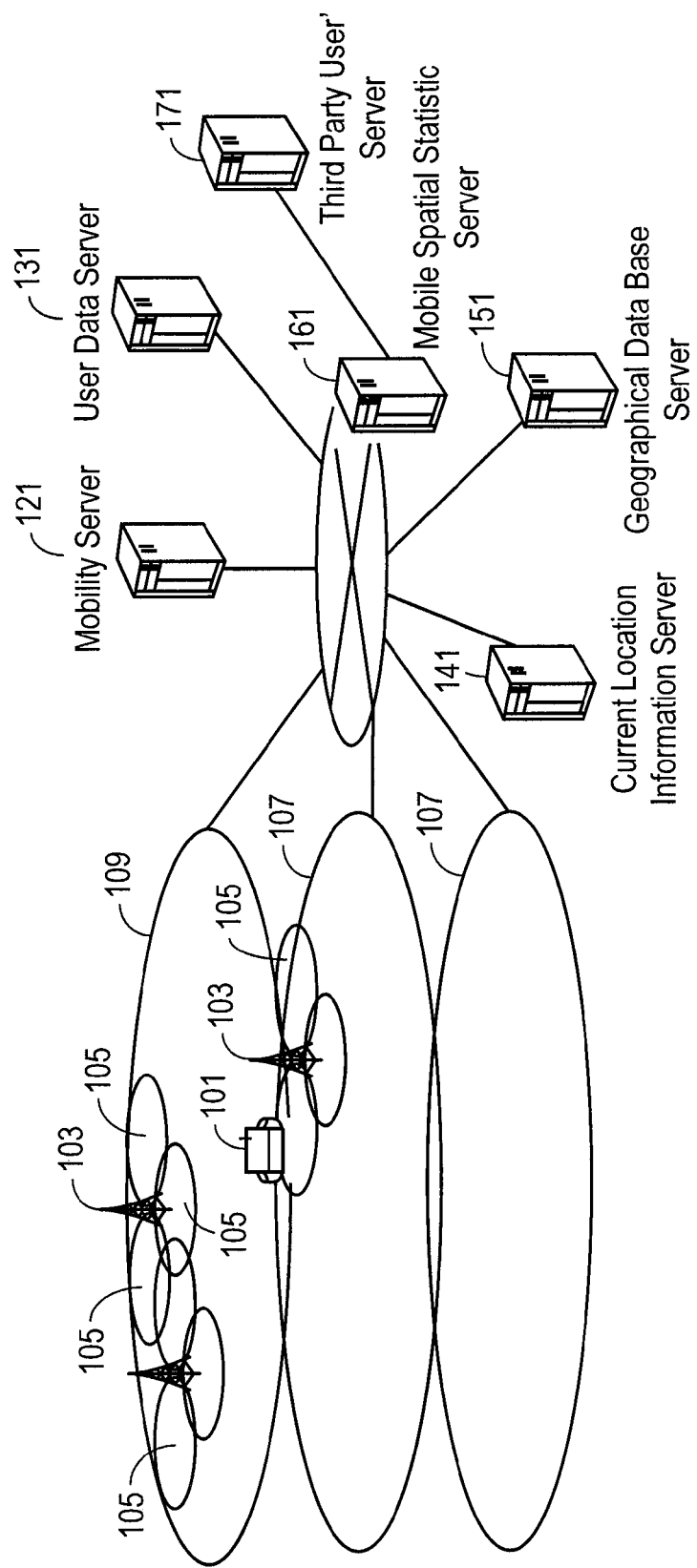
FIG. 1 is a diagram of overview and architecture of mobile travel behavior analysis according to one embodiment.

Methods and apparatuses are disclosed herein for implementing the mobile travel behavior analysis. One goal of embodiments of the present invention is, using the event data and personal attributes as described above, obtaining reliable and accurate location estimates of the UE with a high resolution (e.g., at every minute within a given day). Using UE's location estimates, the inflow and outflow of population between different geographical areas within a given time interval will be estimated.

In one embodiment, the mobile travel behavior analysis system comprises several servers that store different information. In addition, in one embodiment, the mobile travel behaviour analysis system uses event data generated by user equipment (UE) over communication system. In another embodiment, the system also uses other data such as, for example, personal attribute information as well as geographic information & transport network information in order to increase accuracy of determining a UE's location and its trajectory.

In one embodiment, a location update message and a periodic location update message are event data that are used. The location update message is generated by the UE whenever the UE acrosses any location area boundary, and the UE transmits its periodic location update message periodically. In addition, other event data is transmitted when a user turns on/off the UE and the UE needs to authenticate and associate to the base station (BS) or the access point (AP). Since the BS or the AP is connected to network via wired-line or wireless, the event data is stored at a mobility server in the network.

In one embodiment, the mobile travel behavior system combines and analyzes a set of data stored at different servers such as a mobility server, a subscriber data server, and a geographical data base server. After analyzing data using the UE's trajectory estimation, geographic distribution of UEs at a given time instant is determined.

In one embodiment, the mobile travel behavior analysis includes of several operations to identify the UE's trajectory and obtain the accurate population count. First, in order to extract geographic distribution of UE, the mobile travel behaviour system obtains appropriate data including event data from different servers and pre-processes event data. The pre-processed data is then filtered based on one or more different attributes. Thereafter, one or more interpolation algorithms are applied to the filtered information together with geographic information & transport network information located in the geographic data base server to obtain geographic distribution of UEs and to estimate UE's movement trajectory. In one embodiment, the geographic distribution of UEs in the time domain is compared and then the inflow and outflow of population between different geographical areas are obtained.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Techniques for dynamic population migration estimation and counting in mobile network are described. It is to be understood that the following example(s) is (are) for the purpose of explanation and not limitation.

FIG. 1 illustrates an overview of mobile network arrangement for mobile travel behavior analysis. In one embodiment, the mobile travel behavior analysis consists of several servers which store different information. In addition, the mobile travel behavior analysis system uses event data generated by user equipment (UE) over communication system, but it also can use any other data such as personal attributes as well as geographic information & transport network information as complement in order to increase accuracy of UE's location and its trajectory.

In order to achieve accurate estimation, in one embodiment, the mobile travel behavior analysis is performed by mobile travel behavior server and collaborates with mobile servers, subscriber data servers, and geographical data base servers. The geographical data base server stores geographic information as well as the transport network information such as, for example, geographic map information and traffic information.

In one embodiment, event data comprise the location update messages and periodic registration messages. A location update message is generated by the UE whenever the UE acrosses any location area boundary, and the UE transmits its periodic registration message periodically with a certain frequency. In addition, other event data is transmitted when a user turns on/off the UE and the UE needs to authenticate and associate to the base station (BS) or the access point (AP). Since the BS or the AP is connected to network via wired line or wireless, the event data is stored at a mobility server in the network.

In one embodiment, the mobile travel behavior server combines and analyzes a set of data stored at different servers such as, for example, the mobility server, the subscriber data server, and geographical data base server. After analyzing data with the techniques disclosed herein, including the UE's trajectory estimation, a geographic distribution of UEs at a given time instant is produced.

In one embodiment, the mobile travel behavior analysis uses an algorithm to identify the UE's trajectory. This trajectory estimation algorithm identifies the UEs location (e.g., as sector center, sector edge, etc.) using event data. The sector center is selected when the event data is a periodic message, and the sector edge is selected when the event data is a location updated message. In one embodiment, the algorithm estimates the mobile user travel trajectories using the shortest-path algorithm between the source and the destination location based on geographic information as well as transport network information (e.g., geographic map information and traffic information). For more efficient processing, an oval or rectangle around the search area which covers the source and destination locations may be used. Details will be explained in more detail below.

Other embodiments for population tracking using mobile phone operational data are also disclosed. In these embodiments, the location information from mobile phone is obtained by use of two basic operational messages that provide sector-level location information for any UE at a given time: a periodic registration message (PRM), and a location area update (LAU) message. The former message is transmitted with periodic intervals (e.g., every hour), while the latter message is transmitted whenever a mobile crosses a location area boundary. In one embodiment, given the sequence of samples corresponding to each user, their trajectory is estimated using a velocity-based classifier; for high-velocity users, a shortest-path algorithm is applied, while for low-velocity users, linear path estimation is considered. In one embodiment, the shortest path algorithm requires estimation of mesh-weights, which disclosed herein. Moreover, methods for accurately mapping the location of a mobile node to a mesh within a sector are also described.

The proposed techniques will be explained in more detail further below with reference to drawings and diagrams.

Referring to FIG. 1, user equipment (UE) 101 includes communication functionality to enable wirelessly communicating with the wireless base station called "base station (BS)" or "access point (AP)" 103. AP 103 is mainly used for the wireless LAN access point connecting to the Internet. In this embodiment, the term "BS" will be used below to indicate a network connection point. UE 101 may have different communication functionality, and is not limited to wireless communication capabilities such as 2G (2nd generation) cellular system, 3G (3rd generation) cellular system, wireless LAN (e.g., WiFi) and Bluetooth. UE 101 may also have wired communication functionality such as, for example, Ethernet. Examples of the UE include, but are not limited to, a mobile phone, a smart phone, and smart tablet commuters with communication capabilities. Although the following example will describe this method and apparatus using one UE, it may be used for multiple UEs.

BS 103 may have multiple communication functionality to support different systems. In one embodiment, BS 103 has few sectors 105 in order to increase spectra efficiency. In FIG. 1, three sectors are illustrated per one BS. Each sector at the BS covers a small geographical area which is part of a uniquely identified location area. In one embodiment, Location Areas (LAs) 107 and 109 comprise several BSs 103 including sectors 105, alternatively, an LA may include only one BS and include only one sector. By integrating the coverage of each of these sectors, a cellular network provides a radio coverage over a much wider area. A group of sectors 105 is named location area 107 (or 109).

While UE 101 is communicating with BS 103, UE 101 generates event data 201. Event data 201 generated by UE 101 is used to estimate dynamic population (e.g., user, UE) migration and population counts in terms of inflow and outflow by the mobile travel behavior server 161. In one embodiment, event data 201 is formed from a subset of control data 211 and user data 221 shown in FIG. 2.

Figure 2:
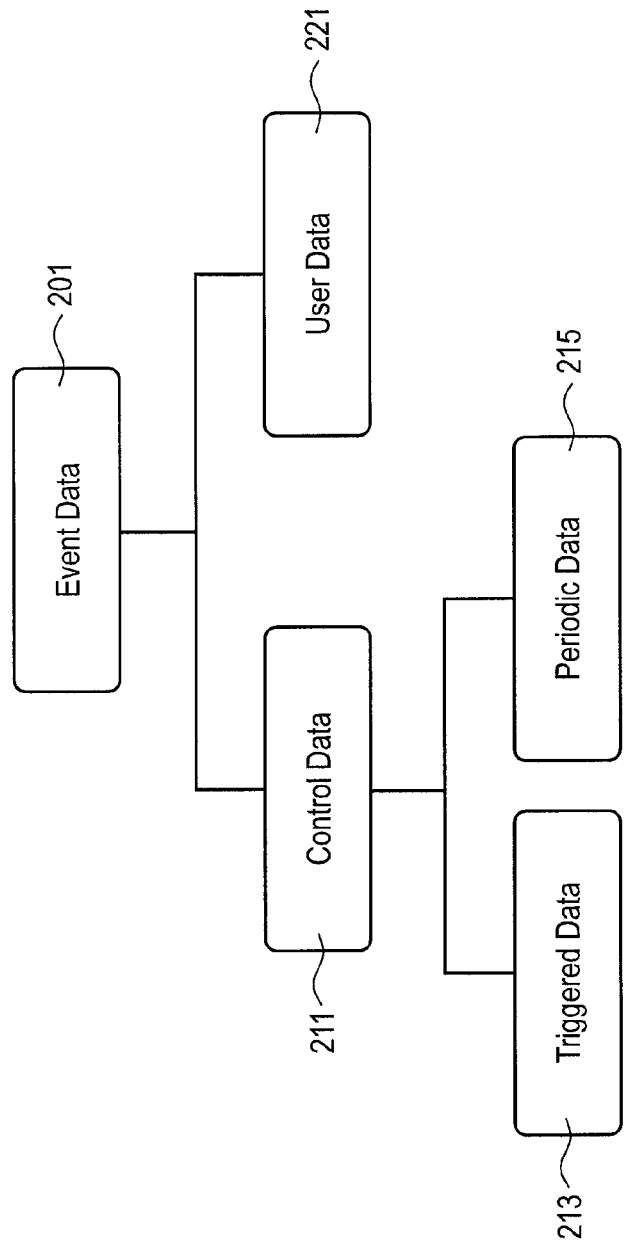
FIG. 2 is a diagram of event data structure according to one embodiment.

Referring to FIG. 2, control data 211 is categorized into two different data referred to as triggered data 213 and periodic data 215. Triggered data 213 is transmitted by UE 101 whenever UE 101 has a special event that has occurred such as crossing a location area (LA) boundary, power on and power off and so forth. Periodic data 215 is defined to be transmitted periodically. An example of periodic data is a periodic registration message or a periodic location update message that are transmitted by UE 101 at certain time intervals. An exact frequency of the periodic message transmissions can be customized and/or modified over time. In one embodiment, related private data such as data communication and voice communication is defined as user data 221.

One embodiment of the location update procedure that generates event data allows UE 101 to provide current location area information to the cellular network whenever UE 101 moves from one location area, e.g., LA 107 in FIG. 1, to another location, e.g., LA 109 in FIG. 1. In one embodiment, UE 101 is responsible for detecting the location area code (LAC) and sector ID, and the combination of LAC and sector ID is a unique identification called "Service Area Identification (SAI)". When UE 101 finds that the location area code (LAC) is different from its last updated LAC, UE 101 transmits another location update message containing a new location area code (LAC) to the network server. This event data (location update) includes the currently overlaid SAI. In this example, the network server is a mobility server 121. As an example, mobility server 121 may perform functions similar to a MSC VLR (mobile switching center visiting location register) in a GSM network.

In the example of a mobile travel behavior analysis architecture shown in FIG. 1, there are several servers. As described above, mobility server 121 includes functionality to collect event data 201 generated by UE 101 and track the location of UE 101 based on event data 201. The location estimation of UE 101 based on event data 201 is explained below. In one embodiment, event data 201 includes not only information generated by UE 101 in the cellular system, but also information generated by UE 101 in the wireless LAN and any other systems even when the single UE 101 has multiple communication capabilities.

Subscriber user data server 131 has an interface to receive and a memory to store subscriber's information referred to herein as "personal attribute information" of UEs such as, for example, but not limited to, gender, address, age and so on. Because of privacy information of the subscriber, in one embodiment, subscriber data server 131 is highly protected from malicious access. Geographical data base server 151 has an interface to receive and a memory to store geographic information as well as the transport network information such as, for example, geographic map information and traffic information including the train timetable and traffic information such as, for example, construction work, road blocked, traffic regulation status information, toll gate information, disaster information, and reroute information. Mobile travel behavior server 161 includes a memory and processor to implement a set of tools that captures, stores, analyzes, manages, and presents data that are linked to information stored at mobility server 121, subscriber data server 131 and geographical data base server 151. Information stored and analyzed at mobile traffic behavior server 161 is accessible by third party user's server 171.

One goal of techniques described herein is to obtain the geographical distribution of users at a given time instant (e.g., hourly, daily, weekly, monthly, etc.) and to estimate the inflow and outflow of population migration between different geographical areas. In order to achieve this goal, the event data generated by UE 101 is used. These data will be temporary or permanently stored in mobility server 121. While a longer time interval between two event data provides lower message overhead and less battery consumption at the UE, the received event data does not explicitly indicate UE's location. Since most of event data will not include GPS (global positioning system) information unless it is specifically included, it is difficult to estimate the exact location of UE based on the event data. This is because the location of the UE is provided only in the sector level. Therefore, the BS receiving the event data implicitly indicates a current location of the UE.

In one embodiment, the frequency of event data transmission depends on the tracking accuracy of the subscriber's location, although the exact UE location cannot be determined from the event data. For example, a location area update (LAU) is one of the event data generated by the UE. If UE 101 is mobile and crosses the boundary of a location area composed of a single or several BSs including sectors, UE 101 transmits the LAU as the event data to the network via the nearest BS when UE 101 identifies a different location area. In FIG. 1, as an example, UE 101 moves from one location area 107 to another location area 109. Once UE 101 detects the different location area 109 from the previous location area 107, UE 101 transmits the LAU to the nearest BS 103. In spite of transmitting hundreds of event data from UE 101, the event data received at the sector does not indicate an exact location of UE 101. The location of UE based on the event data can be estimated at the sector level if the sector is implemented in the BS. In FIG. 1, BS 103 has three sectors 105.

A method and apparatus for estimating travel behavior in a mobile network are disclosed. In one embodiment, estimating travel behavior includes receiving event data indicative of user equipment location. After receipt, the event data is pre-processed to produce pre-processed data. In one embodiment, the pre-processing of received event data produces pre-processed data by converting SAI data to latitude and longitude values and estimating a location of an individual's user equipment based on the latitude and longitude values. In one embodiment, the latitude and longitude values correspond to one selected from a group consisting of: sector center, sector edge, mesh center, and multiple points within a sector. After pre-processing, the pre-processed data is filtered to select a portion of user equipment location information in the pre-processed data. In one embodiment, the filtering of the pre-processed data to select a portion of user equipment location information in the pre-processed data is based on one or more selected from a group consisting of: time and area, a day of the week, and one or more personal attributes. Next, straight line interpolation is performed on the filtered, pre-processed event data of one or more individuals in the population to estimate intermediate positions of a trajectory of each of the one or more individuals from a first position to a second position. In one embodiment, the straight line interpolation is based on a straight line between event data. In one embodiment, the straight line is between sector centers. Thereafter, a number of individuals in population at a given time and at a given area is counted. In one embodiment, counting a number of individuals in population is performed per one or both of sector and mesh.

Figure 3:
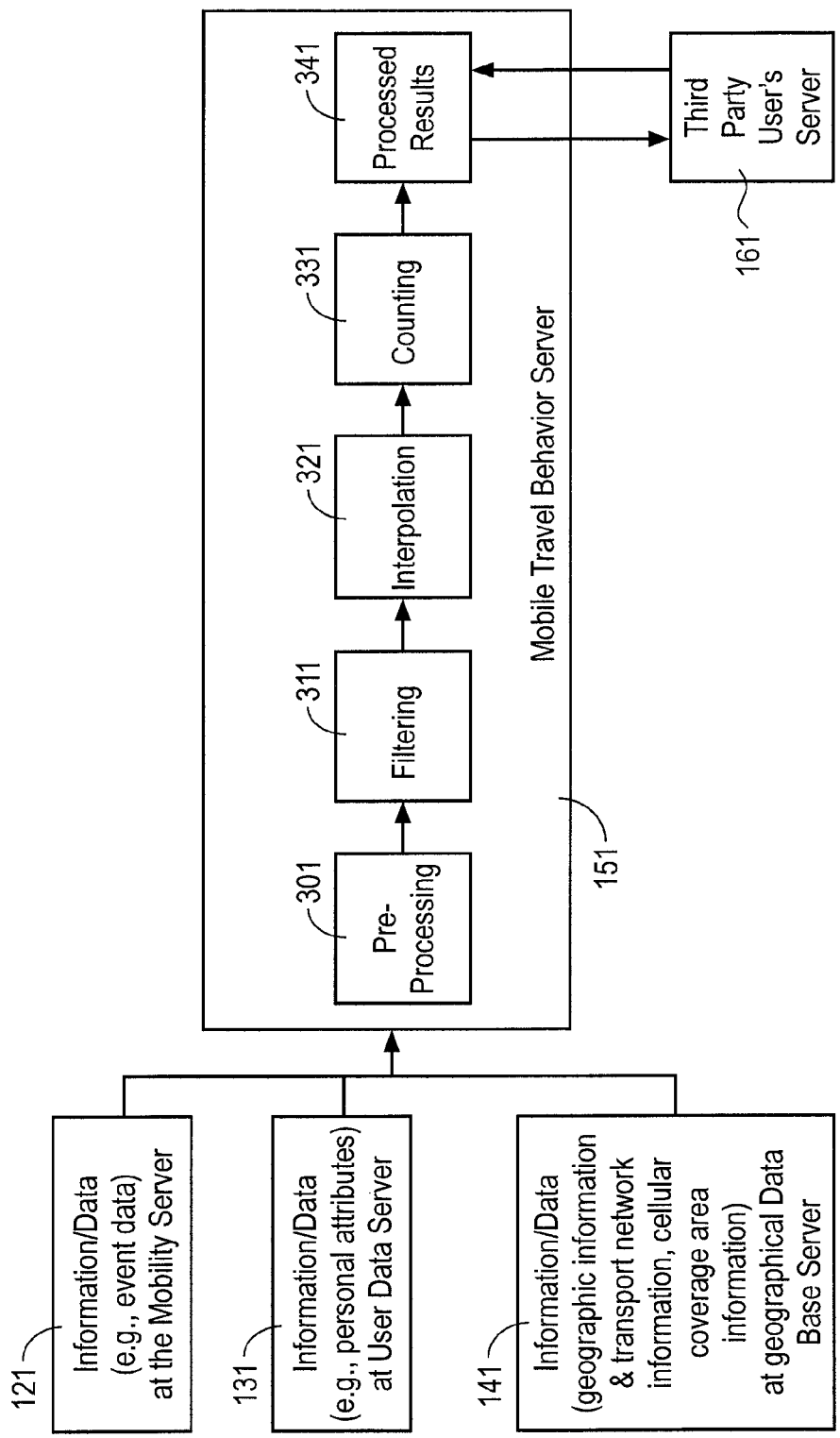
FIG. 3 is a data flow diagram illustrating user's trajectory estimation and dynamic population migration counting processes performed at the mobile travel behavior server according to one embodiment.

FIG. 3 is a data flow diagram illustrating user's trajectory estimation and dynamic population migration counting processes at the mobile travel behavior server according to one embodiment. In one embodiment, the processes are performed by processing logic that may comprise hardware (circuitry, dedicated logic, etc.), software (such as is run on a general purpose computer system or a dedicated machine), or a combination of both. In one embodiment, the processing logic is part of mobile travel behavior server 161.

Referring to FIG. 3, the processing begins with the mobile behavior server 161 gathering information/data from mobility server 121, user data server 131 and geographical data base server 151. In addition to the above servers, mobile travel behavior server 161 may need to obtain other information/data from other servers.

Using the gathered data, the mobile travel behavior server 161 performs mobile travel behavior analysis by pre-processing information/data obtained from different servers (processing block 301), filtering pre-processed information/data (processing block 311), interpolating user's trajectory from the source (starting) position to the destination (processing block 321), and counting the number of individuals in population at a given time and at a given area (processing block 331). Although the following example describes this method and apparatus using one mobile travel behavior server 161, it may be implemented using multiple mobile travel behavior servers.

The operation of gathering information/data from servers generally involves: (a) establishing a protocol for communicating among servers; (b) establishing a protocol for manipulating servers; and (c) selecting necessary information/data for pre-processing input.

In one embodiment, event data 201 is stored at mobility server 121, and personal attribute data are stored in user data server 131. Geographic information & transport network information as well as the cellular coverage information such as, for example, the BS location information and number of sectors per BS, are stored in geographical data base server 151. In one embodiment, the event data contains one or more of a user identification (e.g., UID), time-stamp and update message type information (e.g., periodic registration message (PRM) and location area update message (LAU)). In one embodiment, one or more of the personal attribute data such as, but not limited to, age, gender, demographic characteristics, and/or address are also used in making full statistical analysis. For example, the statistical analysis may wish to be limited to the population movement of all females within the ages of 25-44. The cellular coverage information is used in the pre-processing operation (e.g., processing block 301 described below), and the geographic information & transport network information is used at the user's trajectory interpolation operation (e.g., processing block 321 described below).

Figure 4:
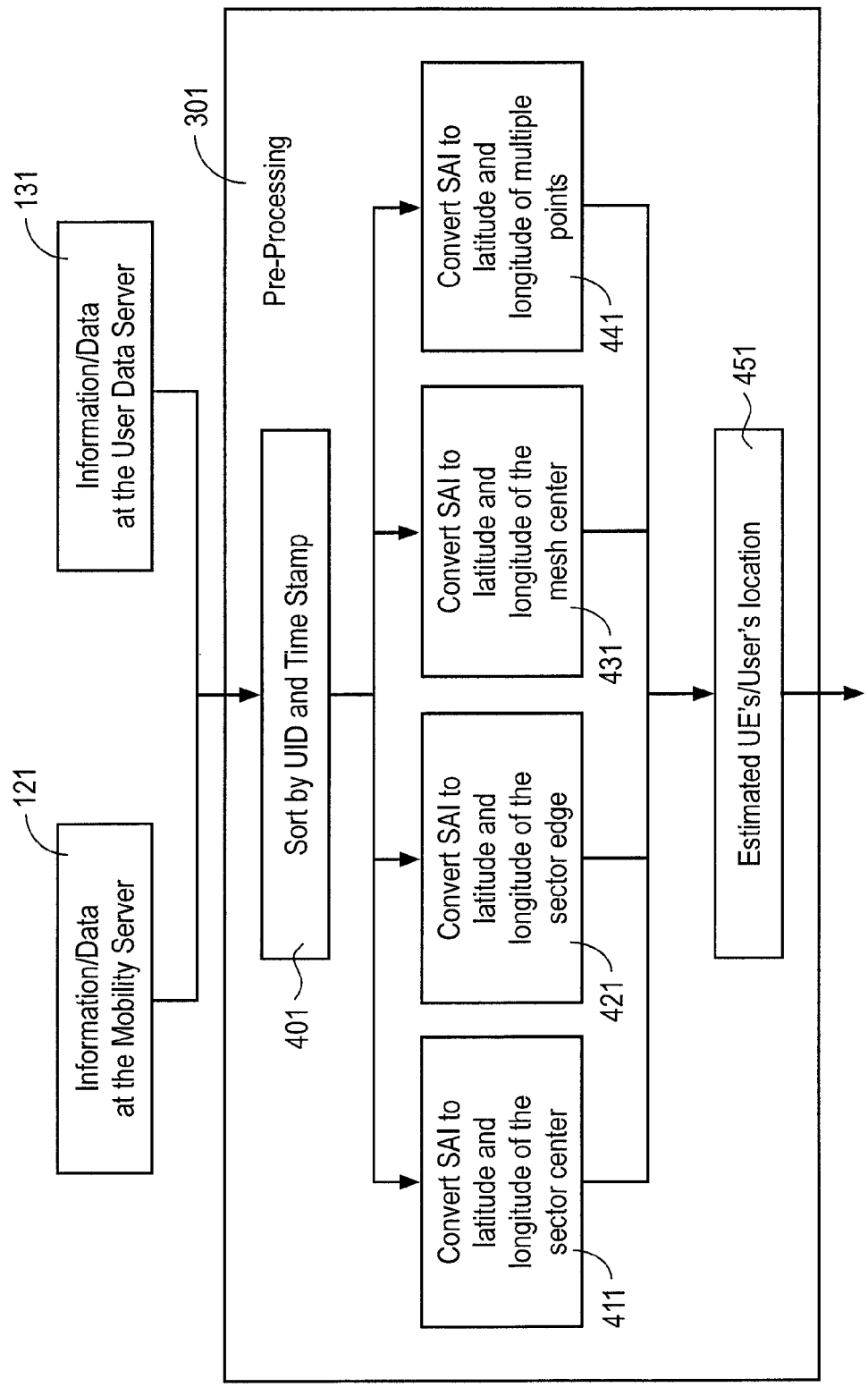
FIG. 4 is a data flow diagram illustrating a pre-processing process to identify UE'/user's locations according to one embodiment.

FIG. 4 is a data flow diagram of one embodiment of a pre-processing process performed at mobile travel behaviour server 161. The process is performed by processing logic that may comprise hardware (circuitry, dedicated logic, etc.), software (such as is run on a general purpose computer system or a dedicated machine), or a combination of both.

Referring to FIG. 4, the process begins with information from mobility server 121 and/or user data server 131 and generally involves: (a) sorting event data based on system information and time (using e.g., UID and time stamp information) (processing block 401); (b) at least one of converting service area identity (SAI) information into the latitude and the longitude information of the sector center (processing block 411), the sector edge (processing block 421), the mesh center (optional)(processing block 431), or multiple points (not limited to sector/mesh centers/edges, optional) (processing block 441); and estimating locations of UEs/users based on the converted SAI information (processing block 451). The SAI is used to identify an area consisting of one or more cells or sectors belonging to the same location area. Such an area is referred to herein as a service area and can be used for indicating the location of the UE to the core network. Note that multiple points (processing block 441) refers to multiple paths at one time. This could be one starting point (source) to multiple destinations, or vice versa or multiple starting points to multiple destinations. In such cases, probabilities are assigned to each path (or sub-path) to select the most likely trajectory.

Since a total number of event data generated by the UEs in the cellular system is extremely large, event data 201 may be stored in many different mobility servers 121. In such a case, the mobility server consists of one or more servers. In order to access these event data easily, mobile travel behavior server 161 or the mobility server 121 sorts them based on UID and time stamp for future processing (processing block 401), even if the event data is stored at a group of different servers. The data may be provided to mobile travel behaviour server using a push or pull model.

In one embodiment, when transforming of SAI information such as LAC and sector ID to the latitude and longitude information of the sector center, a sector edge, the mesh center or multiple points, respectively, the location of BS receiving the event data is used as basic information for identifying the estimated UE's location 451.

Note the conversion of SAI to latitude and longitude of multiple points is useful in situations where multiple sources in a sector (e.g., starting positions) are being used and multiple trajectories are being computed for an individual. In such a case, the probability of the likelihood the UE/user traveled one trajectory versus another is used to determine which trajectory is selected for use as part of the population counting process.

Figure 5:
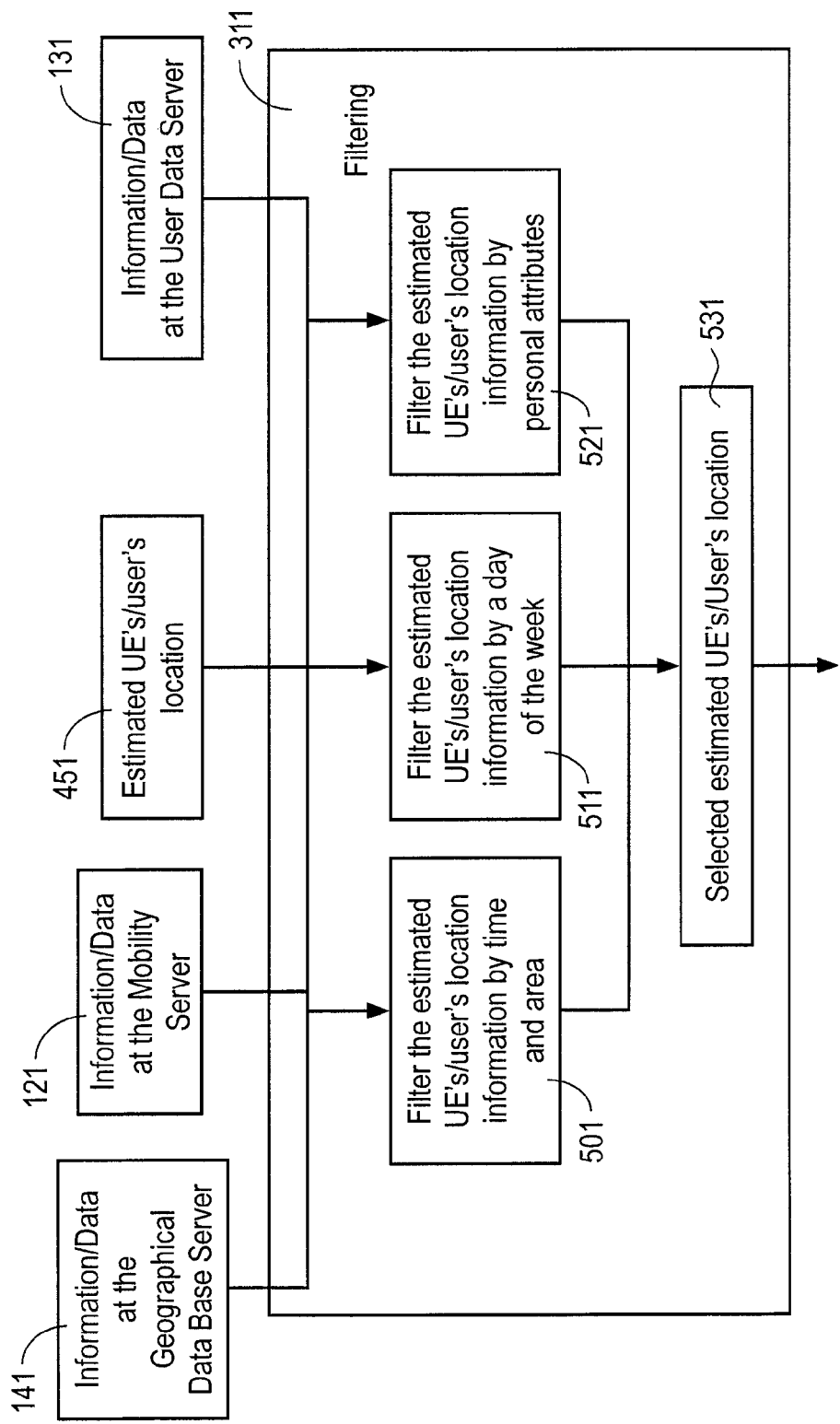
FIG. 5 is a data flow diagram illustrating a filtering process to obtain selected UE's/user's locations according to one embodiment.

FIG. 5 is a data flow diagram illustrating a filtering process to obtain selected UE's/user's locations according to one embodiment. In one embodiment, the filtering process is performed by processing logic that may comprise hardware (circuitry, dedicated logic, etc.), software (such as is run on a general purpose computer system or a dedicated machine), or a combination of both. In one embodiment, the processing logic is part of mobile travel behavior server 161.

Referring to FIG. 5, the filtering process begins at the mobile travel behavior server with selected estimated location information of UEs/users and may include data from geographical database server 151, data from mobility server 121, and/or data from user data server 131 and generally involves one or more of: (a) filtering the event data to reduce event data that is redundant based on one or both of area and time (processing block 501); (b) filtering the event data based on personal attribute, such as those described herein (processing block 521); and (c) filtering the event data according to day of the week (processing block 511). In the case of filtering data based on personal attributes, the information may be obtained from operational information and tables containing data about users associated with the user terminals.

After performing filtering based on redundancy, personal attribute and/or day of week, processing logic selects the estimated location of UEs/users (processing block 531). By selecting the event data, the mobile travel behavior server analyzes the event data quickly because the data set is reduced in size. For instance, most of the worker goes to an office in the morning and go back to their home in evening using same transportation method and same transport network route. In one embodiment, the averaging and filtering remove irregular movement patterns during week days.

Figure 6:
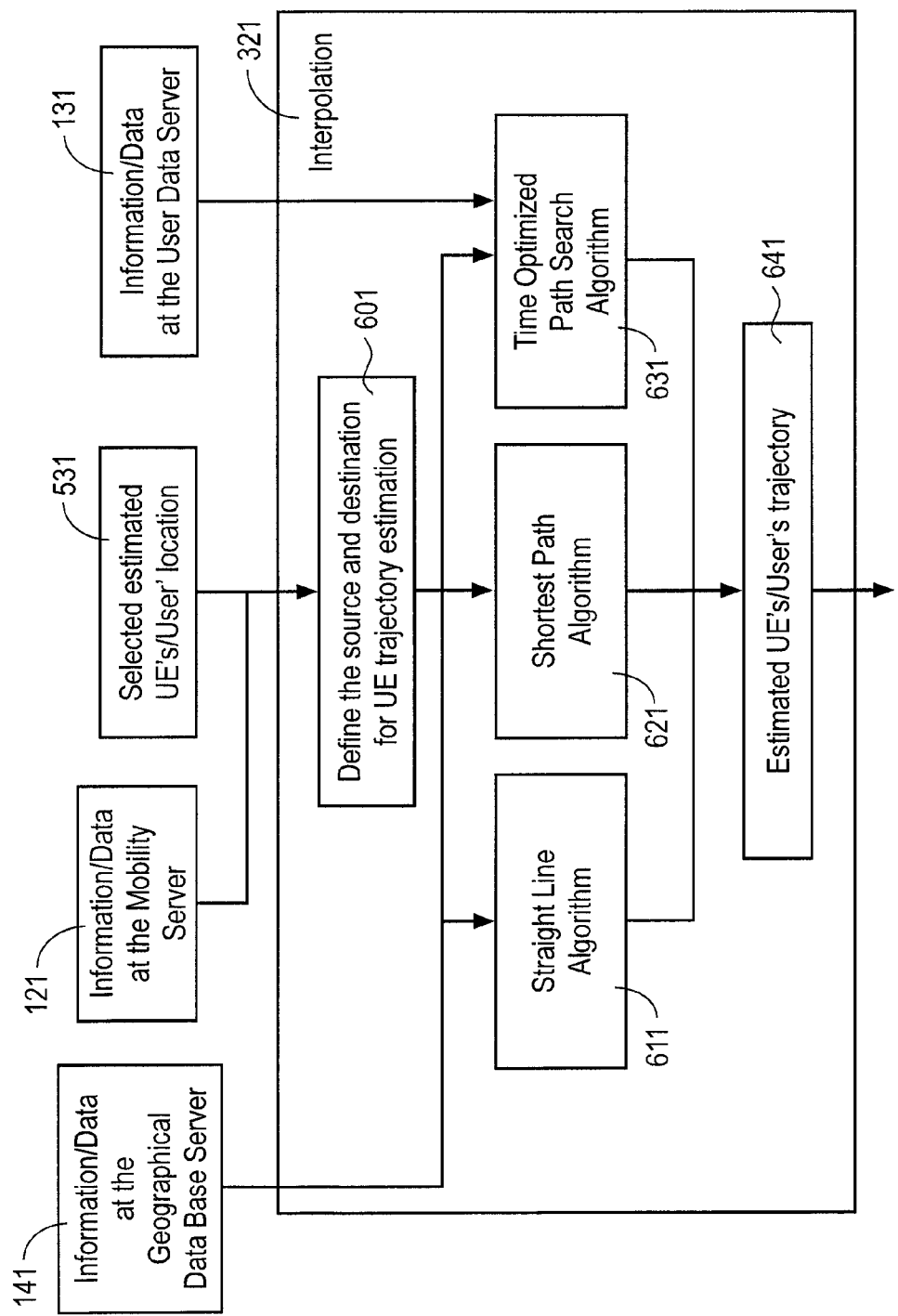
FIG. 6 is a data flow diagram illustrating an interpolation process to estimate UE's/user's trajectory from source to destination according to one embodiment.

FIG. 6 is a data flow diagram illustrating an interpolation process to estimate UE's/user's trajectory from source to destination according to one embodiment. In one embodiment, the interpolation process is performed by processing logic that may comprise hardware (circuitry, dedicated logic, etc.), software (such as is run on a general purpose computer system or a dedicated machine), or a combination of both. In one embodiment, the processing logic is part of mobile travel behavior server 161.

Referring to FIG. 6, the trajectory interpolation process begins at the mobile travel behavior server with selected estimated location information of UEs/users and may include data from geographical database server 151, data from mobility server 121, and/or data from user data server 131 and generally involves performing one selected from the following: (a) interpolating transport network route by the straight line algorithm (processing block 611); (b) interpolating transport network route by the shortest path algorithm (processing block 621); and (c) interpolating transport network route by the time optimized path search algorithm (processing block 631). Implementations of these algorithms are well-known to those skilled in the art. These algorithms sometimes utilize the geographic information & transport network information. All of interpolation algorithms set the user's source and destination positions before analyzing data (from processing block 601 of FIG. 6). Note that in one embodiment all three 611, 621, and 631 are performed and the results of only one is used later.

The straight line interpolation algorithm simply connects the user's source (e.g., a starting position) and the user's destination directly and generates an estimated user's position by use of arbitrary granularity like, for example, but not limited to, every 1 min, 5 min, 10 min, or every 100 m, 250 m, 500 m. The shortest path interpolation connects the user's source and the user's destination based on shortest path algorithm such as, for example, Dijkstra's algorithm, A* algorithm, Dempster-Shafer method, and so forth. In one embodiment, weights based on geographic information & transport network information in the sector or in the mesh or the sector/mesh are set up. These are based on related road routes and railways routes. Using this information, a user's estimated trajectory path may be found.

In one example, the geographical area is partitioned into several levels of meshes which are typically square-shaped, and their size may range from several tens of kilometers to several hundreds of meters. An example of mesh size used for population counting/tracking purposes is 500 meters by 500 meters. For urban areas, a sector in the BS may contain only few meshes, while for rural areas, large number of meshes may be comprised of the sector. All of meshes take into account of geographic information & transport network information, and the mesh-based trajectory estimation is performed in the same way sector-based estimation is performed.

In one embodiment, a time optimized path search is performed which takes into the account of required time from a source to destination and finds a best matched route.

Figure 7:
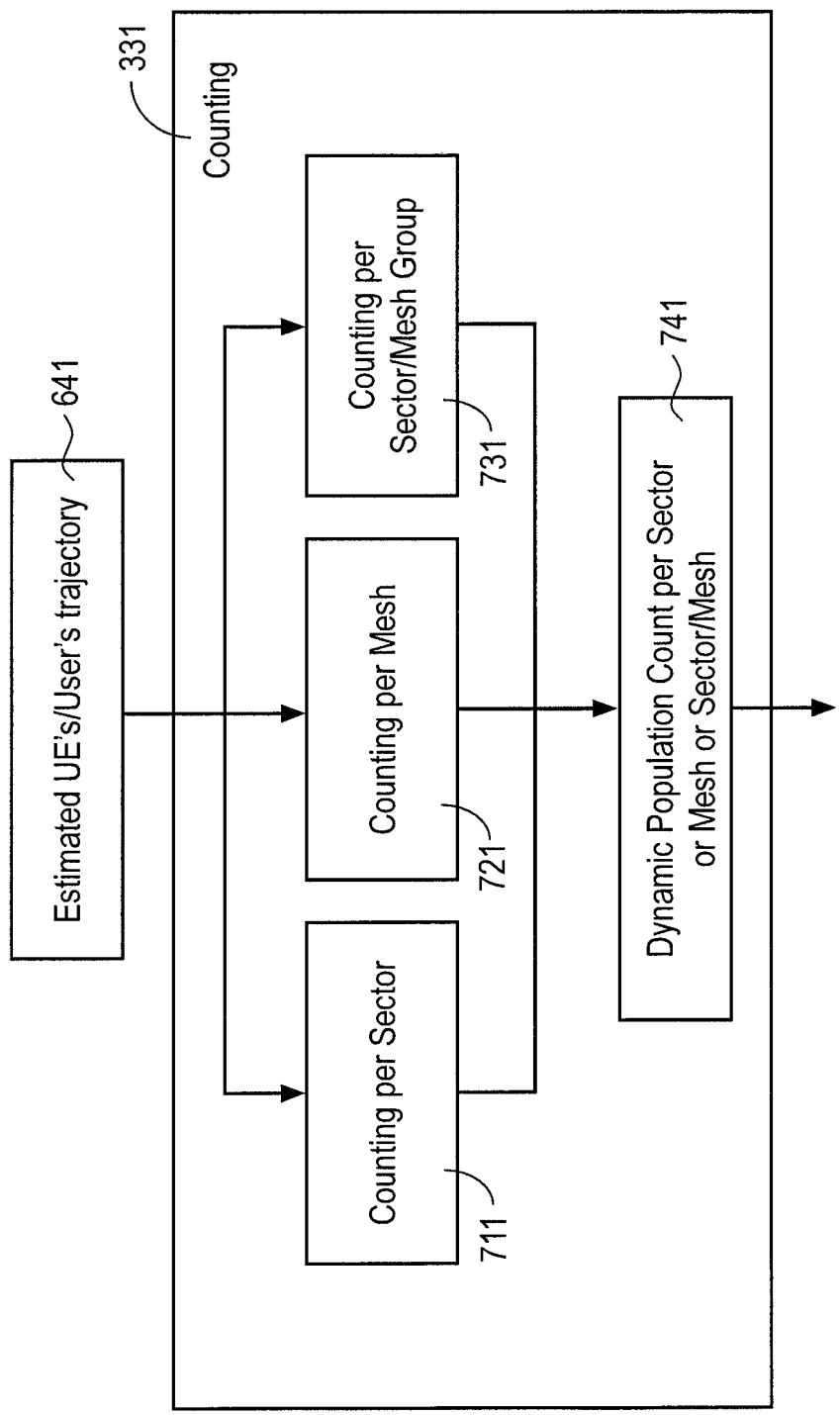
FIG. 7 is a data flow diagram of one embodiment of a dynamic population counting process.

FIG. 7 is a data flow diagram illustrating dynamic population counting process according to a one embodiment. The process determines movement based on trajectory information. In one embodiment, the dynamic population counting process is performed by processing logic that may comprise hardware (circuitry, dedicated logic, etc.), software (such as is run on a general purpose computer system or a dedicated machine), or a combination of both. In one embodiment, the processing logic is part of mobile travel behavior server 161.

Referring to FIG. 7, the dynamic population counting process begins with estimated trajectory data for UEs/users at the mobile travel behavior server and generally involves one or more of: (a) counting individuals in a population based on sector (processing block 711); (b) counting individuals in a population based on mesh (processing block 721); and (c) counting individuals in a population based on sector and mesh group (processing block 731). In one embodiment, the mobile travel behavior server converts the estimated UE position based on the location of BS receiving the event data to a target area, such as a sector, or a mesh, or a sector/mesh group area, and the mobile travel behavior server removes duplicated UEs in each area if any. Then, the mobile travel behavior server obtains a count of dynamic population movement per sector, mesh or sector/mesh (processing block 741).

In one embodiment, the mobile travel behavior server shows a distribution of user equipment gathered at a given location or scattered from a given location. In another embodiment, the mobile travel behaviour server shows the characteristics of population movement between two given points. Note that in yet another embodiment, mobile travel behaviour server shows both a distribution of user equipment gathered at a given location or scattered from a given location and the characteristics of population movement between two given points. Preparing and illustrating such distributions would be well-known to those skilled in the art.

When the dynamic population migration is identified at the sector, or mesh or a group of sector and mesh level, an instant population census called "mobile census" using person attribute information within a given geographical area can be obtained.

In this embodiment, system and apparatus method for population movement estimation and counting using UE's operational data is presented. Examples of the UE are the mobile phone, smart phone, and smart tablet commuters with communication functions. In particular, the system uses event data which are messages to manage UEs by network operators. The connection between UEs and operator network is assumed to be wireless or wired connection such as cellular system including 2G, 3G, 4G and beyond 4G, Wireless LAN, WiMAX, Bluetooth, either network, ADSL and so on.

The regular event data (e.g., periodic location update message) are transmitted by the UEs on time intervals that are on the order of an hour, and the periodic time interval can be adjusted and customized. While a longer time interval between two periodic messages provide lower message overhead and less battery consumption at the UE, it also limits the tracking accuracy of the users/UEs. Another example of the event data generated by the UE is location area update (LAU). If the UE is mobile and it crosses the boundary of a location area composed of several sectors, the UE transmits the LAU as the event data to the network via the nearest BS when the UE identifies a different location area code. The event data has the sector-level location information and low frequency update. A cell site (e.g., BS) gives radio coverage to a cell. Most cells have been split into sectors or individual areas to make them more efficient and to let them to carry more calls. Therefore, the sector is one of the smallest sizes of radio coverage served by the BS. However, its size depends on the area and may range from few hundreds of meters (urban areas) to few kilometers (rural areas). The sector location information is not the same as the one provided by GPS. In spite of transmitting hundreds of event data from the UE, the event data received at the sector does not indicate an exact location of the UE. The location of UE based on the event data can be estimated at the sector location, which means the UE is associated to a specific sector.

Figure 8:
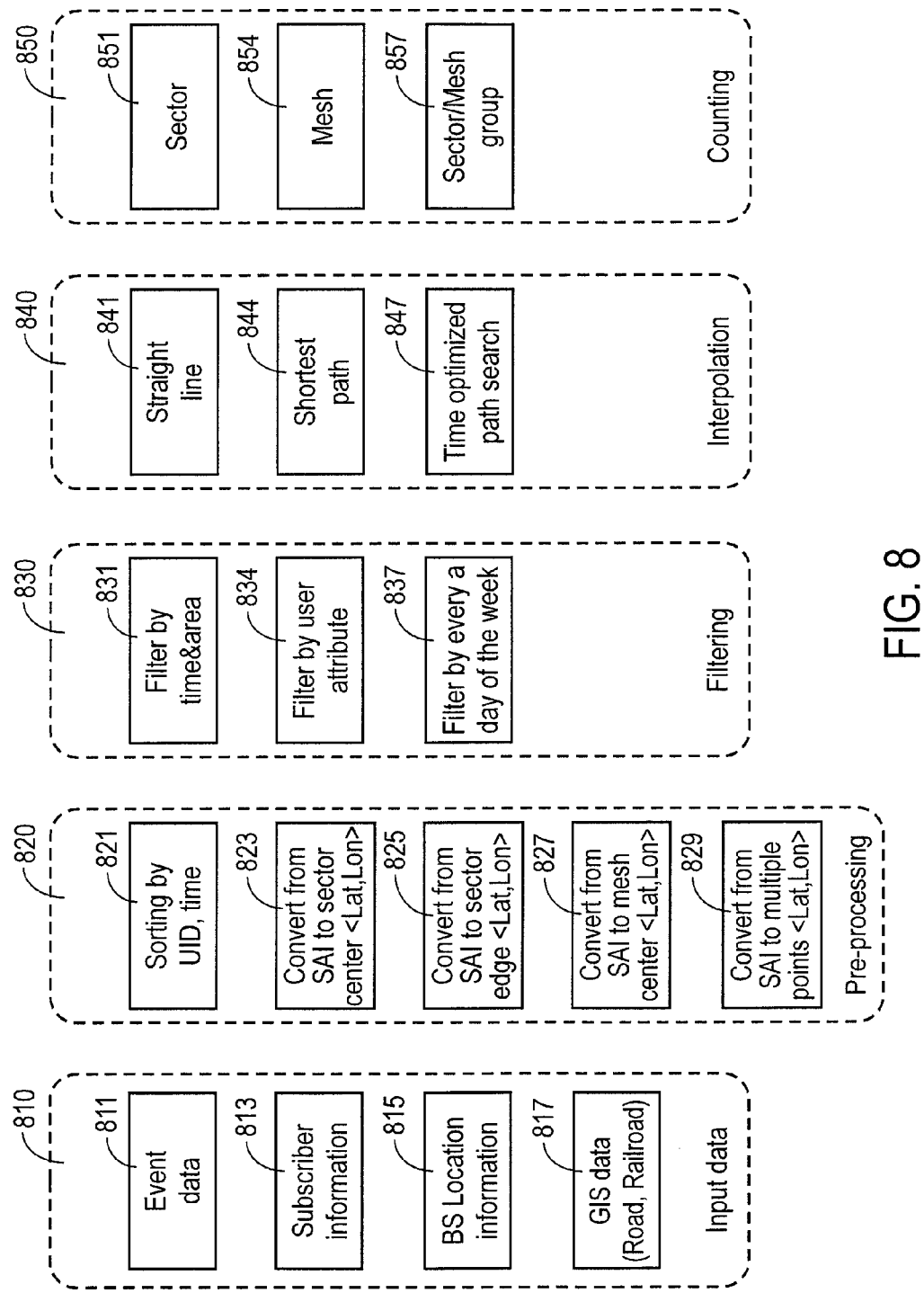
FIG. 8 illustrates a collection of proposed user's trajectory estimation and population counting processes using operational data according to one embodiment.

FIG. 8 illustrates the stages of one embodiment of user's trajectory estimation and population counting processes using operational data. Referring to FIG. 8, the first stage 810 includes gathering data from operational and special domain for dynamic population counting. Event data 811 is generated and includes LAU and PRM messages. The original event data contains UID (User IDentification), time-stamp and update type (i.e., PRM or LAU). In one embodiment, subscriber information 813, such as age/gender/demographic characteristics/address is available to make meaningful statistical analysis. BS location information 815 is mainly used in second stages 820, and GIS data 817 is used in fourth stages 840.

The second stage 820 is pre-processing for later stages. The event data is generated by UEs, and the timing of this data generation is not regular because the LAU or other messages are not generated periodically. Even though the user's event data generation is less frequent, the total amount of event data generated by all subscribers increases dramatically. As the results, the event data is stored in different servers, and the system needs to sort them by UID and time 821 for efficient processing. The others are varieties of convert processes 823, 825, 827, and 829. In one embodiment, the event data 811 contains SAI (Service Area Identity) information such as LAC and sector ID, and it is converted to latitude and longitude as the user's position using BS location information 815.

The third stage 830 is filtering to remove redundant area/time data 831, attribute 834, or the user's average the source/destination/trajectory based on every a day of the week 837. By restricting the event data, the system can handle them quickly and make more detail analysis using elaborate methods. Moreover, most of the workers go to office in the morning and then go back home in evening using the same transportation method. Methods are able to remove irregular movement pattern during week days.

The fourth stage 840 is performing the trajectory interpolation from dispersed data using various methods. All of the interpolation methods are based on the consecutive user's locations in event data as a source and destination positions. The straight line interpolation 841 connects them using a straight line and generates estimated positions with arbitrary granularity, such as every 1 min, 5 min, 10 min, or every 100 m, 250 m 500 m. The shortest path interpolation 844 connects source and destination positions using one of a group of shortest path algorithms, such as, for example, Dijkstra's algorithm, A* algorithm, Dempster-Shafer method, etc. In one embodiment, weights are used and assigned to the possible paths to find a path. Weights may be assigned based on GIS data 817. Related roads and railways in all sector connections may also be used in assigning weights and finding a path. In one embodiment, the basic trajectory estimation is based on sectors. In another tracking embodiment, the geographical area is partitioned into several levels of meshes. The meshes are typically square-shaped, and their size may range from several tens of kilometers to several hundreds of meters. An example of mesh size considered for population counting/tracking purposes is 500 meters by 500 meters. For urban areas, a sector may contain only a few meshes, while for rural areas, a large number of meshes may be contained within a certain sector. All of meshes are also reflected GIS data, and the trajectory estimation method used may be the same as methods used in sector-based estimation. Moreover, in one embodiment, a time optimized path search 847 may be used for interpolation, in which the necessary time to source/destination is optimized to find a best matched route.

The last stage 850 is counting the number of individuals in the population. In this stage, the estimated positions are converted to a target area, such as sector 851, mesh 854, or a sector/mesh group area 857. In one embodiment, the system removes duplicated data in each area. Then, the system is able to show a distribution of people gathered at a location or scattered from a location, and show the characteristics of movement between two points. Such information may be used for urban planning, traffic planning, and disaster prevention. Another potential application is a mobile census process using subscriber information such as age/gender/demographic characteristics/address distributions within a given geographical area and time interval.

Population Movement and Estimation Using Mobile Network Operational Data

Figure 9:
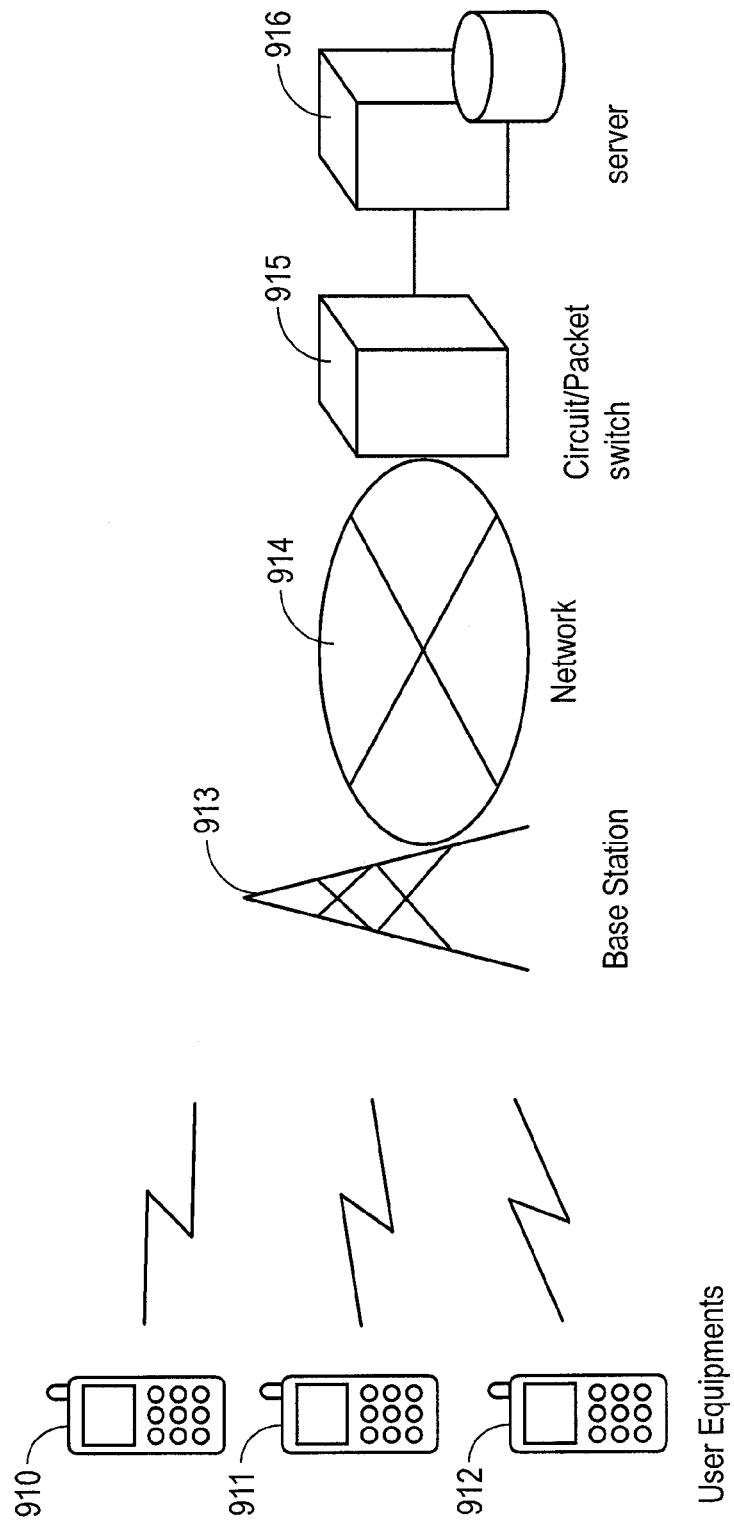
FIG. 9 illustrates another embodiment of a mobile network operator system for population movement estimation and counting.

FIG. 9 illustrates one embodiment of a mobile network operator system for population movement estimation and counting. Referring to FIG. 9, if UEs 910, 911, and 912 are in a service area of mobile network operator, they exchange some messages with BS 913 and circuit/packet switch 915 over the operator's network 914 for mobility management or communication. Event data 811 are also transmitted from UEs 910, 911, 912 and BS 913, and is stored in servers 916 for population movement estimation and counting. Servers 916 also store subscriber information 813, BS location information 815, and GIS data 817. The communication between UEs and operator network is available via femtocell, wireless LAN, Bluetooth, or other communication arrangements.

Figure 10:
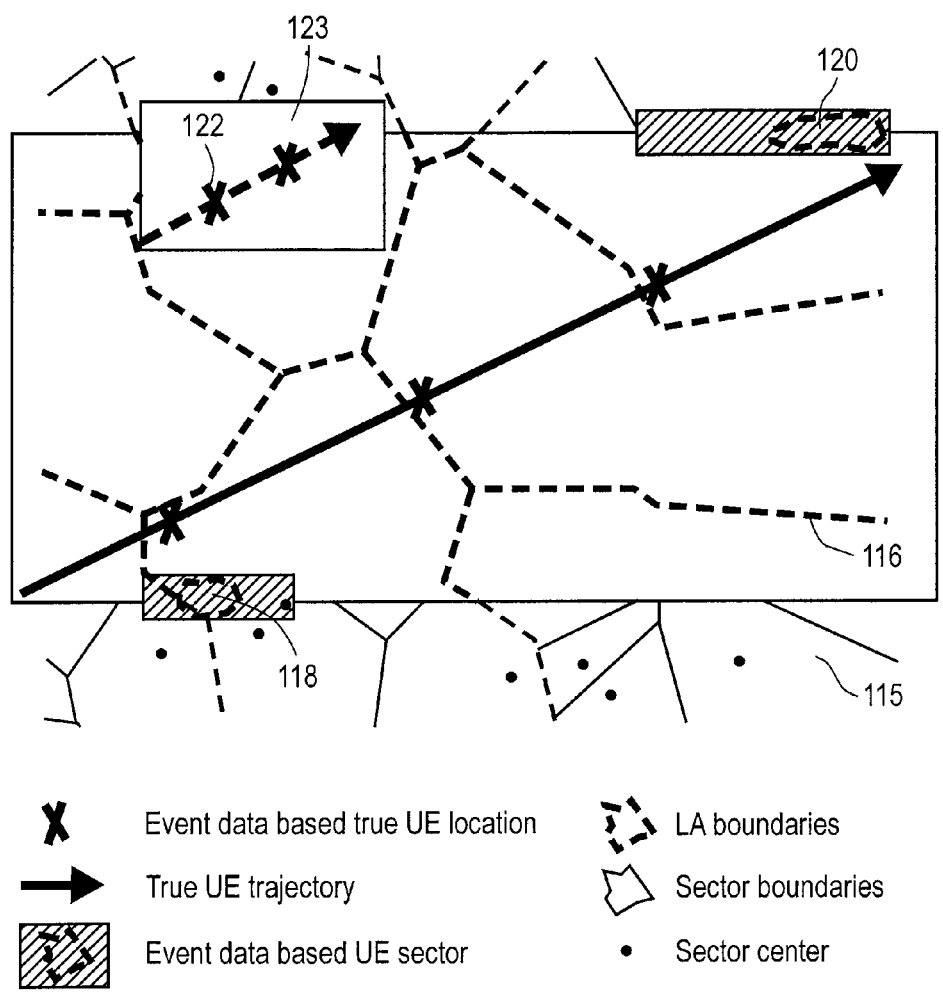
FIG. 10 illustrates a trajectory of a mobile user, underlying cellular sectors, and operational data message locations during the mobile user's trajectory.

FIG. 10 illustrates trajectory of a mobile user, underlying cellular sectors, and operational data message locations during the mobile user's trajectory. Referring to FIG. 10, consider a sample trajectory of the user as given in 1011. This user moves through different sectors 1018, 1019, and 1020, whose size may range from few hundreds of meters (urban areas) to few kilometers (rural areas) as discussed above. The sector centers are marked with small circles 1017 located within each sector. Boundaries of the sectors 1015 are given by the Voronoi diagram that takes inputs as the sector centers. Multiple sectors are combined to form LAs, whose boundaries are marked as in 1016. Moreover, the event data 811 is generated by the initial use of femtocell, wireless LAN, Bluetooth, and so on.

In one embodiment, the event data of a mobile user is primarily composed of two messages that are transmitted by the UE: PRMs, and LAUs. PRMs are periodically transmitted by each UE, for example, within one hour intervals (see e.g., 1022, 1023 in UE's trajectory 1021). Even if the UE is stationary, the PRM is transmitted by the UE to its serving BS. On the other hand, the LAU messages (see e.g., 1012, 1013, 1014) are triggered whenever a UE crosses the boundary of an LA 1016. There is gap between the true location and sector center, so it is better to use sector edge as the user's location if event data caused by LAU. In one embodiment, the following important information is included as a part of both the PRM and LAU messages: sector ID, location area ID, timestamp (with a granularity of one second), and update type (i.e., PRM, LAU, and so on).

Figure 11:
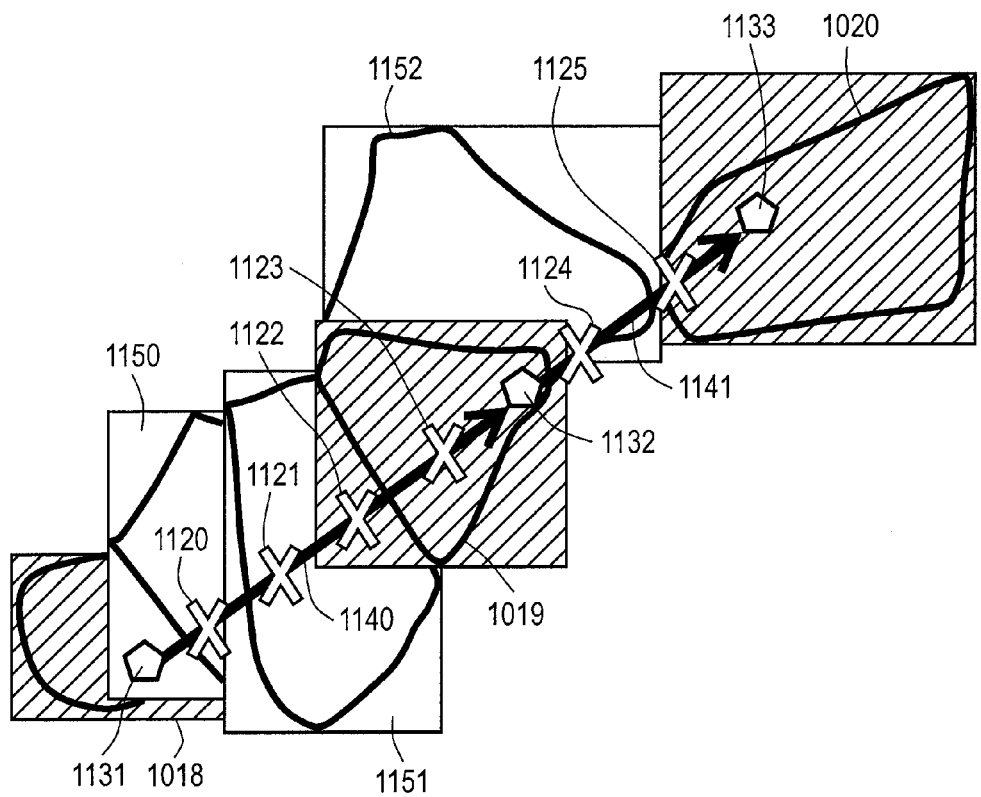
FIG. 11 illustrates estimation of a mobile user's trajectory using sector center based straight line interpolation and sector based counting according to one embodiment.

The PRM and LAU uniquely specify the sector IDs. One way to map the UE's location within the sector is to map it to the sector center. FIG. 11 illustrates estimation of a mobile user's trajectory using sector center based straight line interpolation and sector based counting according to one embodiment. For example, as shown in FIG. 11, the true UE locations 1012, 1013, and 1014 in FIG. 10 can be mapped to sector centers 1131, 1132, and 1133 in FIG. 11. If one is interested in having an estimate of the UEs locations for the time instants between the event data, it is possible to interpolate (e.g., using linear interpolation) the location estimates 1131, 1132, and 1133, and assign time-stamps (with uniform time intervals) to the points on the interpolated lines as shown by 1140 and 1141. All of the estimated positions 1120-1125 are converted to the sector information 1150, 1151, and 1152. Then, the estimated trajectory is 1018, 1150, 1151, 1019, 1152, and 1020, and the system counts the sector based population movement.

Figure 12:
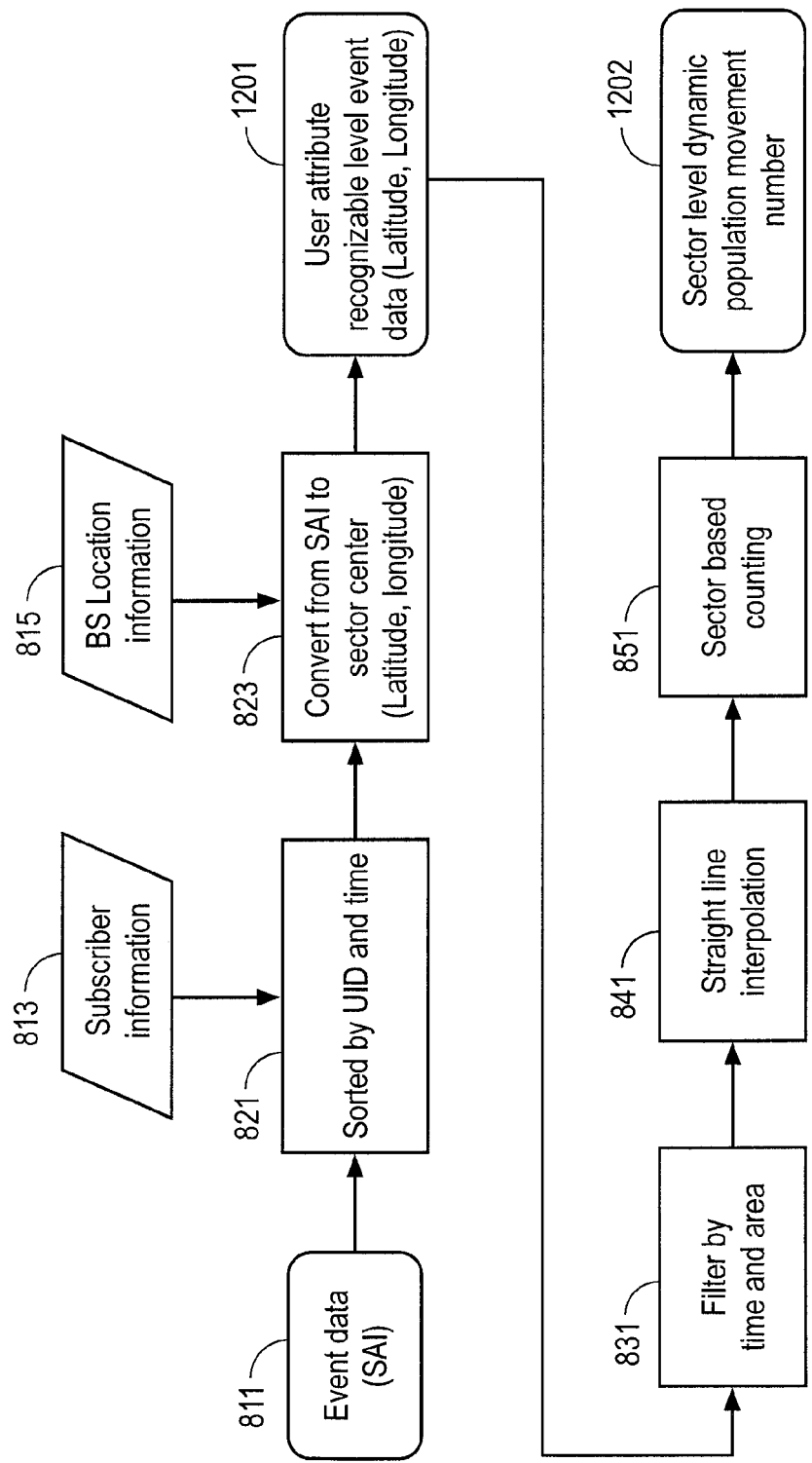
FIG. 12 is a flow diagram of one embodiment of a process for estimating users' trajectories using sector center based straight line interpolation and sector based counting.

FIG. 12 is a flow diagram of one embodiment of a process for estimating users' trajectories using sector center based straight line interpolation and sector based counting. The process is performed by processing logic that may comprise hardware (circuitry, dedicated logic, etc.), software (such as is run on a general purpose computer system or a dedicated machine), or a combination of both.

Referring to FIG. 12, processing logic in the system receives event data 811 which contains SAI based user's location and sorts event data 811 by UID and time with given subscriber information 830 (processing block 821). Secondly, processing logic converts SAI to sector center location using BS location information 815 (processing block 823) and filters the data based on time and area (processing block 831). The mobile network operators understand the BS locations and the signal coverage. Therefore, it may assign the sector center location as users' location.

Finally, processing logic performs straight line interpolation (processing block 841) and counts the sector-based population movement (processing block 851). The straight line interpolation is applied to the output data of processing block 831 and creates estimated location information for consecutive event data. By checking the estimated locations, the system can count the number of user terminals in each sector under the time periods and the area (resulting from filtering), thereby creating a sector level dynamic population movement number 1202.

In an alternative embodiment, the geographical area is partitioned into several levels of meshes. The meshes are typically square-shaped, and their size may range from several tens of kilometers to several hundreds of meters. An example mesh size considered for population counting/tracking purposes is 500 meters by 500 meters 1340-1343. For urban areas, a sector may contain only a few meshes, while for rural areas, a large number of meshes may be contained within a certain sector. When a mesh is used for capturing the mobile spatial statistics, an algorithm accurately finds the best mesh within a sector that best approximates a UEs location within the sector.

Figure 13:
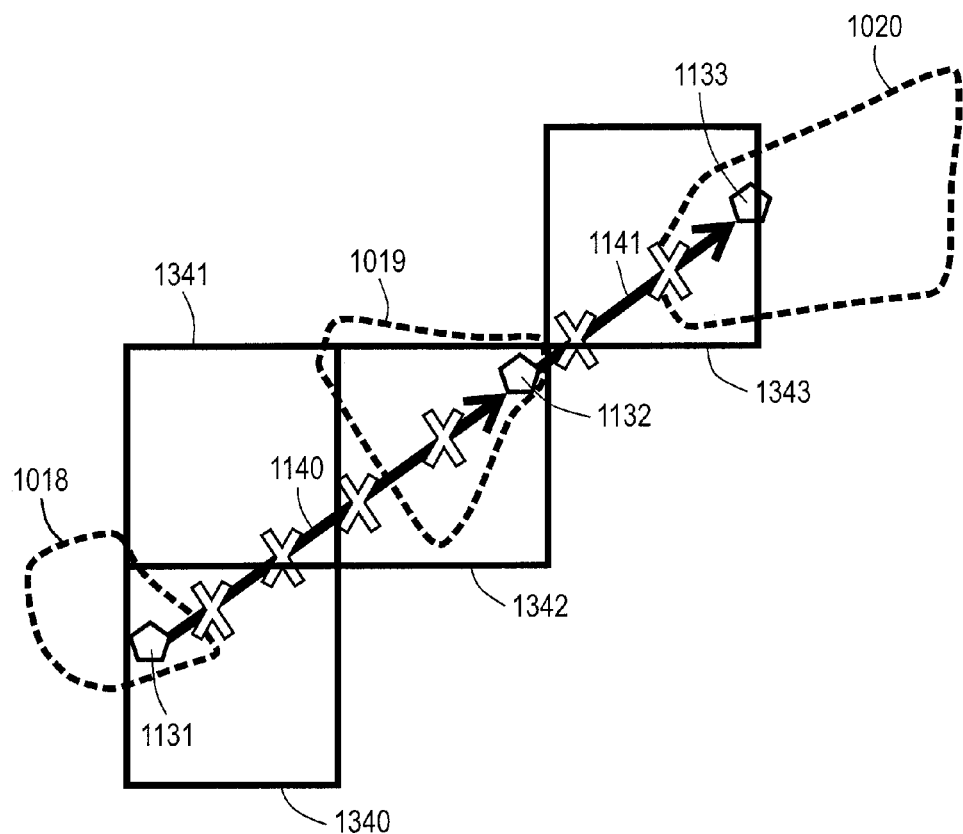
FIG. 13 is a flow diagram of one embodiment of a process for estimating a mobile user's trajectory using sector center based straight line interpolation and mesh based counting.

FIG. 13 illustrates estimation of a mobile user's trajectory using sector center based straight line interpolation and mesh based counting according to one embodiment. In FIG. 13, the interpolated lines as shown by 1140, 1141 and all of the estimated positions 1120-1125 in FIG. 11 are converted to the mesh information 1340, 1341, 1342, 1343. Then, the estimated trajectory is 1340, 1341, 1342, and 1343, and the system can count the mesh based population movement.

Figure 14:
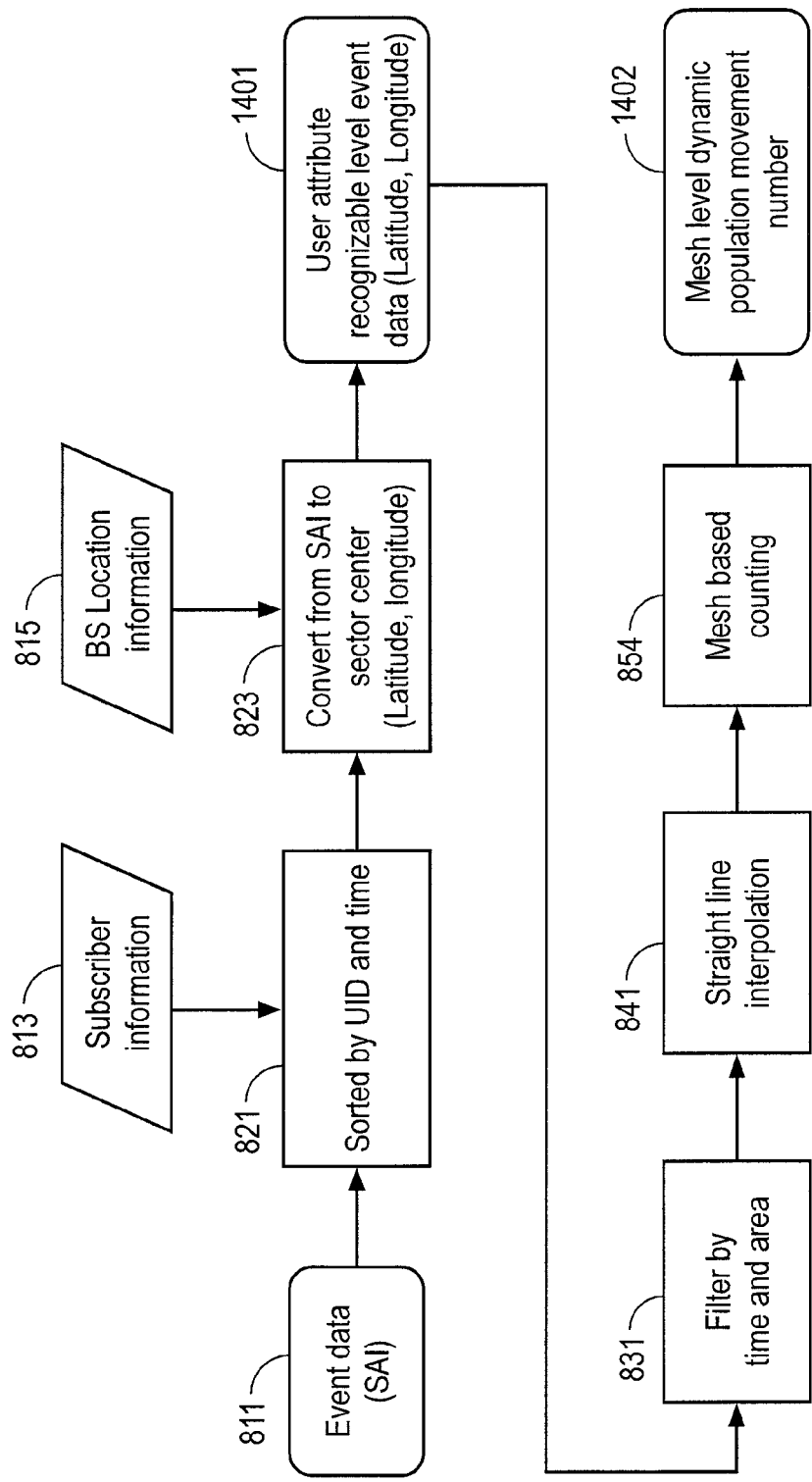
FIG. 14 is a flow diagram of one embodiment of a process for estimating a mobile user's trajectory using mesh center based straight line interpolation and mesh based counting.

FIG. 14 is a flow diagram of one embodiment of a process for estimating a mobile user's trajectory using mesh center based straight line interpolation and mesh based counting. The process is performed by processing logic that may comprise hardware (circuitry, dedicated logic, etc.), software (such as is run on a general purpose computer system or a dedicated machine), or a combination of both.

Referring to FIG. 14, the process begins by processing logic receiving event data 811 which contains SAI based user's location and sorts by UID and time with giving subscriber information 813 (processing block 821). The event data is generated by PRM, LAU, and so on. Secondly, processing logic in the system converts the SAI to sector center location using BS location information 815 and filters this data based on time and area (processing block 831). Finally, processing logic performs straight line interpolation (processing block 841) and counts the mesh based population movement (processing block 854). The straight line interpolation is applied to the data output from processing block 831 and provides the estimated location for consecutive event data. By checking the estimated locations, the system provides a mesh level dynamic population movement number 1402 in each mesh under the time periods and the area specified in the filtering.

Figure 15:
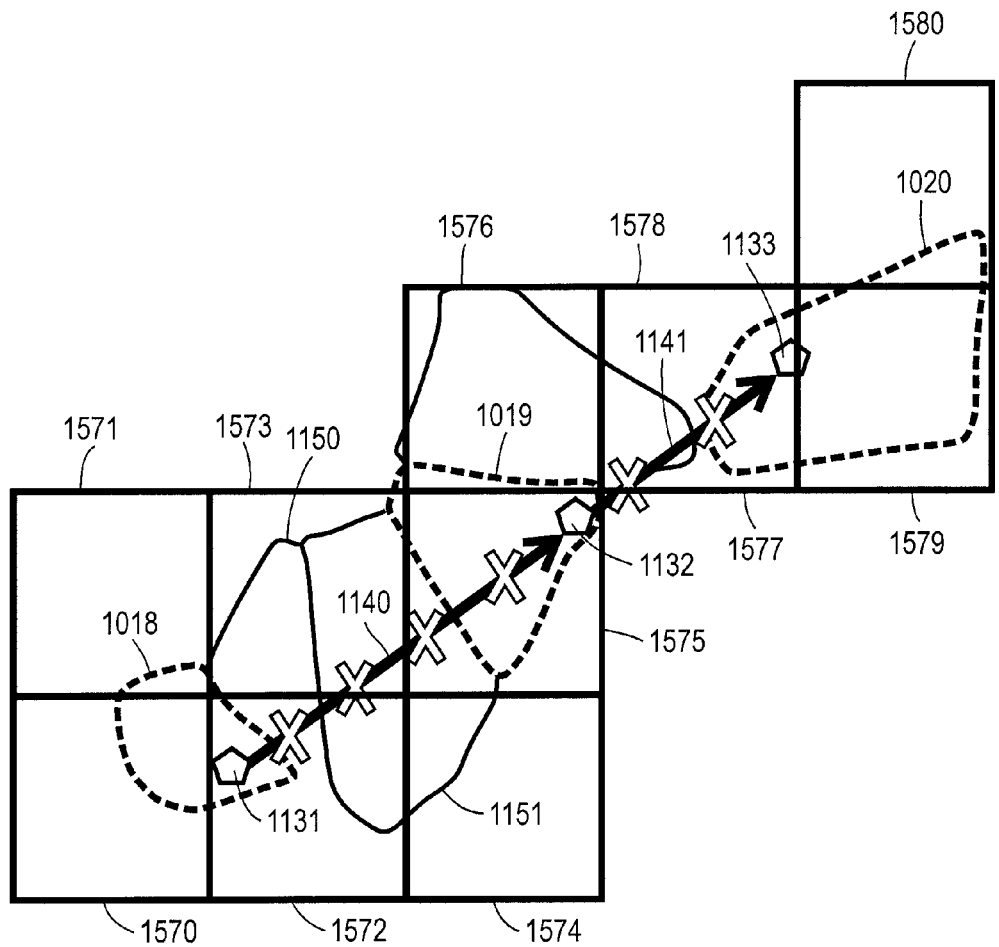
FIG. 15 illustrates estimation of a mobile user's trajectory using mesh center based straight line interpolation and sector/mesh group based counting according to one embodiment.

FIG. 15 illustrates estimation of a mobile user's trajectory using mesh center based straight line interpolation and sector/mesh group based counting according to one embodiment. In FIG. 15, the interpolated lines as shown by 1140, 1141 and all of the estimated positions 1120-1125 in FIG. 11 are converted to the sector information 1150, 1151, 1152. After that, all sectors are converted to mesh information 1570-1580. Then, the estimated trajectory is 1570-1580, and the system can count the mesh based population movement.

Figure 16:
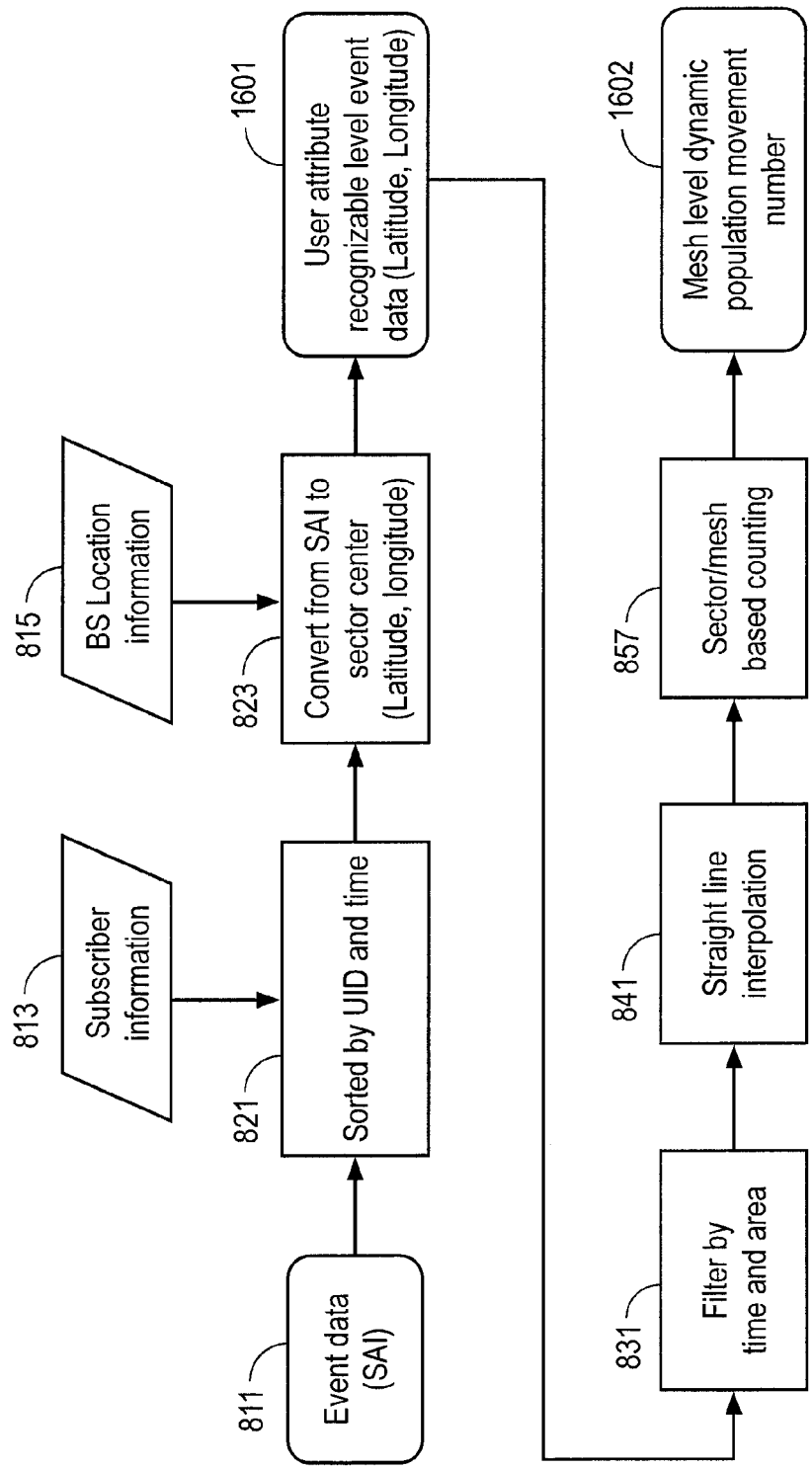
FIG. 16 is a flow diagram of one embodiment of a process for estimating a mobile user's trajectory using sector center based straight line interpolation and sector/mesh group based counting.

FIG. 16 is a flow diagram of one embodiment of a process for estimating a mobile user's trajectory using sector center based straight line interpolation and sector/mesh group based counting. The process is performed by processing logic that may comprise hardware (circuitry, dedicated logic, etc.), software (such as is run on a general purpose computer system or a dedicated machine), or a combination of both.

Referring to FIG. 16, processing logic corrects event data 811 which contains SAI based user's location and sorts by UID and time with given subscriber information 813 (processing block 821). Event data 811 is generated and includes PRM and LAU messages, etc. and so on. Secondly, the system converts SAI to sector center location using BS location information 815 and filters this data based on time and area (processing block 831). Finally, processing logic performs straight line interpolation (processing block 841) and counts the sector/mesh based population movement (processing block 857). The straight line interpolation is applied to the data output from processing block 831 and creates estimated location information for consecutive event data. The estimated location can be converted to sectors. By checking which the sectors belong to a mesh and its coverage ratio, processing logic in the system creates a mesh level dynamic population movement number 1602 in each mesh under the time periods and the area specified in the filtering.

Figure 17:
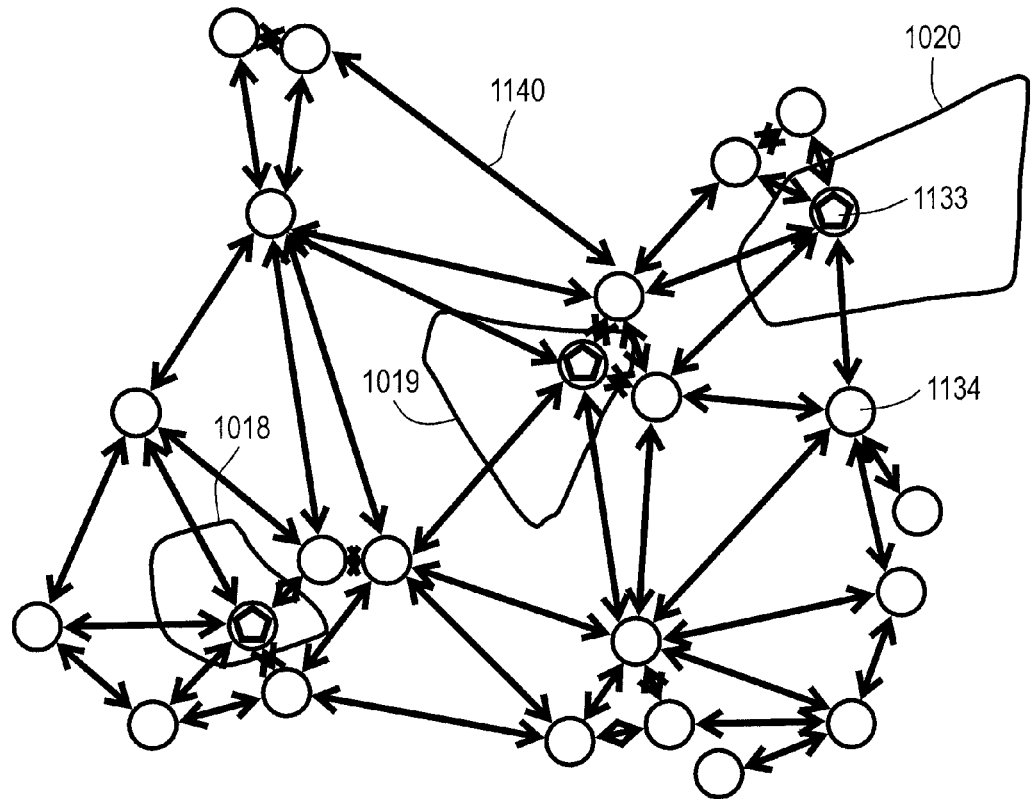
FIG. 17 illustrates estimation of a mobile user's trajectory using sector center based shortest path finding algorithm according to one embodiment.
Figure 18:
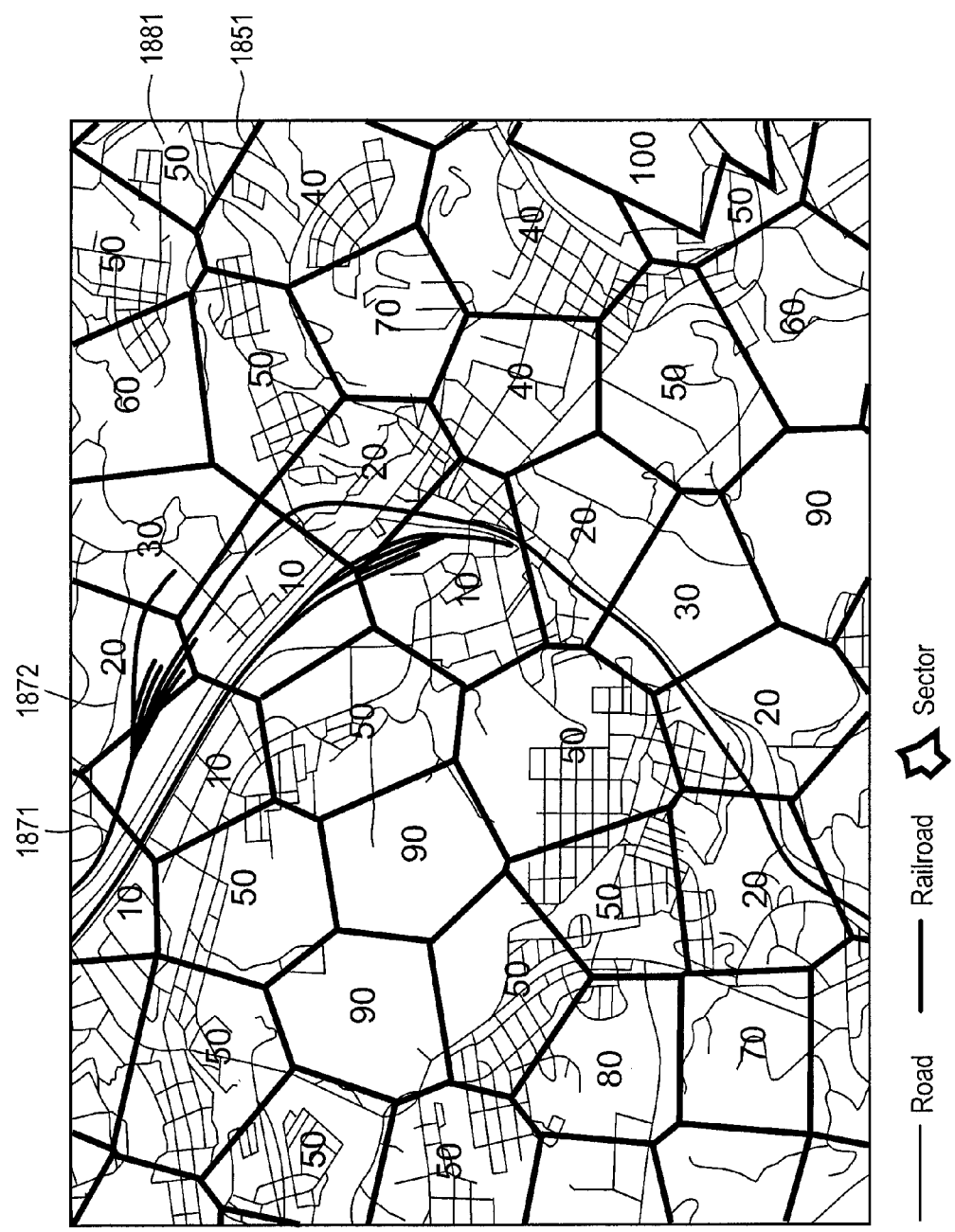
FIG. 18 illustrates sector probability assignment using GIS data and BS Location information.

Note that if the mapped locations of the UE 1131, 1132, and 1133 are not accurate, the estimated points on the interpolated trajectory 1140, 1141 will also not be accurate. Moreover, linear interpolation is typically over-simplification of a mobile user's trajectory; using the GIS information, related roads and railways that are close to the location estimates 1131, 1132, 1133 should be accounted for, and an accurate trajectory should be constructed using such GIS data. In order to achieve more reliable trajectory estimation, GIS data such as road and railroad information is helpful. FIG. 17 illustrates estimation of a mobile user's trajectory using sector center based shortest path finding algorithm according to one embodiment. FIG. 17 shows candidate trajectory from 1018 to 1019 and from 1019 to 1020 based on the sector center position 1134. Each of the connections 1140 has a weight, and the shortest path algorithms find a trajectory. FIG. 18 illustrates sector probability weight assignment using GIS data and BS location information according to one embodiment. Referring to FIG. 18, the weight 1801 in sector 1802 is assigned by number of railroad 1803, station, road 1804, intersection, width of road, outside the land, and so on. In one embodiment, k-th mesh weight Wk assignment is created according to the following formula:

$$Wk = 1 \bigg/ \sum_{i=1}^{R} \alpha i * di + \sum_{j=1}^{L} \beta j + S + l$$

Figure 19:
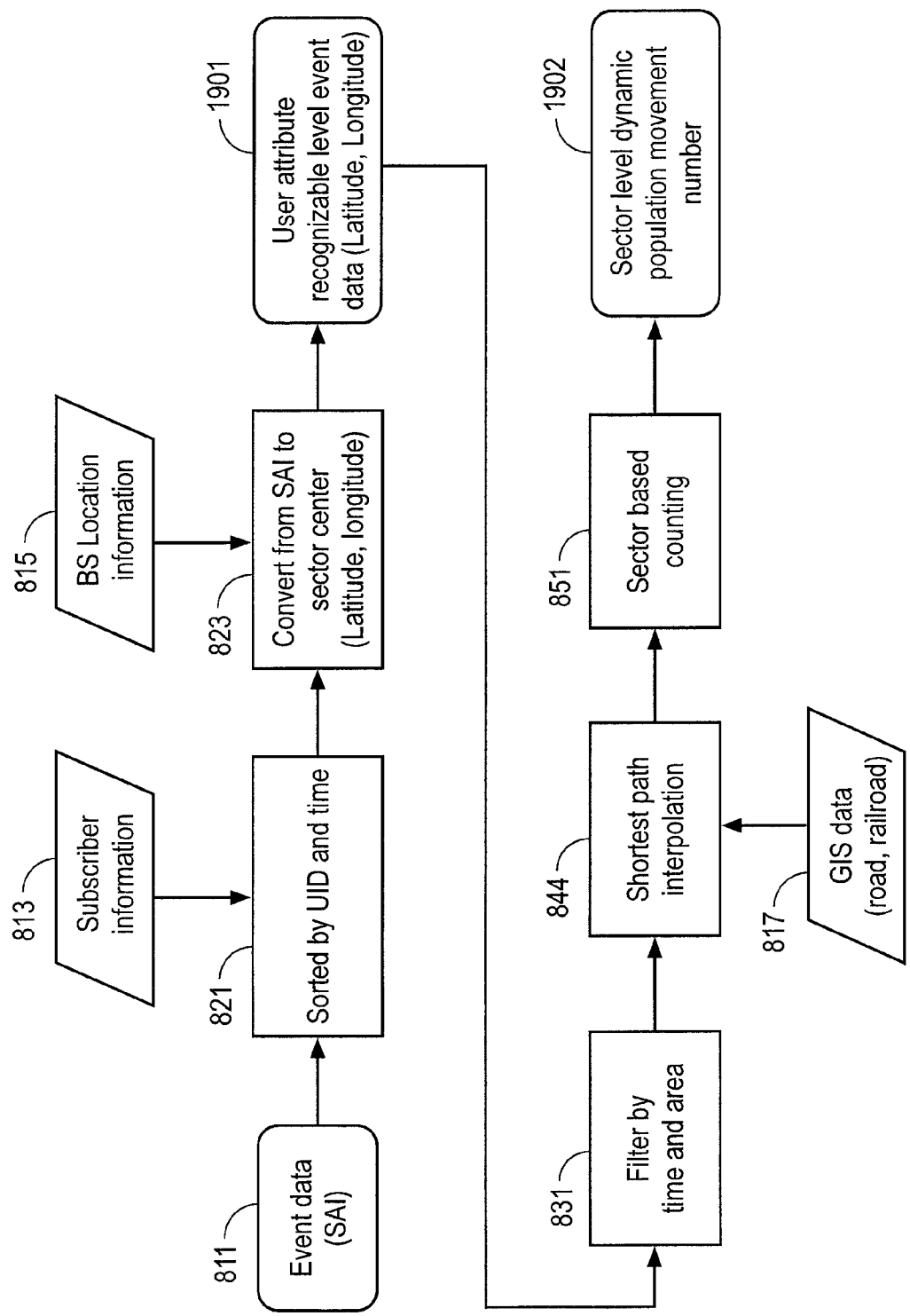
FIG. 19 is a flow diagram of one embodiment of a process for estimating a mobile user's trajectory using sector center based shortest path algorithm and sector based counting.

R: Number of road in the mesh
L: Number of railroad in mesh
S: Number of station in mesh
l: Number of intersection in mesh
di: i-th road width
αi: Coefficient for i-th road width
βj: Coefficient for j-th railroad By tracking the path, a reliable estimated trajectory may be identified. FIG. 19 is a flow diagram of one embodiment of a process for estimating a mobile user's trajectory using sector center based shortest path algorithm and sector based counting. The process is performed by processing logic that may comprise hardware (circuitry, dedicated logic, etc.), software (such as is run on a general purpose computer system or a dedicated machine), or a combination of both.

Referring to FIG. 19, processing logic in the system receives event data 811 which contains SAI based user's location and sorts event data 811 by UID and time with giving subscriber information 813 (processing block 821). Event data 811 is generated by PRM, LAU, and so on. Secondly, processing logic in the system converts SAI to sector center location using BS location information 815 (processing block 823) and filters this data by time and area (processing block 831). Finally, processing logic performs shortest path interpolation (processing block 844) and counts the mesh based population movement (processing block 851). The shortest path interpolation is applied to the data output from processing block 831 and creates estimated location data for consecutive event data using GIS data 817. By checking the estimated locations, processing logic in the system creates a sector level dynamic population movement number 1902 in each sector under the time periods and the area specified in the filtered data.

Figure 20:
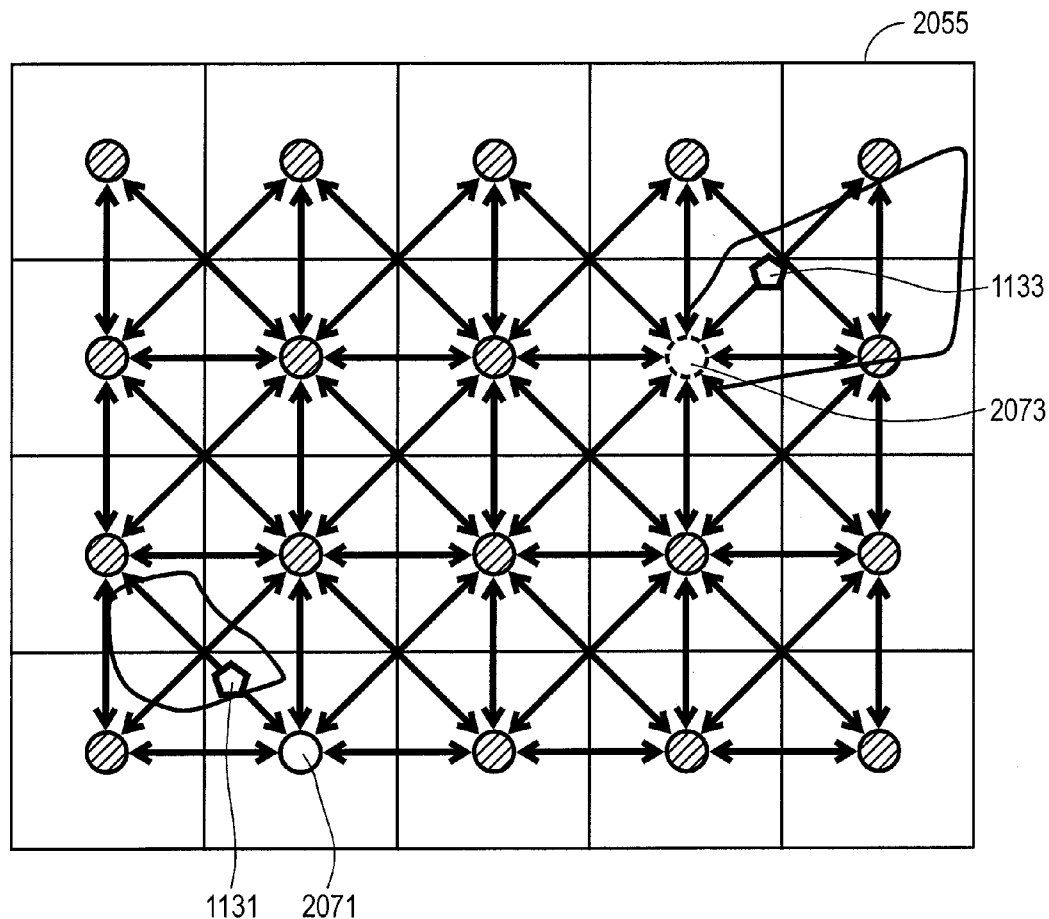
FIG. 20 illustrates estimation of a mobile user's trajectory using mesh center based shortest path finding algorithm according to one embodiment.

FIG. 20 illustrates estimation of a mobile user's trajectory using mesh center based shortest path finding algorithm according to one embodiment. Referring to FIG. 20, the candidate trajectory from 1018 to 1020 based on the mesh center position from 1131 to 1133. The source mesh 2071 and destination mesh 2073 belong to sector sectors. Each of the connections has a weight and shortest path algorithms find a trajectory.

Figure 21:
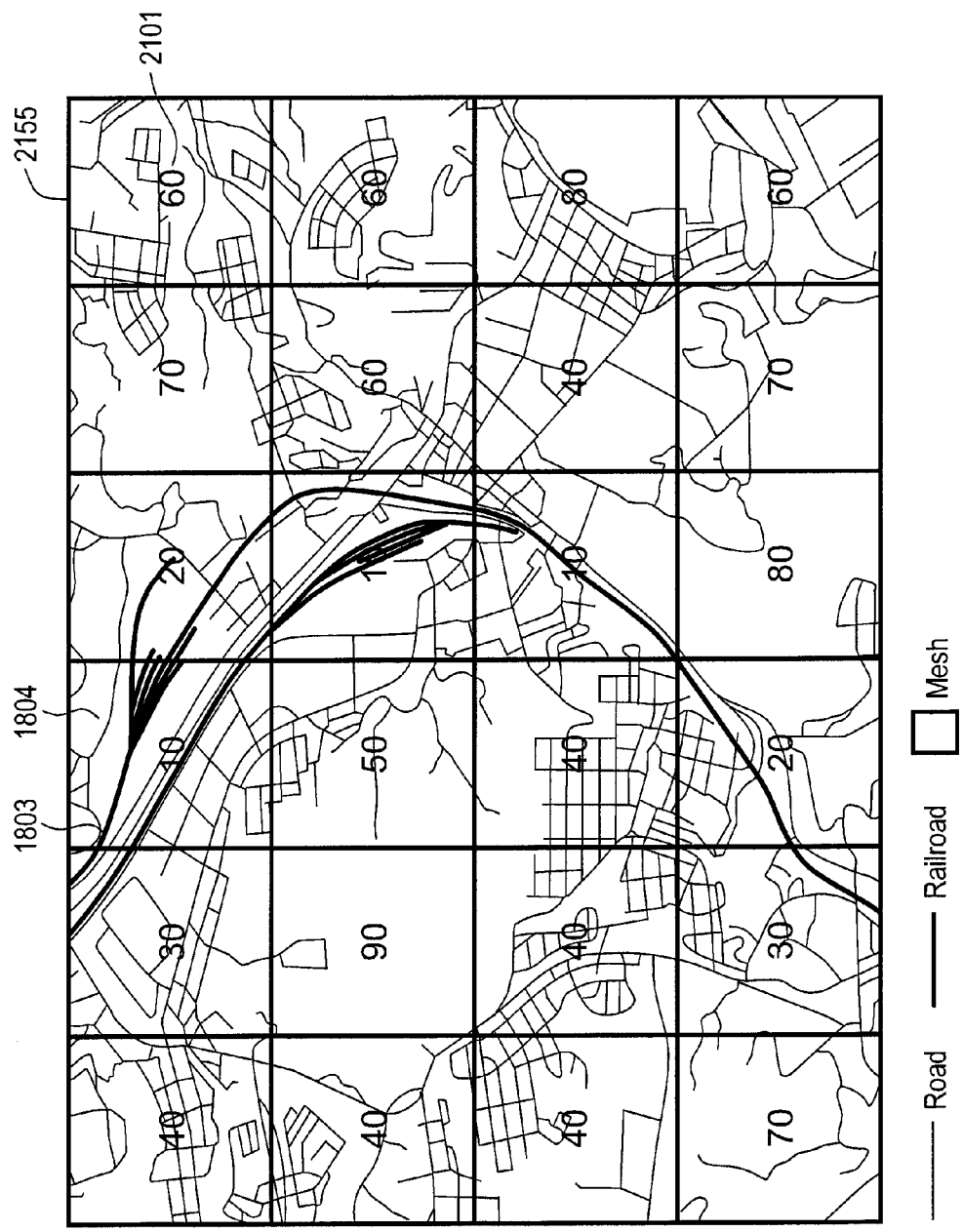
FIG. 21 illustrates one embodiment of mesh probability assignment using GIS data and BS Location information.

FIG. 21 illustrates mesh probability weight assignment using GIS data and BS Location information. Referring to FIG. 21, the weight 2101 in mesh 2155 is assigned by number of railroad 1803, station, road 1804, intersection, width of road, outside the land, and so on. By tracking the path, it became a reliable estimated trajectory.

Figure 22:
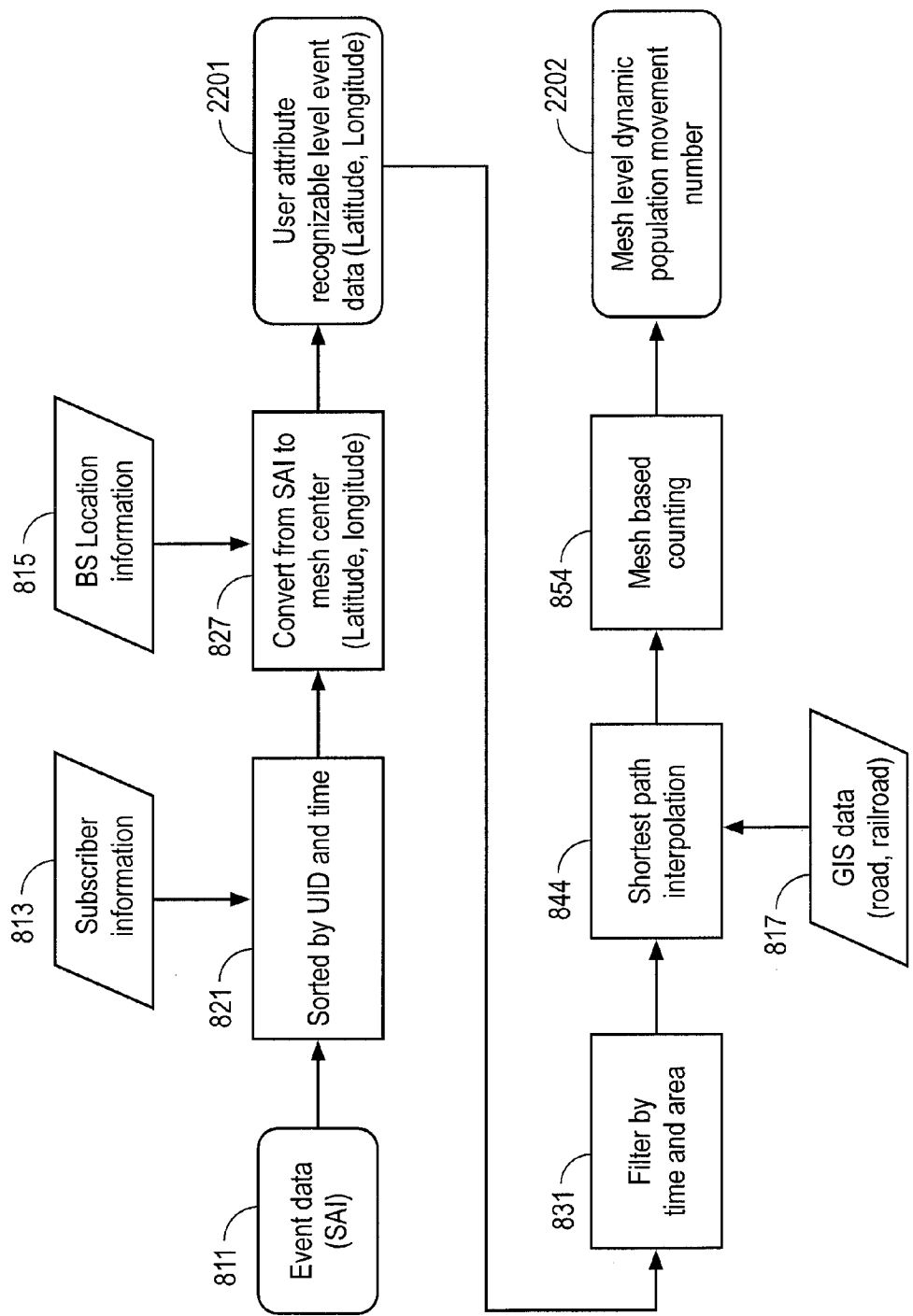
FIG. 22 is a flow diagram of one embodiment of a process for estimating a mobile user's trajectory using mesh center based shortest path algorithm and mesh based counting.

FIG. 22 is a flow diagram of one embodiment of a process for estimating a mobile user's trajectory using mesh center based shortest path algorithm and mesh based counting. The process is performed by processing logic that may comprise hardware (circuitry, dedicated logic, etc.), software (such as is run on a general purpose computer system or a dedicated machine), or a combination of both.

Referring to FIG. 22, the processing logic in the system receives event data 811 which contains SAI based user's location and sorts this data by UID and time with given subscriber information 813 (processing block 821). Event data 811 is generated by PRM, LAU, and so on. Secondly, processing logic in the system converts SAI to mesh center location information using BS location information 815 (processing block 827) and filters this data by time and area (processing block 831). Finally, processing logic performs shortest path interpolation (processing block 844) and counts the mesh based population movement (processing block 854). The shortest path interpolation is applied to the data output from processing block 831 and creates estimated location information for consecutive event data using GIS data 817. By checking the estimated locations, processing logic in the system generates a mesh level dynamic population movement number 2203 in each sector under the time periods and the area specified in the filtered data.

Figure 23:
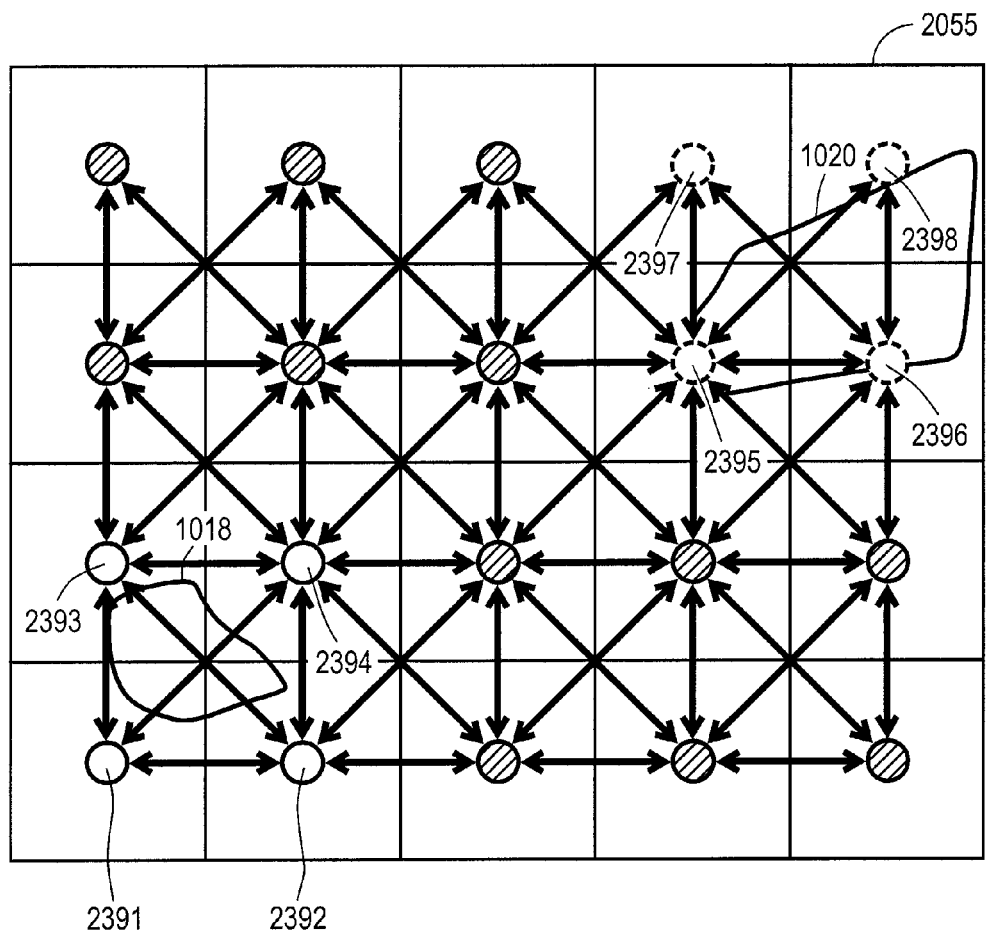
FIG. 23 illustrates estimation of a mobile user's trajectory using multiple mesh centers based shortest path finding algorithm according to one embodiment.

FIGS. 17 and 20 illustrate examples with one source and one destination, but it is possible to set multiple sources and multiple destinations. FIG. 23 shows candidate trajectories based on the mesh from the source sector 1018 to destination sector 1020. Referring to FIG. 21, the source mesh 2391, 2392, 2393, 2394 and destination mesh 2395, 2396, 2397, 2398 belong to the sectors. Each of the source meshes 2391, 2392, 2393, 2394 is assigned a probability based on the coverage area, and each of the destination meshes 2395, 2396, 2397, 2398 is assigned a probability based on the coverage area. The shortest path algorithms find multiple trajectories between source and destination meshes, such as 2391-2395, 2391-2396, 2391-2397, 2391-2398, 2392-2395, 2392-2396, and so on. All of the paths with their probabilities are reflected to the users' trajectories and population movement number.

Figure 24:
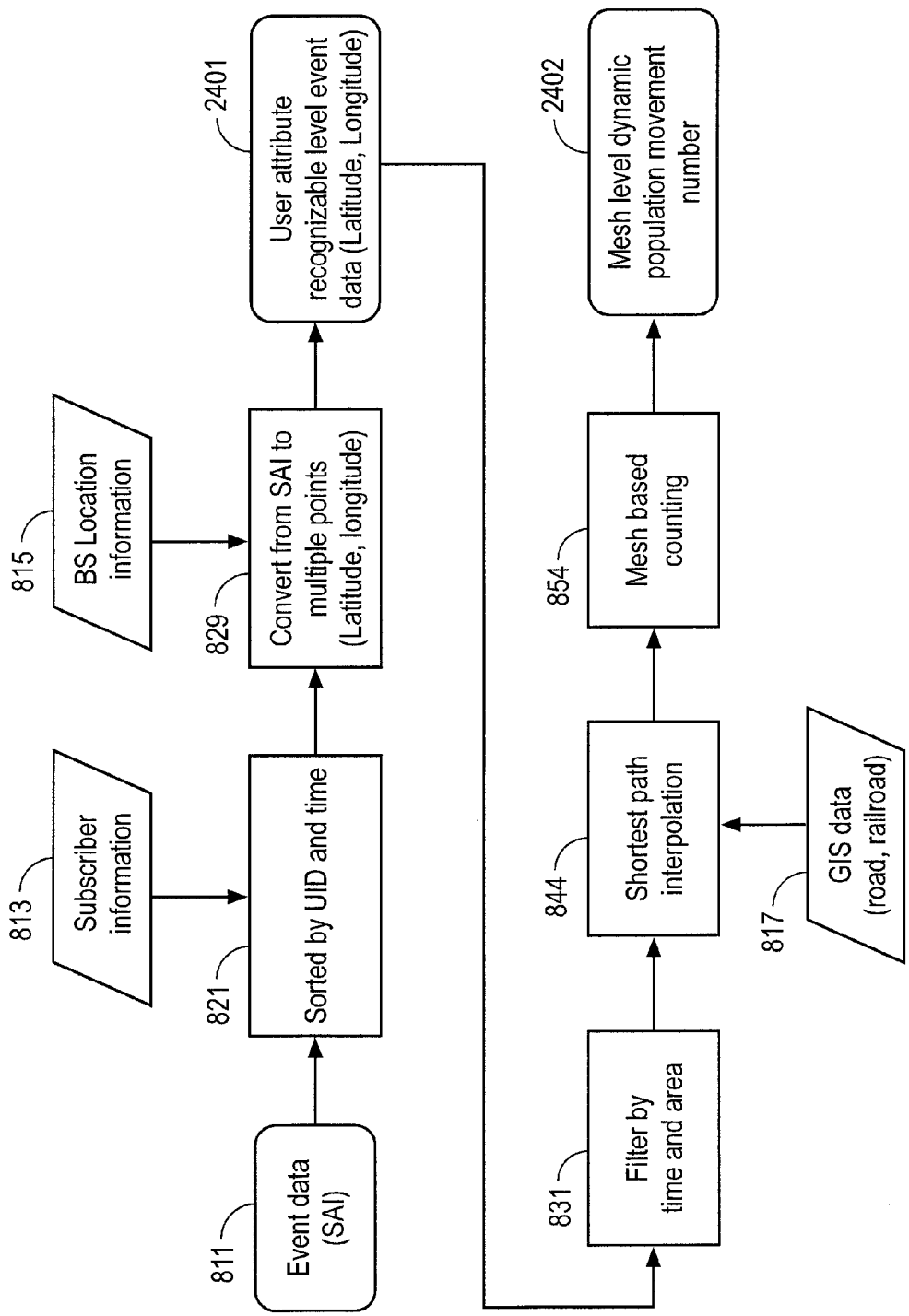
FIG. 24 is a flow diagram of one embodiment of a process for estimating a mobile user's trajectory using multiple points based shortest path algorithm and mesh based counting.

FIG. 24 is a flow diagram of one embodiment of a process for estimating a mobile user's trajectory using multiple points based shortest path algorithm and mesh based counting. The process is performed by processing logic that may comprise hardware (circuitry, dedicated logic, etc.), software (such as is run on a general purpose computer system or a dedicated machine), or a combination of both.

Referring to FIG. 24, the system receives event data 811 which contains SAI based user's location and sorts this data by UID and time with giving subscriber information 830 (processing block 821). Event data 811 is generated by PRM, LAU, and so on. Secondly, processing logic in the system converts SAI to multiple points using BS location information 815 (processing block 829) and filters by time and area (processing block 831). The multiple points come from the mesh centers which are covered by the sector in SAI. The probability comes from the coverage ratio. Finally, processing logic performs shortest path interpolation (processing block 854) and counts the mesh based population movement (processing block 854). The shortest path interpolation is applied to the data output from processing block 831 and creates estimated location data for consecutive event data using GIS data 817. By checking the estimated locations, processing logic in the system creates a mesh level dynamic population movement number 2402 in each sector under the time periods and the area specified in the filtering of processing block 831.

Dynamic Travel Behavior Estimating Using Geographic Information

Methods and apparatuses for dynamic population migration estimation and counting in mobile network are presented below. It is to be understood that the following example(s) is (are) for the purpose of explanation and not limitation.

Figure 25:
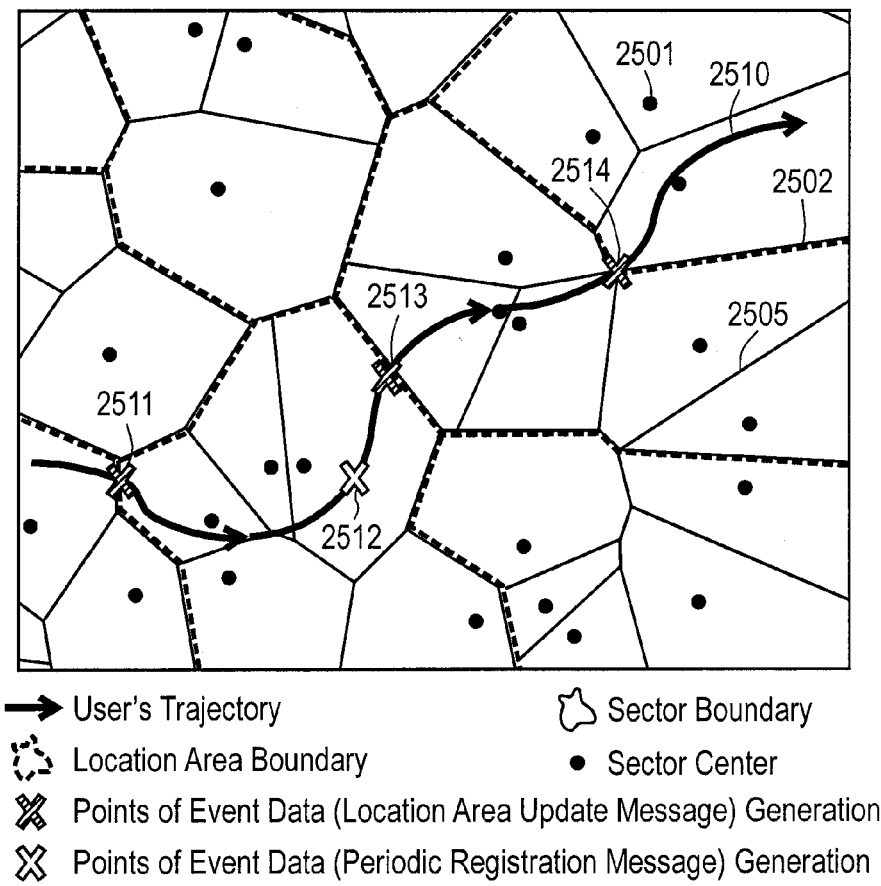
FIG. 25 illustrates a user's actual trajectory and event data associated therewith.

FIG. 25 illustrates a user's actual trajectory. Referring to FIG. 25, the user's actual trajectory 2510 and the event data are shown. The LA boundary 2502 covers some sectors 2505 which has sector centers 2501 calculated by position and wireless signal coverage of cell tower 103 (FIG. 1 with sector 105). The location area update (LAU) messages 2511, 2513, 2514 are generated by the LA boundary crossing, and the periodic location update message 2512 is generated after a certain period of time from the last event data transmission 211. The frequency of periodic location update transmission depends on the mobile network operators.

Referring back to FIG. 1, the mobile travel behavior server 161 is a set of tools that captures, stores, analyzes, manages, and present data that are linked to information stored at the mobility server 121, the subscriber data server 131 and the geographical data base server 151. Information stored and analyzed at the mobile traffic behavior server 161 will be able to be accessed by the third party user's server 171. The event data 2511, 2512, 2513, and 2514 has the sector-level location information and low frequency update because these event data will be received at the associated sector. The sector size depends on the area and may range from few hundreds of meters (urban areas) to few kilometers (rural areas).

A goal of one embodiment is to obtain the geographical distribution of users at a given time instant (hourly, daily, weekly, monthly, etc.) and to estimate the inflow and outflow of population migration between different geographical areas. In order to achieve this goal, the event data generated by the UE 101 is used and temporary or permanently stored in the mobility server 121. As discussed above, the BS receiving the event data will implicitly indicate a current location of the UE.

Figure 26:
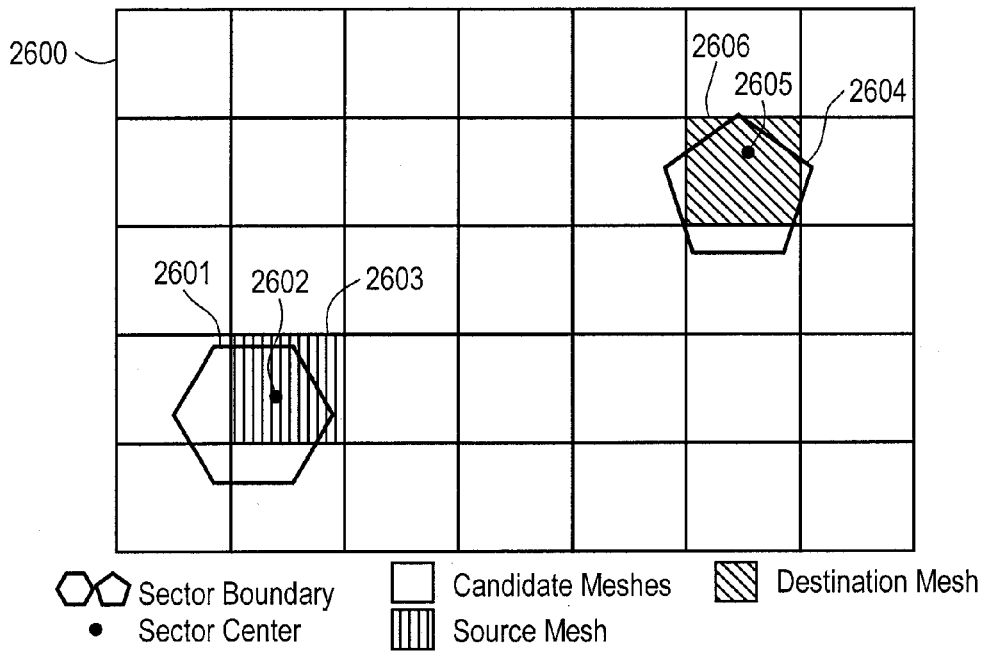
FIG. 26 illustrates start and destination mesh selection based on sector center according to one embodiment.
Figure 27:
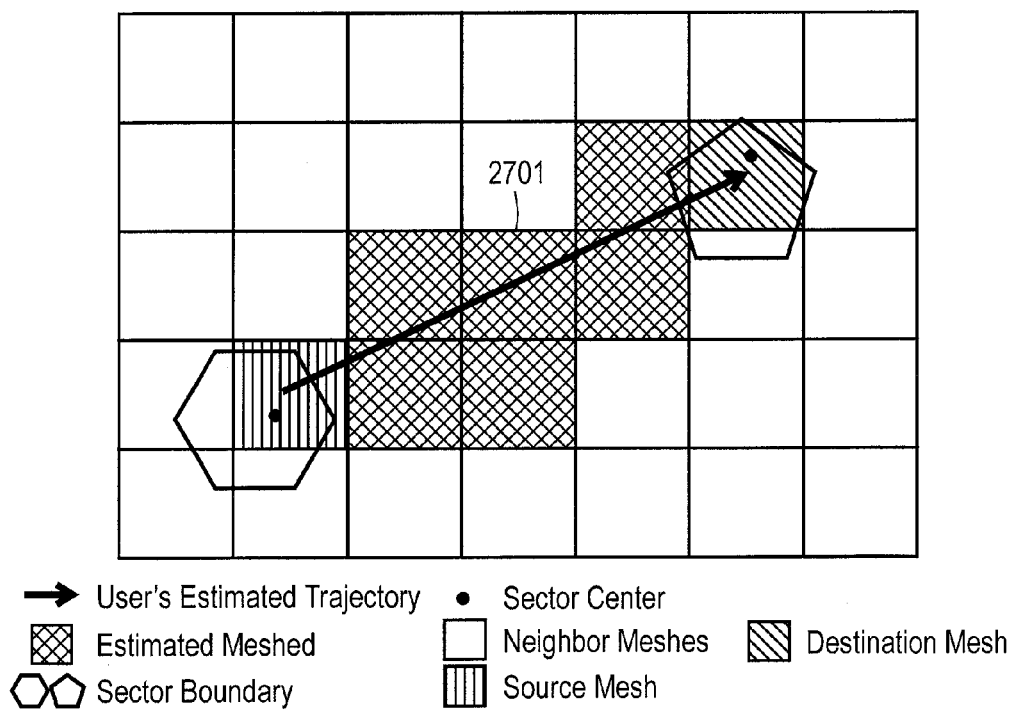
FIG. 27 illustrates an estimated trajectory using mesh based straight line algorithm according to one embodiment.

In order to obtain the geographical distribution of users, a predefined grid level granularity is used. FIG. 26 illustrates start and destination mesh selection based on sector center. Referring to FIG. 26, the predefined guide level granularity 2600 is shown. The entire geographical service region of a wireless network is divided into meshes using grid lines. Embodiments of the present invention estimate the sequence of meshes which the UE has traversed. This is referred to herein as "mesh based trajectory estimation". The mobile travel behavior server 161 chooses the source and destination meshes for the mesh based trajectory estimation. One approach is to choose the mesh that includes the sector center point of the sector received the event data. According to the above mesh selection, in FIG. 26 the mesh 2603 and 2606 are selected as the source mesh and the destination mesh, respectively. The selected meshes contain the sector center point 2602 and 2605 of the sector. One of the estimation algorithms estimates the UE's travel trajectory using the straight line approach. FIG. 27 illustrates an estimated trajectory using mesh based straight line algorithm. Referring to FIG. 27, the straight line approach estimates intermediate meshes 2701 from the source and destination meshes 2603, 2606 using a straight line between sector centers, 2602 and 2605. Another way is to use straight line between mesh centers.

Figure 28:
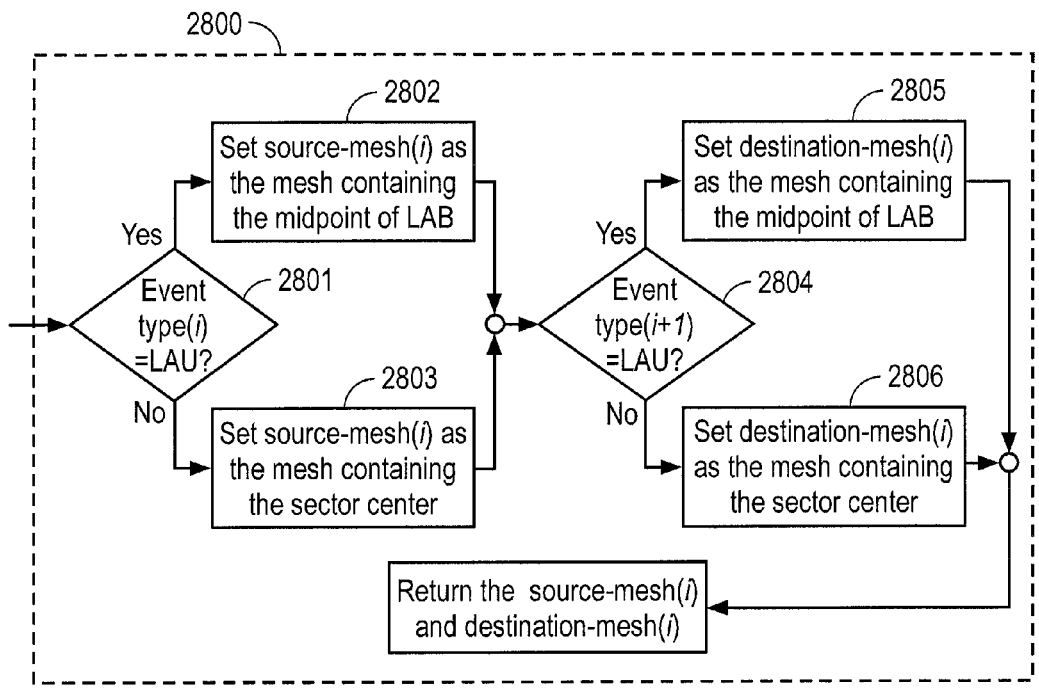
FIG. 28 is a flow diagram of one embodiment of a process for defining start and destination location definition for dynamic travel behavior estimation.

FIG. 28 is a flow diagram of one embodiment of a process for defining start and destination locations for dynamic travel behavior estimation. This is done by looking by examining the type of event data. The process is performed by processing logic that may comprise hardware (circuitry, dedicated logic, etc.), software (such as is run on a general purpose computer system or a dedicated machine), or a combination of both.

Referring to FIG. 28, the flow diagram examines the event data generation type or event type and determines the source and destination meshes according to the type. Since the event data is categorized into several event data, each event data indicates the type of the event data in the message.

Processing logic receives event data and determines if its type is LAU (processing block 2801). If the event type of the first event data indicates it is a LAU message, such as 2511, 2513, 2514, then processing logic sets source-mesh(i) as the mesh containing the midpoint of the location area boundary (LAB)(processing block 2802). If the event type is a periodic registration message, such as 2512 or otherwise, processing logic sets source-mesh(i) as the mesh containing the center of the data generation sector (processing block 2803).

The process repeats in order to determine the destination-mesh(i) 2804, 2805, 2806. The above process is one way for determining the source-mesh(i) and destination-mesh(i) as in 2800, and it is also available to search the most probable geographical point using GIS data and set the source and destination-meshes as the meshes containing those most probable points. Another way to determine source-mesh(i) and destination-mesh(i) is to examine the whole sequence of the event data of the UE and determines the most probable points based on this historical information of the UE.

Figure 29:
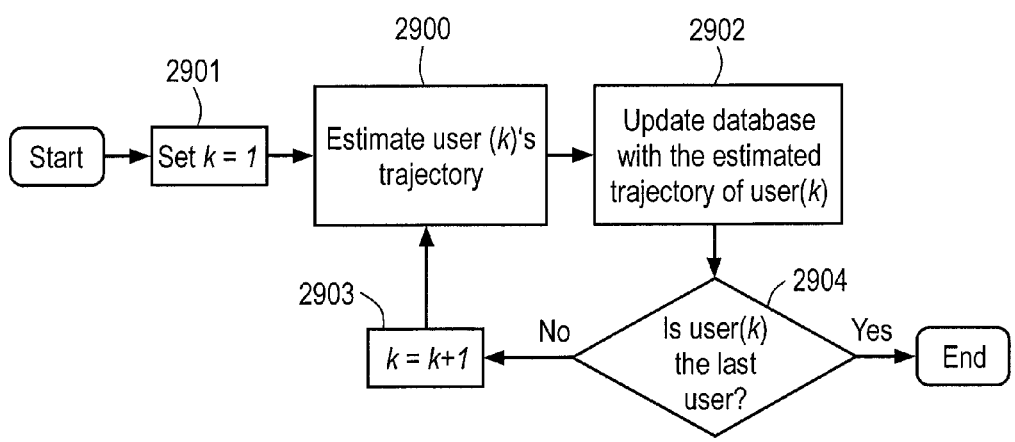
FIG. 29 is a flow diagram of one embodiment of a process for estimating target user's travel behavior.

FIG. 29 is a flow diagram of one embodiment of a process for estimating a target user's travel behavior. The process is performed by processing logic that may comprise hardware (circuitry, dedicated logic, etc.), software (such as is run on a general purpose computer system or a dedicated machine), or a combination of both.

Referring to FIG. 29, in order to obtain the intermediate locations between event data, processing logic in the mobile travel behavior server 161 estimates UE's trajectory by first setting variable k equal to 1 to represent the first user (processing block 2901). Next, processing logic estimates user(k)'s trajectory (processing block 2900). After estimating the user(k)'s trajectory, the estimation process updates a database storing the estimated trajectory and other relevant information about user(k) (processing block 2902) and checks to see if there are more UEs (processing block 2904). If so, the estimation process repeats this process for other users by increasing variable k by 1 (processing block 2903) and transitioning to processing block 2900.

Figure 30:
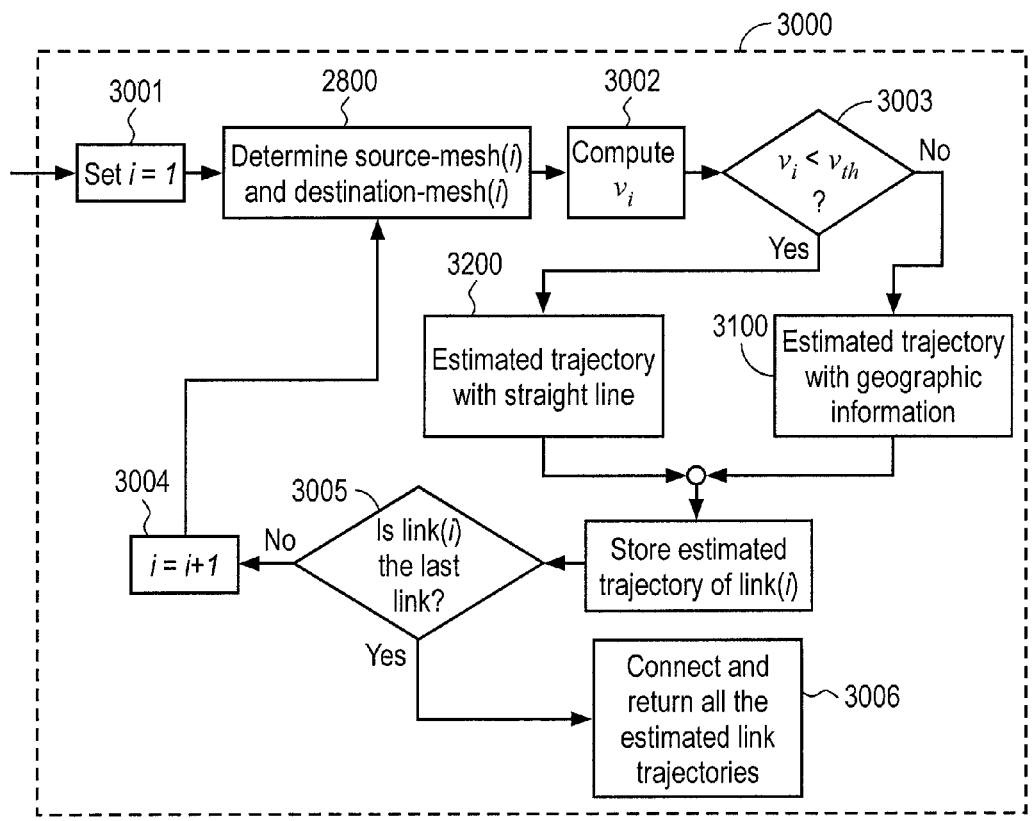
FIG. 30 is a flow diagram of one embodiment of a process for selecting an algorithm for dynamic travel behavior estimation.

FIG. 30 is a flow diagram of one embodiment of a selection process for dynamic travel behavior estimation. The process is performed by processing logic that may comprise hardware (circuitry, dedicated logic, etc.), software (such as is run on a general purpose computer system or a dedicated machine), or a combination of both.

Referring to FIG. 30, the estimation algorithm analyzes each two consecutive operational data generations of the UE (hereafter referred to as "i-th link, link(i)") starting from the first link identified by i=1 (processing block 3001). One example of the links of a UE is (2512, 2513) in FIG. 25. The process determines two meshes referred to as source-mesh(i) and destination-mesh(i) for each link(i) as in 2800 of FIG. 28. Next, the processing logic computes approximate movement speed $v_i$ of the UE using the first and the next event data (processing block 3002). Note that the event data contain the times the data was generated and the SAI to which the UE belongs at the time of generation. Using sector center locations that are converted from the SAIs of the source and destination sectors, for example, the movement speed of the UE within the two data generation points can be approximated.

Processing logic compares movement speed $v_i$ to a threshold $v_{th}$ (3003). More specifically, the result of the comparison dictates which of the two trajectory estimation techniques are used: a straight line technique with no probability assignment or a geographic information-based technique that uses probability assignments. If the computed approximate speed is less than a predefined threshold speed, the processing logic estimates the partial trajectory corresponding to the link(i) by interpolating the source and destination meshes with the straight line approach 3200 in FIG. 32. If the computed approximate speed of the UE is faster than the threshold speed, the process utilizes geographic information & transport network information 3103 located in the geographic data base server 151 of FIG. 1 to estimate the partial trajectory corresponding to the link(i) 3100 in FIG. 31.

After completing the analysis of the link(i), processing logic increments variable i to analyze the next link (processing block 3004) and repeats the process until all the links have been processed (processing block 3005). After completing analyses of all links, processing logic connects all the estimated link trajectories and returns the complete estimated sequence of meshes (processing block 3006).

Note that the process in FIG. 30 is shown with only one predefined threshold speed in processing block 3003, but it can set multiple values as the threshold speeds to select trajectory estimation methods. Furthermore, the process may use the distance of links to select trajectory estimation method.

Figure 31:
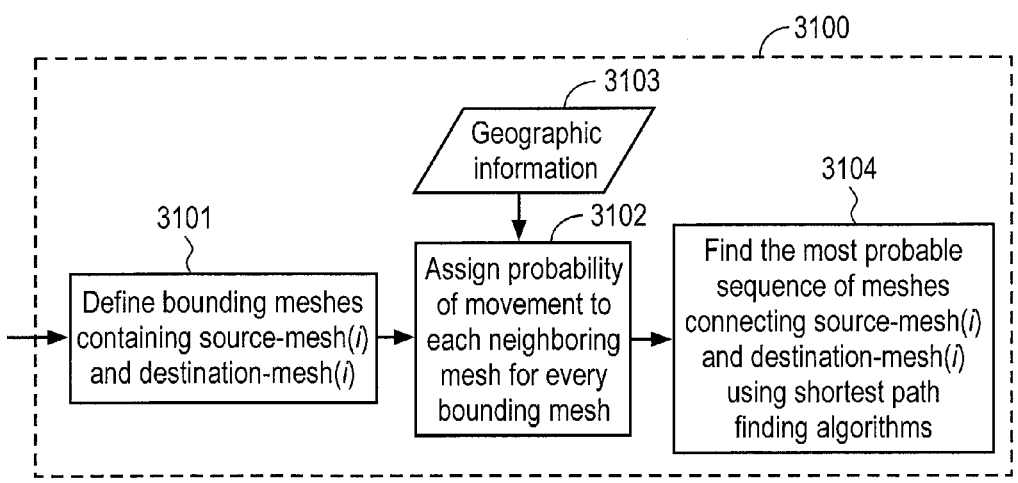
FIG. 31 is a flow diagram of one embodiment of a process for estimating a trajectory using GIS based probability assignment.
Figure 32:
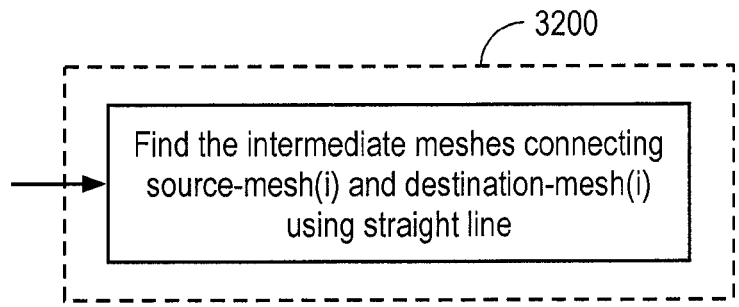
FIG. 32 is a flow diagram of one embodiment of a process for trajectory estimation using a straight line.

FIG. 31 is a flow diagram of one embodiment of a process for a trajectory estimation using GIS based probability assignment. The process is performed by processing logic that may comprise hardware (circuitry, dedicated logic, etc.), software (such as is run on a general purpose computer system or a dedicated machine), or a combination of both.

Referring to FIG. 31, the process to estimate trajectory with geographic information begins by defining boundary meshes which contain source- and destination-mesh(i) (processing block 3201). One example is a rectangular region containing the source and destination-meshes with some extra marginal meshes around them. Another example is to define an ellipse containing the source and destination meshes.

After defining the bounding meshes, processing logic assigns a probability of movement from a mesh to each neighboring mesh for all meshes in the bounding region (processing block 3202). These probability assignment processes utilizes geographic information 3103 as well as transport network information such as geographic map information and traffic information. In one embodiment, the process assigns a higher probability of movement from a mesh to the neighboring mesh which has larger mobility. One way of measuring the mobility could be counting the number of roads, the number of railroads, the road width, the volume of traffic, and/or the number of trains per hour connecting the current mesh to each neighboring mesh. From the counts, the process may assign higher probabilities to neighboring meshes with higher counts. After assigning a probability of movement, processing logic finds the most probable sequence of meshes connecting source-mesh(i) and destination-mesh(i) using one or more shortest path finding algorithms. That is, processing logic examines every pair of meshes and the associated probability of movement to determine which pair has the highest and then combines those having the highest probability into one mesh sequence.

Figure 33:
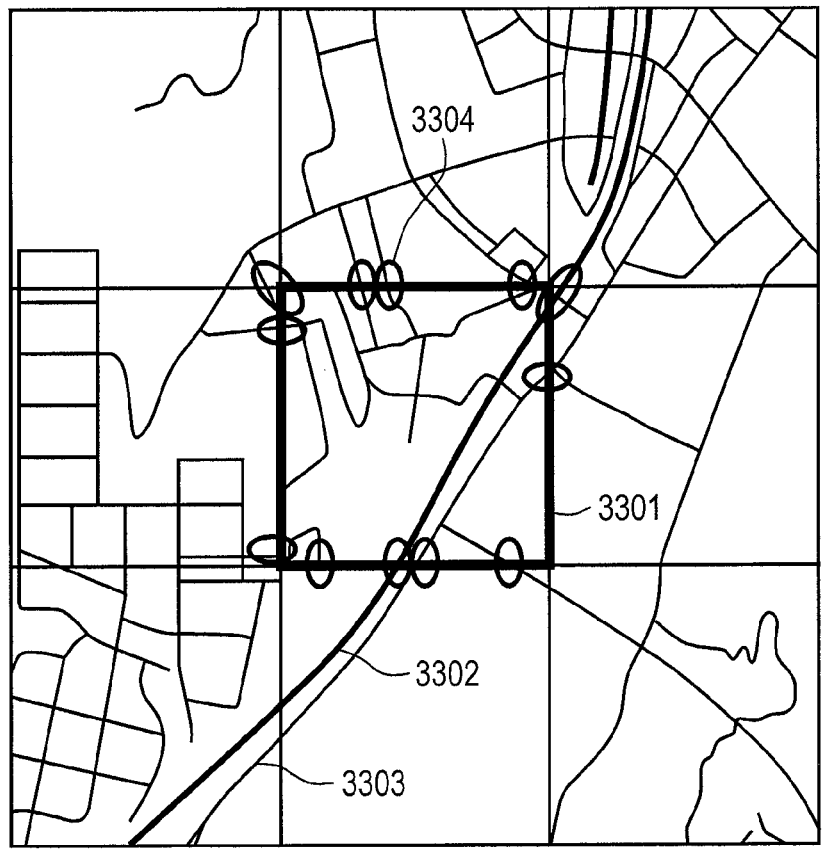
FIG. 33 illustrates transport network information for probability assignment according to one embodiment.

FIG. 33 illustrates transport network information for probability assignment. Referring to FIG. 33, the example area contains transport 3301, road 3303 and railroad 3302. The circles 3304 are inter connection roads or railroads between target mesh 1001 and neighbor meshes.

Figure 34:
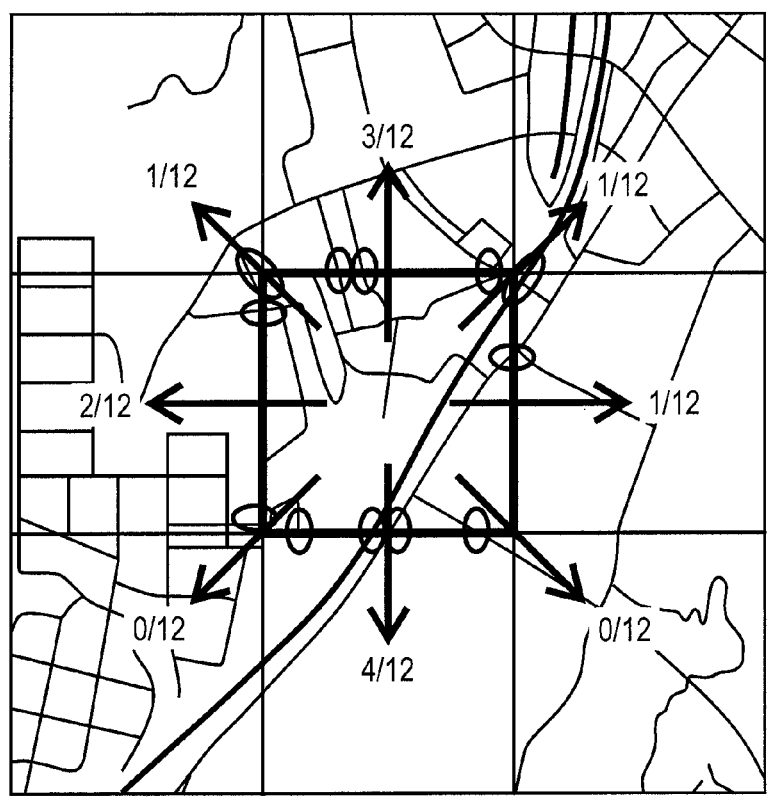
FIG. 34 illustrates an example of probabilities assignment according to one embodiment.

FIG. 34 shows an example of probabilities assignment according to one embodiment. Referring to FIG. 34, the process assigns a probability of movement to each of the meshes. In one embodiment, the probability calculation is the number of one directional connections divided by total connections. Thus, in the case of 12 connections, the probabilities range from 0/12 to 4/12 in FIG. 34. Note that higher probabilities can be assigned according to consideration of road/railroad (or other travel means). For example, if there are many roads and/or railroads present between two meshes, the probability of movement between the two meshes may be higher than if such conditions did not exist.

Figure 35:
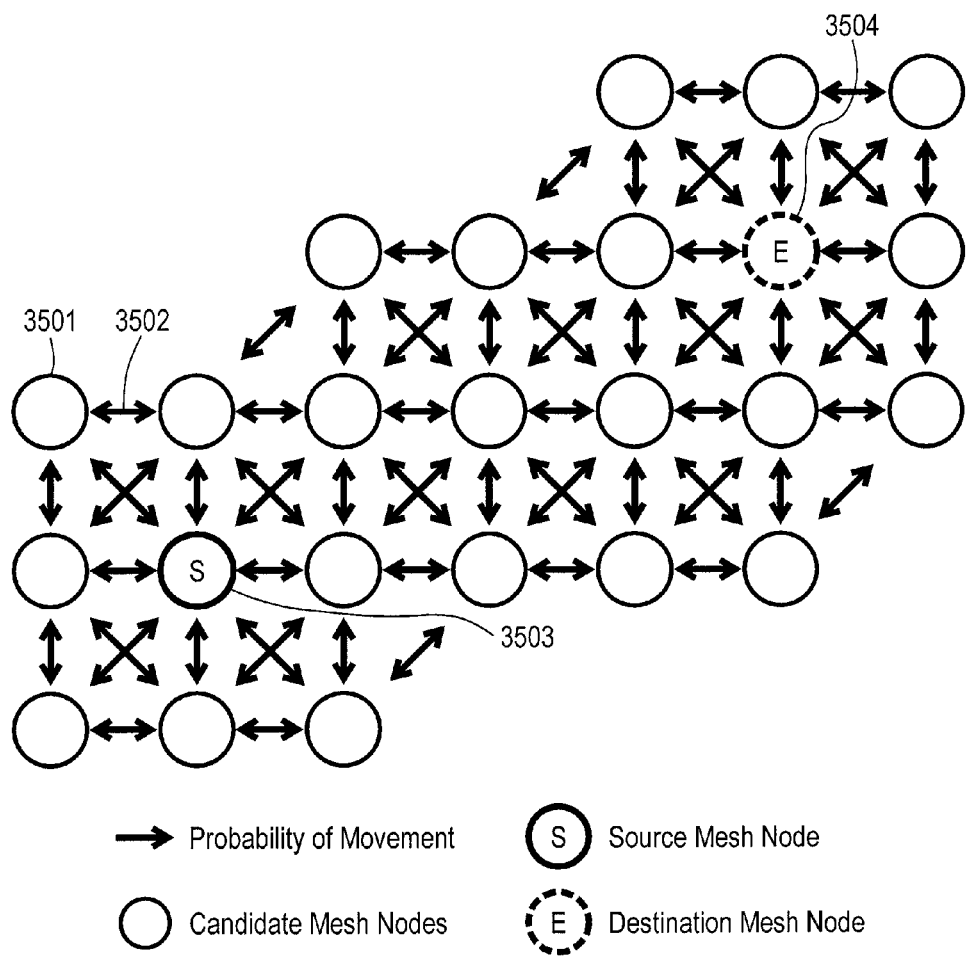
FIG. 35 illustrates a graph structure for mesh based shortest path algorithm according to one embodiment.
Figure 36:
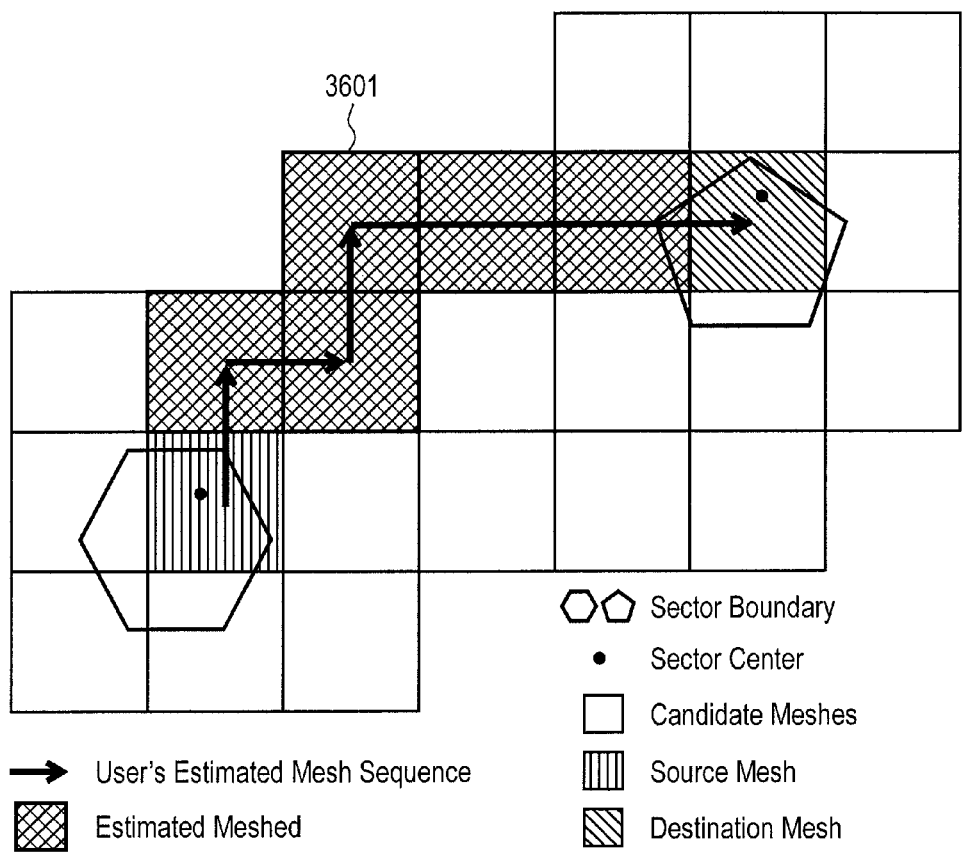
FIG. 36 illustrates an estimated trajectory using mesh based shortest path algorithm (start: sector center, destination: sector center) according to one embodiment.
Figure 37:
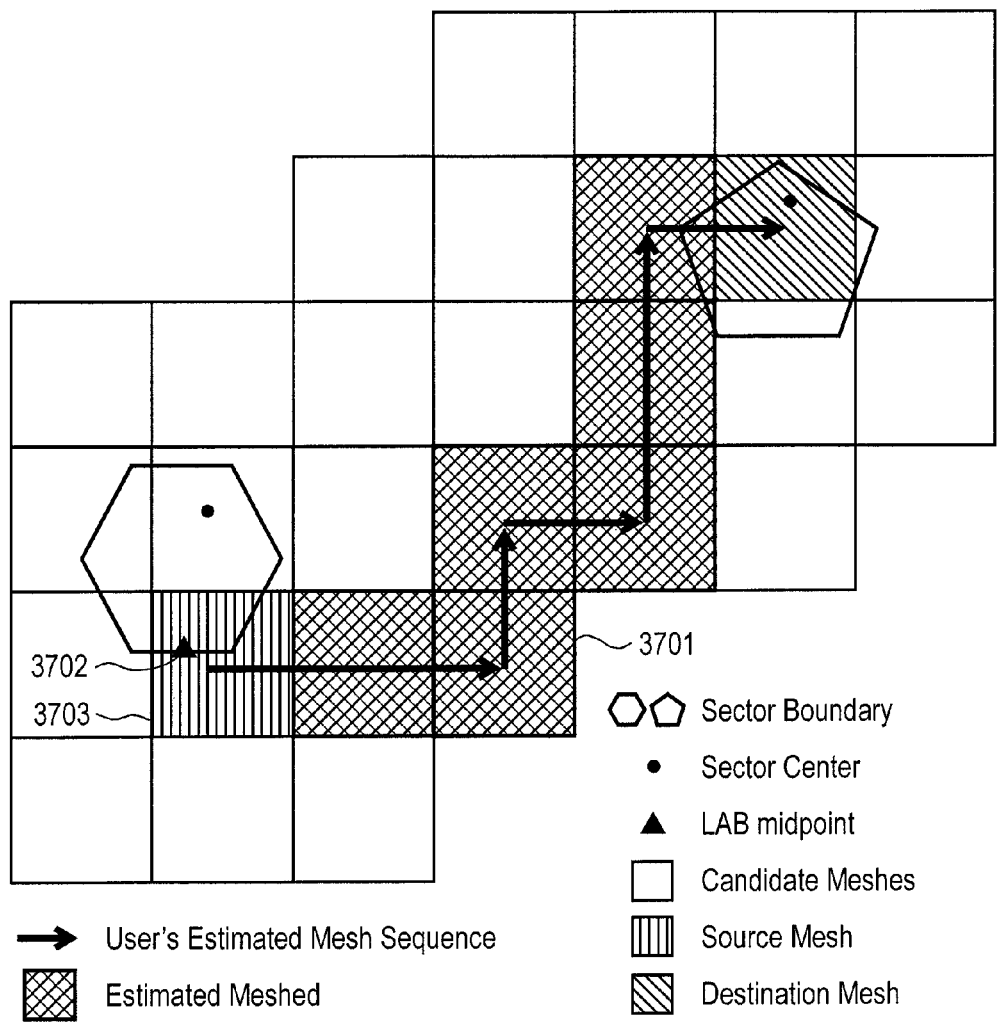
FIG. 37 illustrates an estimated trajectory using mesh based shortest path algorithm (start: sector edge, destination: sector center) according to one embodiment.

FIG. 35 illustrates a graph structure for mesh based shortest path algorithm. In FIG. 35, the process constructs a graph that adopts the ellipse containing the source and destination-meshes. Each bounding mesh 2600 in FIG. 26 is replaced by a node 3501 (i.e., a one-to-one correspondence) and each node has directed edges to neighboring bounding meshes. These directed edges are assigned a value 3502, the probability of movement that were computed in processing block 3102 in FIG. 31. The node corresponding to the source mesh 2803 and the destination mesh 2806 are denoted as the start mesh node 3503 and the destination-mesh node 3504, respectively. Using a shortest path finding algorithm such as, for example, like Dijkstra's algorithm, A* algorithm, Bellman-Ford algorithm, or Floyd-Warshall algorithm, an estimated trajectory 3601 is generated in FIG. 36. If the algorithm detects a different event type, such as LAC in source, the source mesh 3703 will be different position by using midpoint of the LAB 3702 and the estimated trajectory 3701 will be different, as shown in FIG. 37, which illustrates an estimated trajectory using mesh based shortest path algorithm (start: sector edge, destination: sector center). In essence, a probability is assigned to each of the arrows depicted in FIG. 35.

Population Tracking and Counting Using Mobile Operational Data

Figure 38:
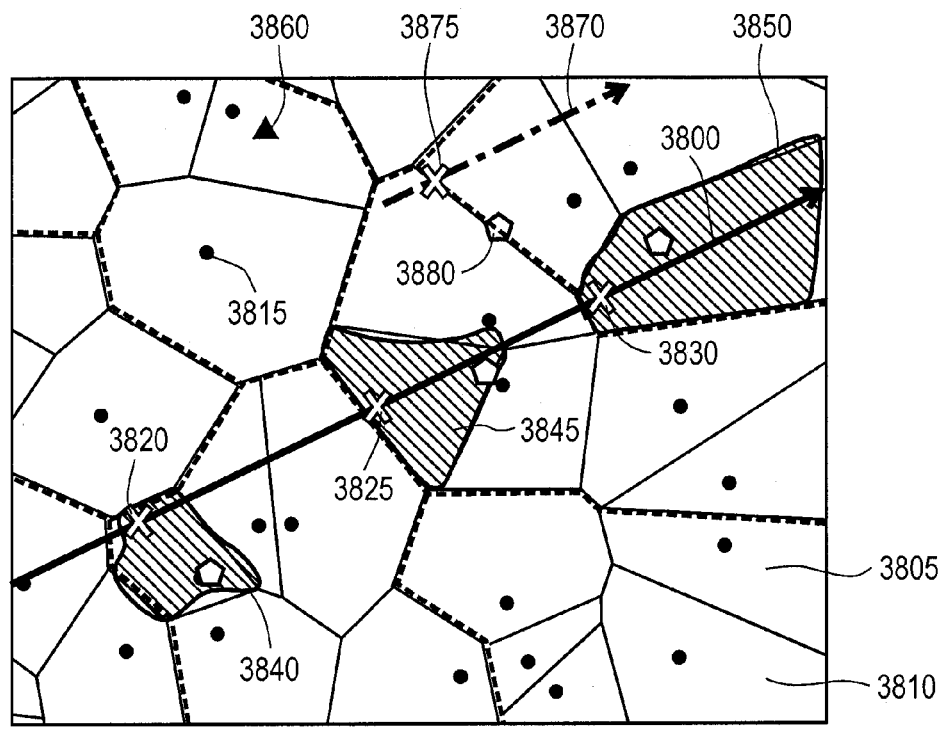
FIG. 38 illustrates the trajectory of a mobile user, underlying cellular sectors, and operational data message locations during the mobile user's trajectory according to one embodiment.

FIG. 38 illustrates a trajectory of a mobile user, underlying cellular sectors, and operational data message locations during the mobile user's trajectory. This represents a system model for tracking of mobile users using the operational data of a cellular operator. Consider a sample trajectory of a mobile user as given in 3800. This mobile user moves through different sectors 3840, 3845, 3850, whose size may range from few hundreds of meters (urban areas) to few kilometers (rural areas) as discussed before. The sector centers are marked with small circles 3815 located within each sector. In one embodiment, boundaries of the sectors 3810 are given by the Voronoi diagram that takes inputs as the sector centers. Multiple sectors are combined to form LAs, whose boundaries are marked as in 3805.

In one embodiment, the operational data of a mobile user primarily comprises two messages that are transmitted by the UE: PRMs, and LAUs. PRMs are periodically transmitted by each UE, for example, within one hour intervals (see e.g., 3820, 3825, 3830). Even if the UE is stationary, the PRM is transmitted by the UE to its serving BS. The LAU, on the other hand, is triggered whenever a UE crosses the boundary of an LA 3805. An example for a different UE's trajectory 3870 is shown in FIG. 38, where the LAU is triggered at the true location 3875. In one embodiment, the following important information are included as a part of both the PRM and LAU messages: sector ID, location area ID, time-stamp (with a granularity of one second), and update type (i.e., PRM or LAU). For example, consider that three LAU messages are transmitted by the UE at corresponding locations 3820, 3825, and 3830. These LAU messages uniquely represent the time-stamped sector information corresponding to the UEs, as specified by the shaded areas labeled by 3840, 3845, and 3850.

Figure 39:
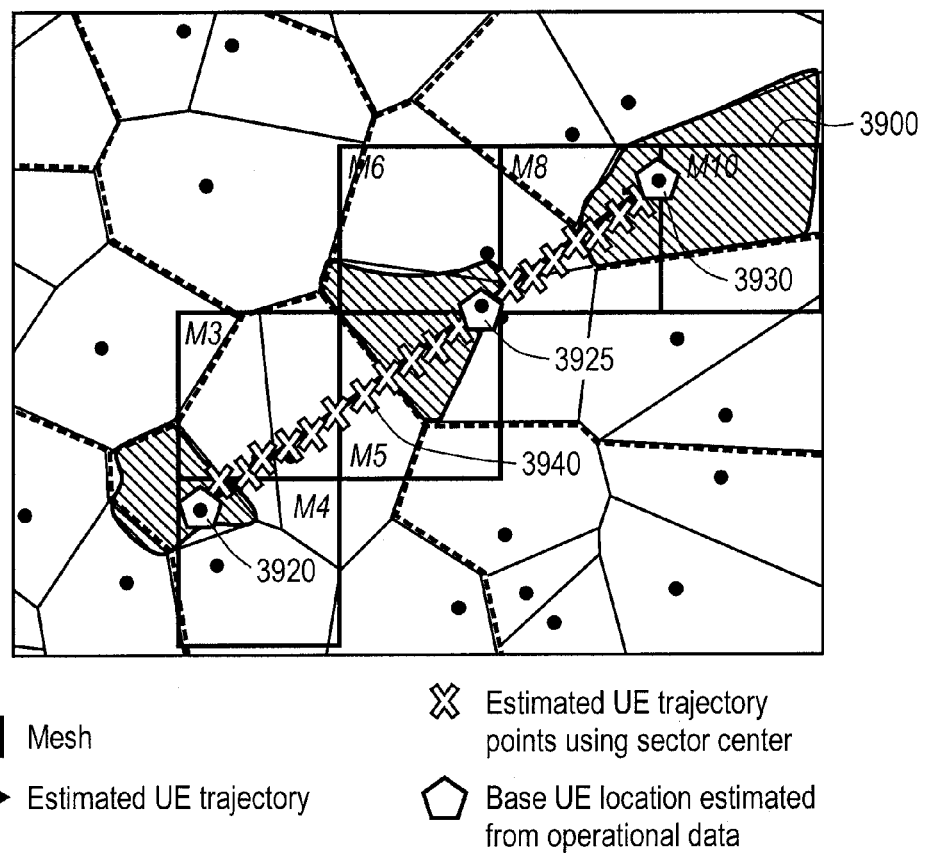
FIG. 39 illustrates an estimation of a mobile user's trajectory from operational data according to one embodiment.

FIG. 39 illustrates an estimation of a mobile user's trajectory from operational data. In one embodiment, the UE's location is mapped within the sector by mapping it to the sector center. For example, as shown in FIG. 39, the true UE locations 3820, 3825, 3830 in FIG. 38 can be mapped to sector centers 3920, 3925, and 3930 in FIG. 39. In an alternative embodiment, the UE's location is mapped within the sector by mapping it to the center of mass (COM) of the sector. In yet another alternative embodiment, for the case of LAU type of updates, the UE's location is mapped within the sector by mapping it to the center of the sector edge that overlaps with the location area boundary. If one is interested in having an estimate of the UEs locations for the time instants between the PRM messages and/or LAU messages, it is possible to interpolate (e.g., using a linear interpolation) the location estimates 3920, 3925, and 3930, and assign timestamps (with uniform time intervals) to the points on the interpolated line as shown by 3940.

In one embodiment, using the GIS information, related roads and railways that are close to the location estimates 3920, 3925, 3930 are accounted for, and a trajectory is constructed using such GIS data.

In one embodiment, the geographical area is partitioned into several levels of meshes 3900. The meshes are typically square-shaped, and their size may range from several tens of kilometers to several hundreds of meters. A typical mesh size considered for population counting/tracking purposes is 500 meters by 500 meters. For urban areas, a sector may contain only few meshes, while for rural areas, large number of meshes may be contained within a certain sector. When a mesh is used for capturing the mobile spatial statistics, an algorithm is used to accurately find the best mesh within a sector that best approximates a UEs location within the sector. For example, the algorithm may select the meshes that include hot-spot locations (e.g., those including train stations, shopping malls, etc.), or, it may map a high-speed user to a mesh that includes a highway, railroad, etc. The mapping algorithm will be discussed in more detail in conjunction with FIG. 42 and FIG. 46.

Thus, in one embodiment, the tracking and estimation techniques described herein: 1) accurately map the location of a UE within a given sector, and 2) find an accurate trajectory for a UE corresponding to the time intervals between the PRM messages and LAU messages. In one embodiment, the geographical area is partitioned to square-shaped meshes, and the location estimate for each UE is in the form of mesh ID. Note that the methods described herein are not limited to mesh-level location estimates, and can be easily extended to work with finer granularity location estimates.

Figure 40:
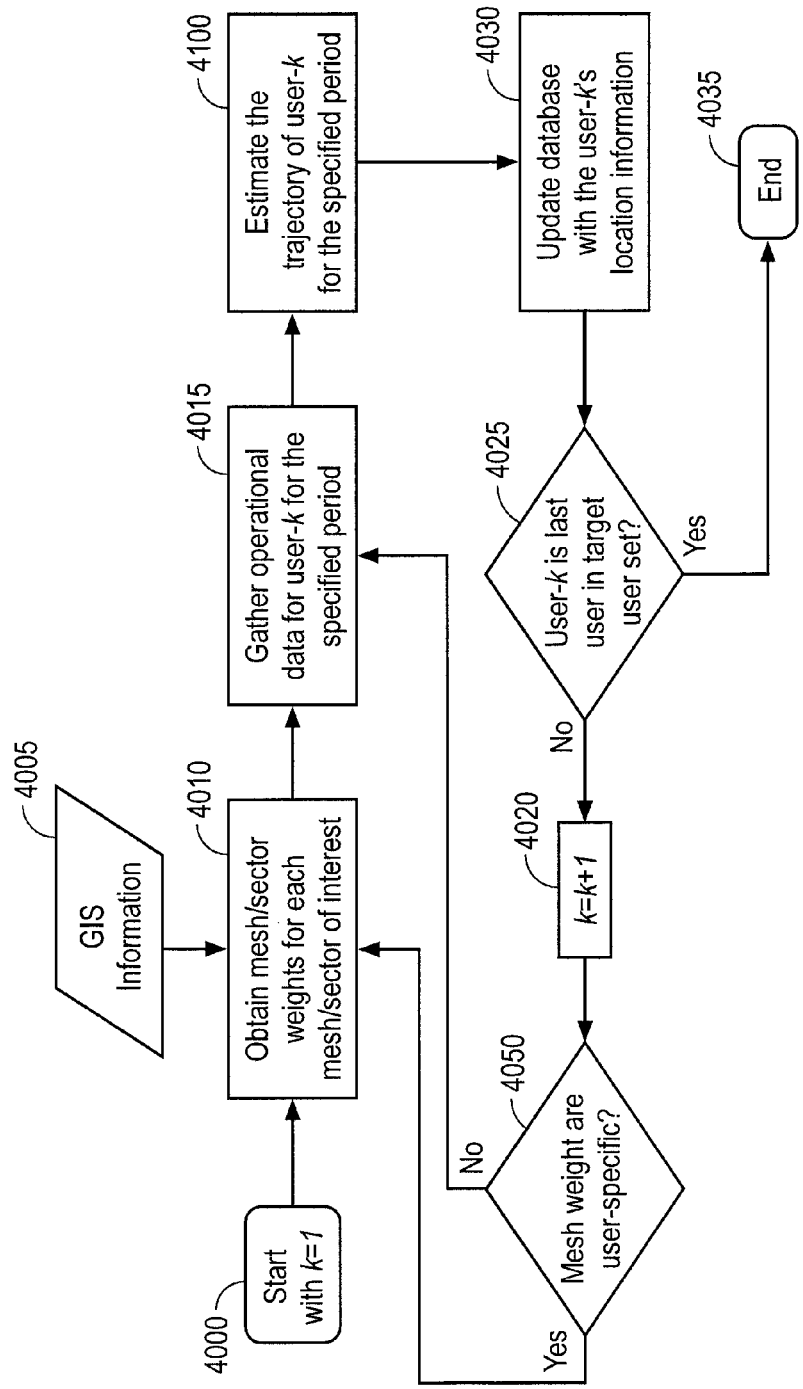
FIG. 40 is a flow diagram of a process for estimating users' trajectories from operational data.

FIG. 40 is a flow diagram of one embodiment of a process for estimating users' trajectories from operational data. The process is performed by processing logic that may comprise hardware (circuitry, dedicated logic, etc.), software (such as is run on a general purpose computer system or a dedicated machine), or a combination of both.

Figure 43:
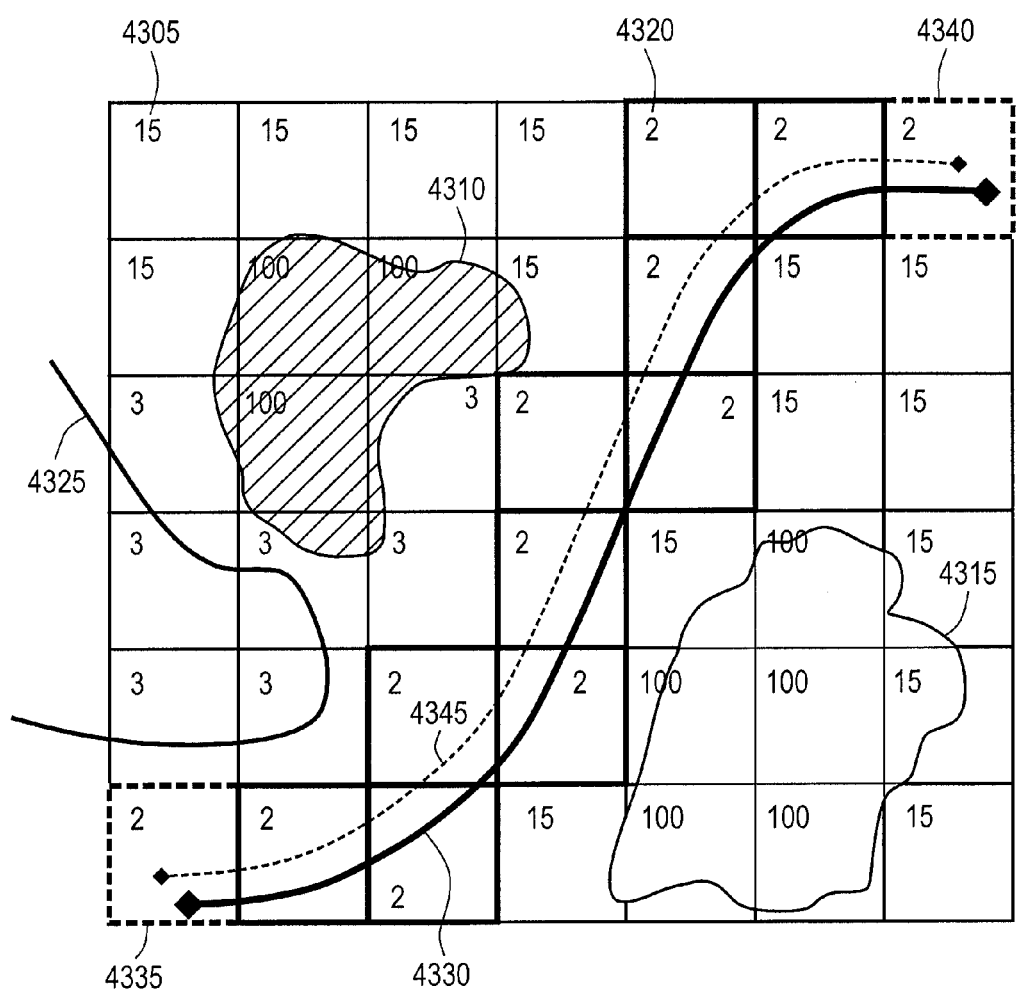
FIG. 43 illustrates an example for estimating of a mobile user's trajectory for a high-speed user according to one embodiment.

Referring to FIG. 40, the process begins by processing logic setting a variable k equal to one (processing block 4000) and receives the GIS information for the roads and trains are available (processing block 4005). Using this GIS information, processing logic obtains mesh weights corresponding to each mesh (processing block 4010). The mesh weights may be obtained in different ways using the GIS information, such as, for example, by considering the total length of the railroad and road networks within a mesh, their types, widths, number of crossings, connections with other meshes, presence of lake/pond, river, mountain, sea within a mesh, etc. While all these different approaches are possible, in one embodiment, only the information about the fastest time (e.g., in minutes) a person/vehicle can travel from one side of a mesh to the other side is used, and this metric is referred to herein as the minimum mesh pace (MMP). A rough estimate for this metric can be obtained from the maximum road-width parameter that is embedded within the GIS data, corresponding to the fastest road type (e.g., a highway, if there exists). An example assignment of MMP values for a sample scenario is given in FIG. 43, where there are two roads of different types. Referring to FIG. 43, meshes that include faster road type 4330 are all assigned the MMP values of 2 4320, while the meshes including the road with the slower pace 4325 (and no faster routes) are all assigned the MMP values of 3. If it is desired that certain road types are favored more (e.g., highways, fast railroads etc.), the pace values to be assigned to the meshes that contain these road types can be emphasized. This ensures that the estimated trajectory follows a fast road type even if the road makes large curvatures. The meshes that contain obstacles such as mountains, forests, lakes etc. 4310, 4315, are assigned large MMP values such as 100, while the meshes with no roads/obstacles 4305 are assigned an MMP value close to the walking pace of a human, e.g., 15. How these mesh weights will be used for mesh sequence estimation algorithm will be described in more detail later below.

Referring back to FIG. 40, after obtaining the mesh weights, processing logic extracts the operational data (PRMs, LAUs, and any other location update messages such as power-on and power-off messages) for a specific user (processing block 4015). In another embodiment, all the users' operational data may be jointly processed in order to gather valuable information that may be useful for population tracking, such as the group mobility information. After extracting the operational data, processing logic estimates the mesh sequence corresponding to the specified time interval for user-k (processing block 4100) and stores this data in a database (processing block 4030). Thereafter, the same procedure is repeated for all the users of interest 4025, 4020, 4050. Once the database is obtained (at processing block 4030), processing logic uses this database for various purposes as discussed above, such as, for example, urban planning, improved traffic planning, and disaster prevention, etc.

Figure 41:
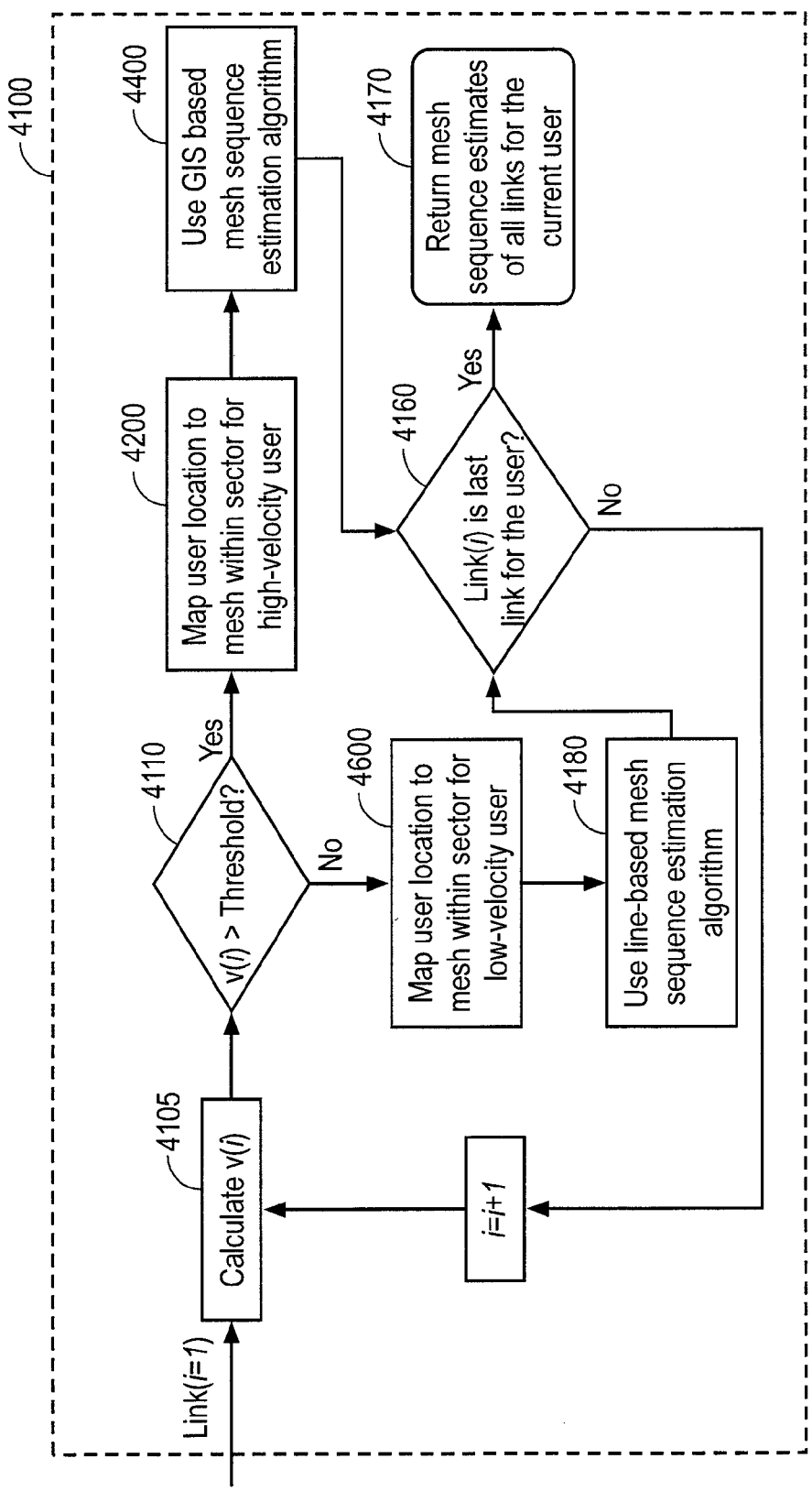
FIG. 41 is a flow diagram of a process for estimating a mobile user's trajectory from operational data.

FIG. 41 is a flow diagram of one embodiment of a process for estimating a mobile user's trajectory from operational data. The process is performed by processing logic that may comprise hardware (circuitry, dedicated logic, etc.), software (such as is run on a general purpose computer system or a dedicated machine), or a combination of both.

Referring to FIG. 41, processing logic uses a velocity estimate of a UE in order to apply two different mesh sequence estimation algorithms. Let the i-th trajectory between the two location updates be defined as link-i. Starting with i=1, processing logic first estimates the velocity for the i-th link of the k-th user (processing block 4105) as follows $$\hat{v}(i) = \frac{\sqrt{(x(i+1)-x(i))^2 + (y(i+1)-y(i))^2}}{t_{i+1}-t_i}, \quad (1)$$

where x(i) and y(i) are the latitude and longitude (in kilometers) of a UE's location estimate corresponding to the i-th location update (PRM, LAU, etc.), respectively, and t, is the time instant for the i-th location update. Note that this estimated velocity will typically be lower than the true velocity of a UE, since the above equation considers a linear shortest-flight trajectory between the source and destination locations, and the true trajectory may be longer due to possible curvatures of the roads etc. Another error source in velocity estimation is that the coordinates [x(i), y(i)] are the estimated coordinates within a sector, and the true coordinates may have large errors that may be on the order of the sector size.

Once a reasonable estimate is obtained for a UE's velocity for the i-th link, processing logic compares this velocity with a threshold velocity (processing block 4110). An example threshold velocity may be 20 km/hour, which may be a typical value that can be used to distinguish whether the mobile user is using a high-speed vehicle (e.g., car, train, etc.) or not. If the estimated velocity is larger than the threshold velocity (e.g., a high-speed user), the user-location to mesh mapping and GIS-based mesh sequence estimation are performed based on 500 and 600 for high-speed users; otherwise, the user to mesh mapping and line-based mesh sequence estimation are performed based on 700 and 800 for low-speed users.

One reason to distinguish high-speed and low-speed users is as follows. For low-speed users, the distance traveled between two location updates is typically very small. Using complex mesh sequence estimation techniques for such small distances may have following disadvantages: 1) they may unnecessarily try to enforce complex routes between the source and destination, while people would typically try to go through a shortest linear path to their destination for short distances (e.g., while walking), and 2) the computational complexity for using the GIS information and accurate trajectory estimation may be large. Note that in one embodiment the location update types (LUTs) for low-speed users are limited to PRMs, and there is a lower number of links within a given time-frame compared to high-speed users. Moreover, even if the linear approximation is not accurate, the estimation error (if any) will be negligible due to small number of meshes involved in the true trajectory. On the other hand, for high-speed users, linear approximation for the trajectory between the source and target sectors may yield large estimation errors, where the number of meshes between the source and destination may be on the order of hundreds. Therefore, more accurate mesh sequence estimation techniques that rely on GIS information should be utilized for high-speed users.

Figure 42:
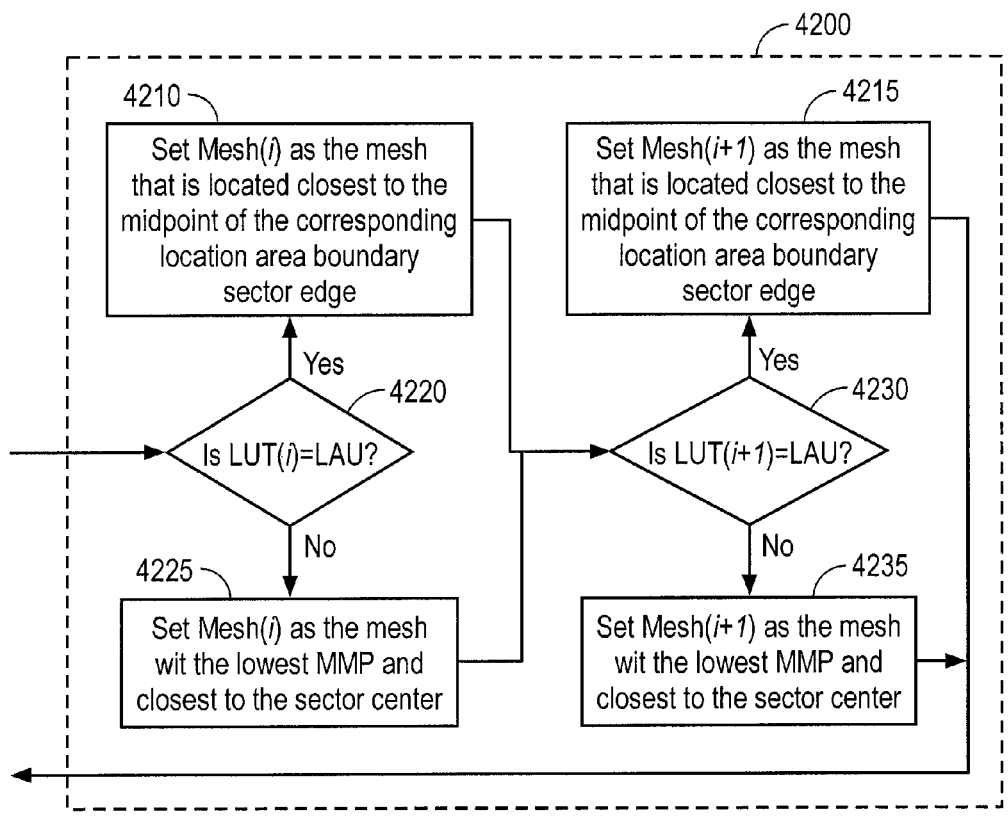
FIG. 42 illustrates mapping a mobile user's location onto a mesh within a given sector for high-velocity users according to one embodiment.

FIG. 42 is a flow diagram of one embodiment of a process for mapping a mobile user's location onto a mesh within a given sector for high-velocity users. The process is performed by processing logic that may comprise hardware (circuitry, dedicated logic, etc.), software (such as is run on a general purpose computer system or a dedicated machine), or a combination of both.

Referring to FIG. 42, if a certain link is labeled to be a high-speed link, first, processing logic maps a user location to an appropriate mesh within its sector as shown. The mapping algorithm utilizes the fact that the user is a high-speed user, and assumes that the user is using a fastest route within the sector. First, processing logic checks whether the location update type (LUT) of index-i is an LAU or a PRM (processing block 4220). If the LUT is the LAU message type, then it means that the user is crossing a location area boundary. Therefore, the ambiguity regarding the location of the UE decreases from the sector-level to sector-edge level, and a user may be more accurately mapped to a mesh within the sector. In one embodiment, processing logic maps the user's location to the midpoint of the sector edge of the corresponding location area boundary (LAB) (processing block 4210). An example for this is presented in FIG. 38, where the true location 3875 is mapped onto the midpoint of the sector edge 3880 that overlaps with the LA. Then, Mesh(i), which denotes an estimate for the index of the mesh that contains the UE during the i-the location update can be set as the mesh that is located closest to the midpoint of the sector edge. If the LUT(i) is not the LAU type, processing logic obtains a location estimate based on the PRM, which only provides the sector ID information. For high-speed users, it is reasonable to set Mesh(i) as the mesh with the lowest MMP and closest to the sector center (processing block 4225). This approach, by avoiding to always map the UE location to the mesh located at the sector center, improves the mapping accuracy through avoiding mappings to low-MMP meshes for high-speed users. Alternatively, GIS information may be used. For example, if a highway or shopping mall exists, the user's mobile location may be mapped to it.

In another embodiment, multiple velocity thresholds may be considered at processing block 4110 in order to more accurately characterize a user's speed; this information may be then used to more accurately map a user's location to mesh within a sector, considering different MMP values of the meshes within the sector. In yet another embodiment, high population areas in a sector can be obtained using the GIS information (e.g., train stations, schools, shopping malls, etc.), and these locations can be used as a candidate of a user's location.

In FIG. 42, once an estimate is obtained for Mesh(i), processing logic performs a similar procedure to obtain an estimate for Mesh(i+1) as well in processing blocks 4230, 4215, 4235. Note the process for Mesh(i+1) may be run in parallel with the process for Mesh(i) Therefore, before processing block 4400 of FIG. 41, estimates for the start-mesh and the end-mesh for link-i become readily available. At processing block 4400, processing logic applies a mesh sequence estimation algorithm to Mesh(i) and Mesh(i+1) that relies on the mesh weights obtained in FIG. 40 at processing block 4010 based on the GIS data 4005. A general solution that finds the sequence of meshes with closest match to the time constraint between the two location updates characterizing link-i can be written as $$s(i) = \underset{s_c(i)}{\operatorname{argmin}} \left| \Delta t_i - \sum_{j \in s_c(i)} P(j) \right| \quad (2)$$

such that $$s_c(i) \in CS(x(i+1), x(i)),$$

where $\Delta t_i = t_{i+1} - t_i$ (the difference in time between the start and end points), P(j) is the MMP of mesh with index-j, $s_c(i)$ is a candidate connected-sequence of meshes between Mesh(i) and Mesh(i+1), x(i)=[x(i), y(i)] is the latitude/longitude location of Mesh(i), and CS (x(i+1), x(i)) is the set of all feasible connected meshes between Mesh(i) and Mesh(i+1). Note that while the above formulation provides the sequence of meshes that provides the closest sum of pace values to the time budget $\Delta t_i$, computational complexity required to find the solution is very large.

In an alternative embodiment, the time constraint is removed, and processing logic determines the mesh sequence that provides the lowest sum of MMPs by $$s(i) = \underset{s_c(i)}{\operatorname{argmin}} \sum_{j \in s_c(i)} P(j) \quad (3)$$

such that $$s_c(i) \in CS(x(i+1), x(i)).$$

Note that compared to (2), computational complexity of finding the solution in (3) is significantly lower, and it can be easily solved using shortest-path algorithms such as Dijkstra's algorithm, A* algorithm (which is a lower-complexity version of Dijkstra's algorithm), Dempster-Shafer method, which are all well-known to those skilled in the art.

FIG. 43 illustrates an example for the estimation of a mobile user's trajectory for a high-speed user. Referring to FIG. 43, six by seven array of meshes are considered, where the source mesh, Mesh(i), is located at bottom left 4335, and the destination mesh, Mesh(i+1), is located at top-right 4340. The MMP (pace) values for each of the meshes are indicated within each mesh, ranging from 2 (fastest mesh) to 100 (slowest mesh). The UE's true trajectory 4345 is indicated with a dashed line, which goes along a fast road type 4330. Upon running one of the shortest-path algorithms discussed above, such as, for example, the Dijkstra's algorithm, a mesh sequence estimate as marked in bold borders is obtained.

Figure 44:
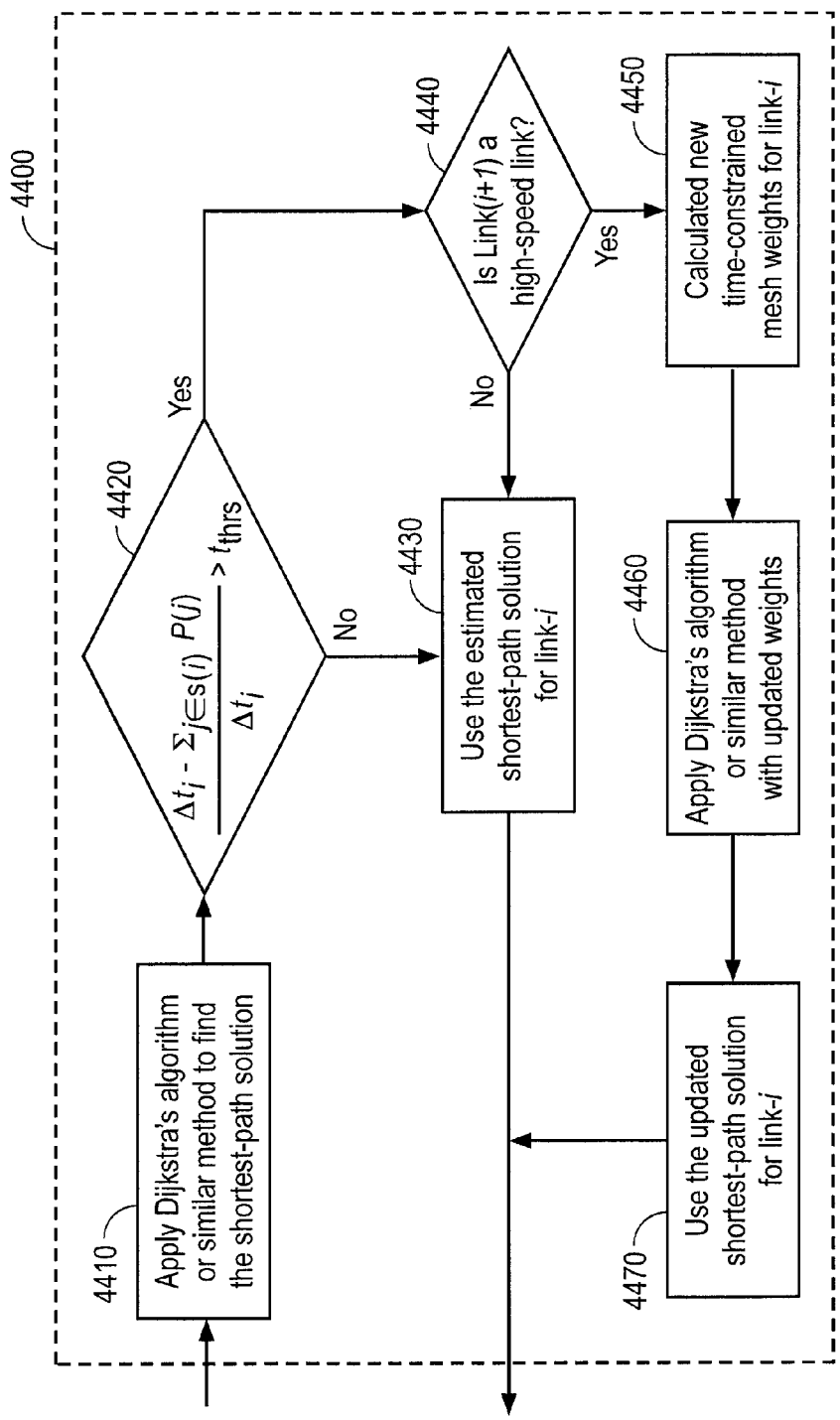
FIG. 44 illustrates an extension of the Dijkstra's algorithm with modified mesh weights if the initial shortest-path solution does not provide satisfactory result according to one embodiment.

While the solution of (2) is computationally expensive, the time constraint can be imposed on the solution by modifying the a two-step Dijkstra's algorithm with modified mesh weights. FIG. 44 is a flow diagram of one embodiment of an extension of Dijkstra's algorithm with modified mesh weights if the initial shortest-path solution does not provide satisfactory result. The process is performed by processing logic that may comprise hardware (circuitry, dedicated logic, etc.), software (such as is run on a general purpose computer system or a dedicated machine), or a combination of both.

Referring to FIG. 44, the process begins by processing logic computing the shortest-path solution using the Dijkstra's algorithm or similar method to solve for (3) (processing block 4410). Then, processing logic applies a threshold test on the obtained shortest-path solution as follows (processing block 4420)

$$\frac{\Delta t_i - \sum_{j \in s(i)} P(j)}{\Delta t_i} > t_{thrs}, \quad (4)$$

where $t_{thrs}$ is a threshold parameter (e.g., 50% off). If the above difference between the total sum of the pace values and $\Delta t_i$ is smaller than a threshold parameter (e.g., a certain percent of $\Delta t_i$, such as 10%), then, processing logic uses the shortest-path solution estimated during processing block 4410 (processing block 4430). Otherwise, processing logic determines that the shortest-path solution is not accurate enough (i.e., it provides an excessively fast trajectory estimate that does not match well with the time constraint). As an optional test, processing logic may also check whether Link (i+1) is a fast-speed link (processing block 4440); this may ensure that the user has not stopped, or switched to a low-speed pace during Link(i). Then, processing logic performs a weight refinement step (processing block 4450), and obtains the new pace values for the purpose of mesh-sequence estimation process of link-i as follows $$\tilde{P}_i(j) = \left| \frac{\Delta t_i}{N_m(i)} - P(j) \right| + e_i, \quad (5)$$

where $N_m(i) = |s(i)|$ is the total number of meshes in the minimum-cost solution in (3), and $e_i$ is a non-negative bias value to avoid very small pace values for the meshes (e.g., one minute). Therefore, revised pace values will favor the meshes that have average pace similar to the average pace of the optimum solution (assuming that the number of meshes in both solutions are similar). Then, processing logic applies a minimum-cost solution with the new pace values as follows $$s(i) = \underset{s_c(i)}{\operatorname{argmin}} \sum_{j \in s_c(i)} \tilde{P}_i(j) \quad (6)$$

such that $$s_c(i) \in CS(x(i+1), x(i)),$$

which can be easily solved using Dijkstra's algorithm (processing block 4460), and these revised mesh sequence estimate can be used as the shortest-path solution.

Figure 45:
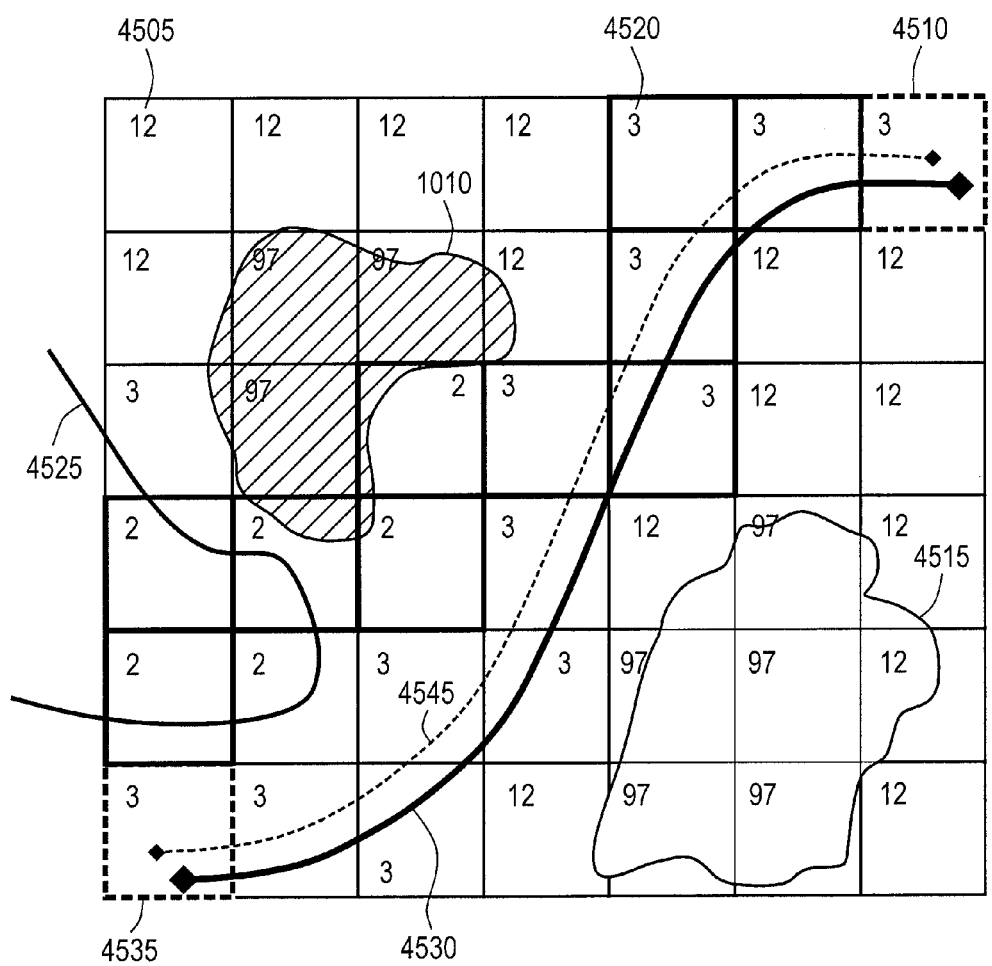
FIG. 45 illustrates an example of an extension of the Dijkstra's algorithm with modified mesh weights according to one embodiment.

FIG. 45 illustrates an example for the extension of Dijkstra's algorithm with modified mesh weights. An example for the revised mesh weights for FIG. 43 and corresponding estimated trajectory are illustrated in FIG. 45, where $e_i=1$ minute is used, and $\Delta t_i=36$ minutes. The shortest path solution in FIG. 43 was composed of 12 meshes, with a total pace value of 12*2=24 minutes. Comparing 24 minutes with $\Delta t_i$ using (4), the algorithm judges that the error is not negligible. Then, new mesh weights as shown in FIG. 45 are calculated using the equation in (5). Using the proposed approach, the algorithm intentionally chooses a slower trajectory as specified by the meshes with bold borders.

Figure 46:
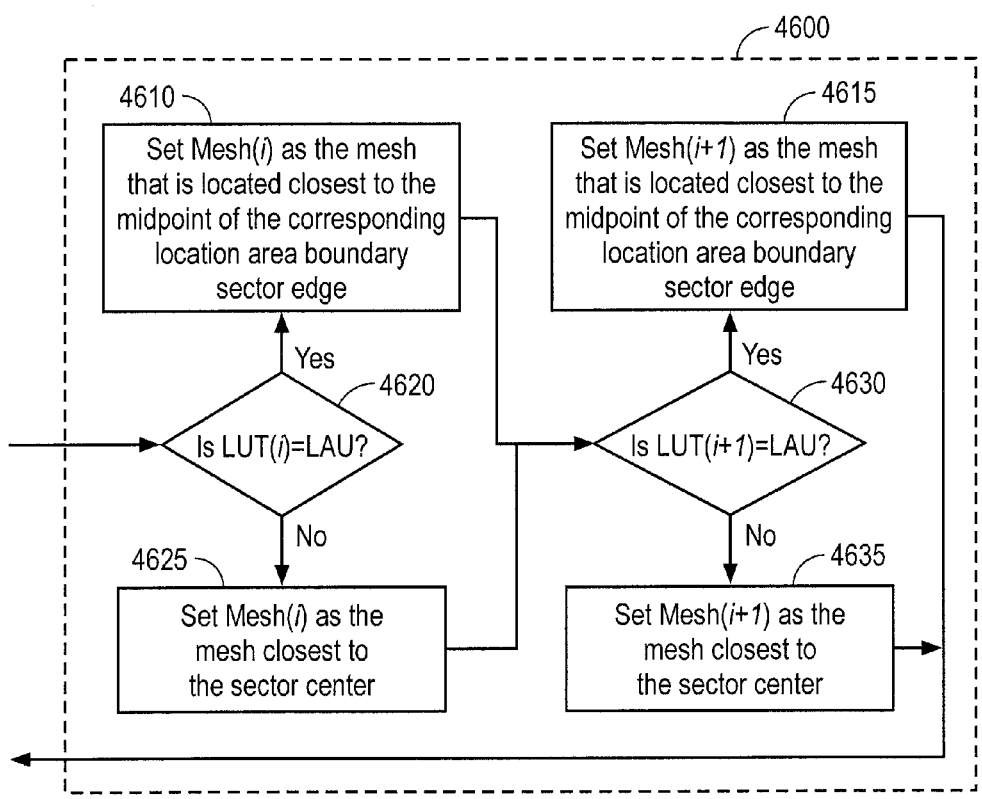
FIG. 46 illustrates mapping a mobile user's location onto a mesh within a given sector for low-velocity users according to one embodiment.

Getting back to the threshold comparison of the link velocity 4110 in FIG. 41, if the link velocity is lower than a threshold (e.g., 20 km/hour), processing logic goes through separate mapping 4600 and mesh sequence estimation 4100 stages. FIG. 46 is a flow diagram of one embodiment of a process for mapping a mobile user's location onto a mesh within a given sector for low-velocity users. The process is performed by processing logic that may comprise hardware (circuitry, dedicated logic, etc.), software (such as is run on a general purpose computer system or a dedicated machine), or a combination of both.

Referring to FIG. 46, similar to the mapping process in FIG. 42 for high-velocity users, if the LUT(i) and LUT(i+1) are LAUs (processing blocks 4620 and 4630), then, processing logic uses the midpoint of the corresponding sector edge as the location estimate (processing blocks 4610 and 4615). Otherwise, processing logic sets Mesh(i) and Mesh(i+1) as the meshes that are closest to the sector center (processing blocks 4625 and 4635). In an alternative embodiment, processing logic uses the sector's center of mass (COM) rather than the (Voronoi) sector center while determining the best mesh estimate. This ensures that the location estimates are not biased towards the sector edges (which may be the case for certain Voronoi sectors), but are more uniformly spaced over the geographical area. The COM of a sector may be obtained from the corner points of a Voronoi sector, by finding the arithmetic average of the geographical coordinates of all the corner points.

Figure 47:
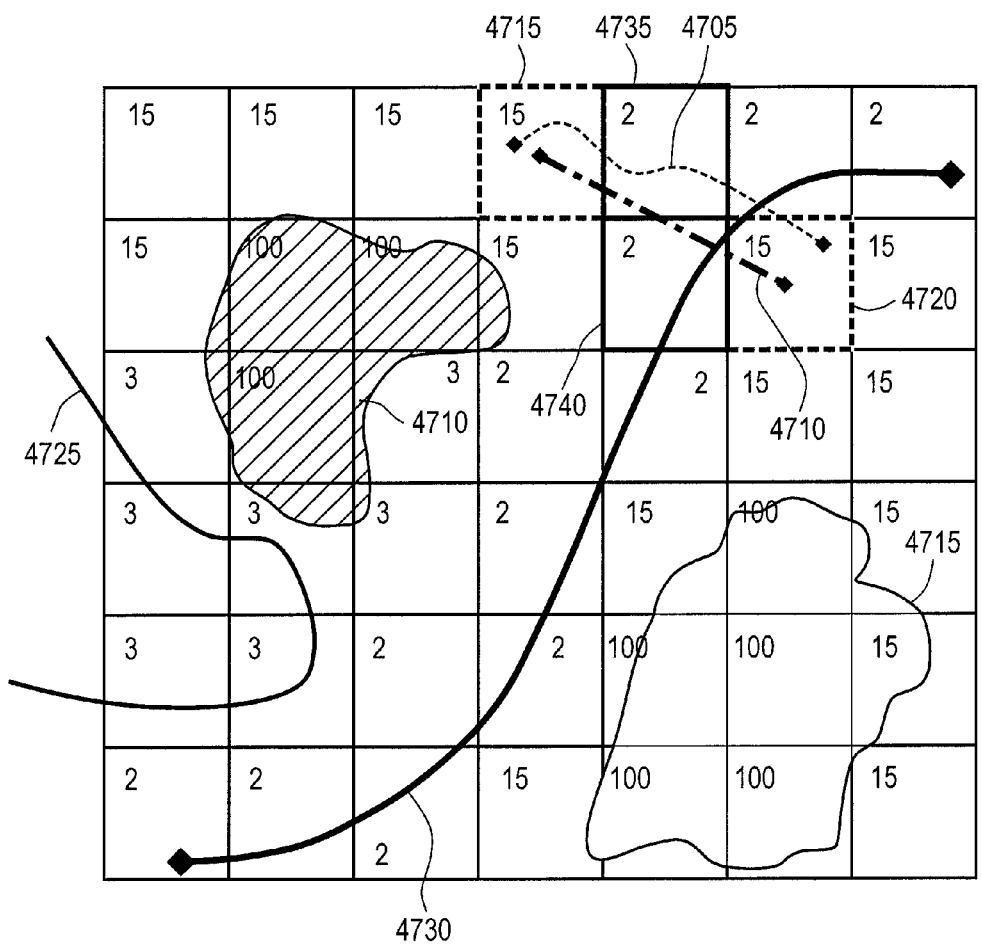
FIG. 47 illustrates an example for the estimation of a mobile user's trajectory for a low-speed user according to one embodiment.

Once the source mesh, Mesh(i), and the destination mesh, Mesh(i+1), are found using processing block 4600 for low-velocity users, processing logic uses linear interpolation to find the sequence of meshes between the source mesh and the destination mesh processing block 4180 of FIG. 41. FIG. 47 illustrates an example for mesh sequence estimation of a mobile user's trajectory for a low-speed user where linear interpolation is used according to one embodiment. Referring to FIG. 47, the start mesh is labeled by 4715 and the destination mesh is labeled 4720, while the true trajectory of the UE is indicated by dashed lines 4705. The linear interpolation connects the mesh centers of the source and destination meshes as indicated by 4720, and yields the mesh sequence estimate given by the labels 4715, 4735, 4740, 4710.

An Example of a Computer System

Figure 48:
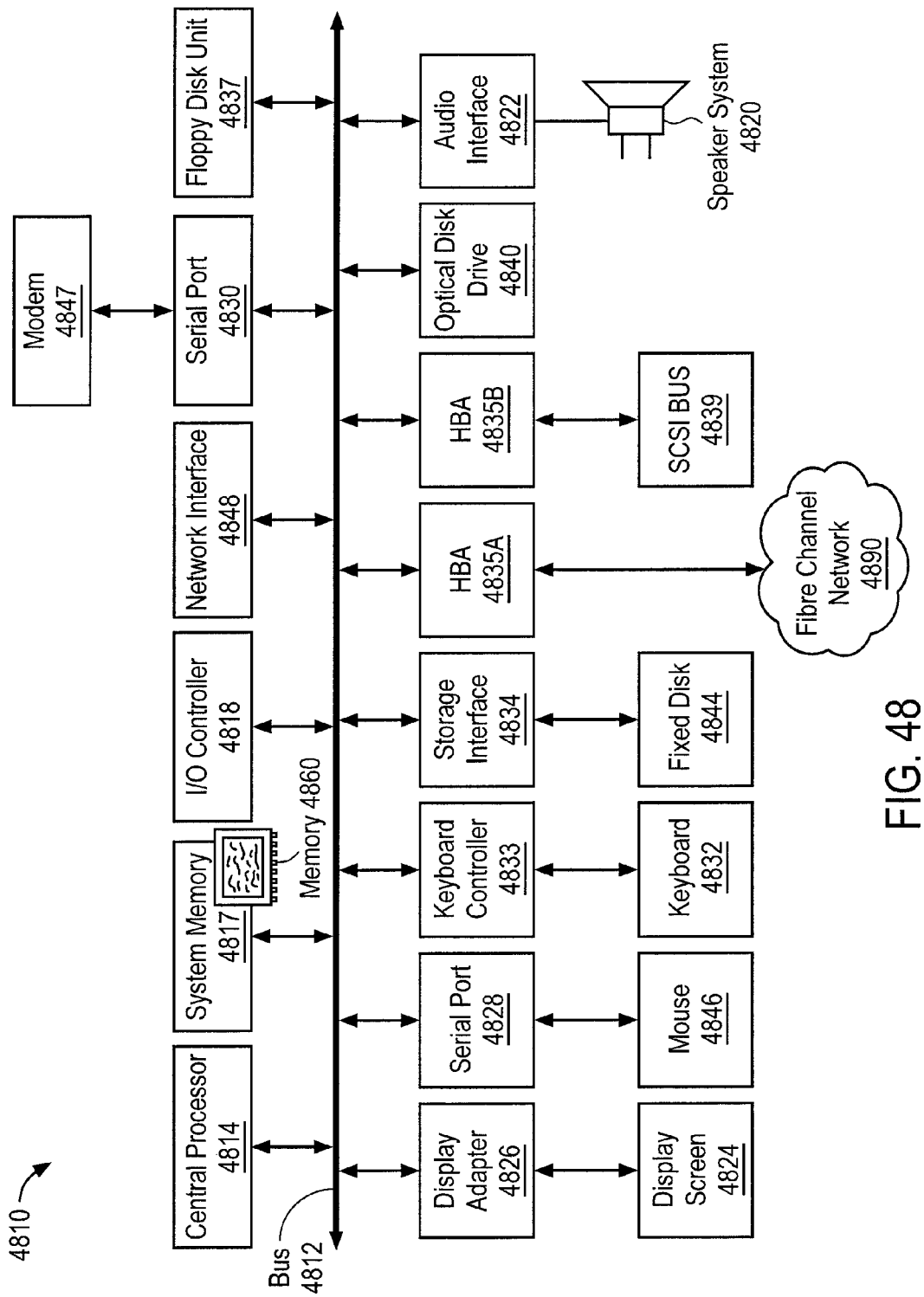
FIG. 48 depicts a block diagram of one embodiment of a computer system.

FIG. 48 depicts a block diagram of a mobile travel behavior server, such as mobile travel behavior server 161 of FIG. 1. Referring to FIG. 48, mobile travel behavior server 4810 includes a bus 4812 to interconnect subsystems of mobile travel behavior server 4810, such as a processor 4814, a system memory 4817 (e.g., RAM, ROM, etc.), an input/output controller 4818, an external device, such as a display screen 4824 via display adapter 4826, serial ports 4828 and 4830, a keyboard 4832 (interfaced with a keyboard controller 4833), a storage interface 4834, a floppy disk drive 4837 operative to receive a floppy disk 4838, a host bus adapter (HBA) interface card 4835A operative to connect with a Fibre Channel network 4890, a host bus adapter (HBA) interface card 4835B operative to connect to a SCSI bus 4839, and an optical disk drive 4840. Also included are a mouse 4846 (or other point-and-click device, coupled to bus 4812 via serial port 4828), a modem 4847 (coupled to bus 4812 via serial port 4830), and a network interface 4848 (coupled directly to bus 4812).

Bus 4812 allows data communication between central processor 4814 and system memory 4817. System memory 4817 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with mobile travel behavior server 4810 are generally stored on and accessed via a computer readable medium, such as a hard disk drive (e.g., fixed disk 4844), an optical drive (e.g., optical drive 4840), a floppy disk unit 4837, or other storage medium.

Storage interface 4834, as with the other storage interfaces of mobile travel behavior server 4810, can connect to a standard computer readable medium for storage and/or retrieval of information, such as a fixed disk drive 4844. Fixed disk drive 4844 may be a part of computer system 4810 or may be separate and accessed through other interface systems. Modem 4847 may provide a direct connection to a remote server via a telephone link or to the Internet via an internet service provider (ISP). Network interface 4848 may provide a direct connection to a remote server via a direct network link to the Internet via a POP (point of presence). Network interface 4848 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 48 need not be present to practice the techniques described herein. The devices and subsystems can be interconnected in different ways from that shown in FIG. 48. The operation of a computer system such as that shown in FIG. 48 is readily known in the art and is not discussed in detail in this application.

Code to implement the techniques described herein can be stored in computer-readable storage media such as one or more of system memory 4817, fixed disk 4844, optical disk 4842, or floppy disk 4838. The operating system provided on computer system 4810 may be MS-DOS®, MS-WINDOWS®, OS/2®, UNIX®, Linux®, or another known operating system. In one embodiment, system memory 4817 stores event data, pre-processed data, filtered data, interpolation data and population count data.

Figure 49:
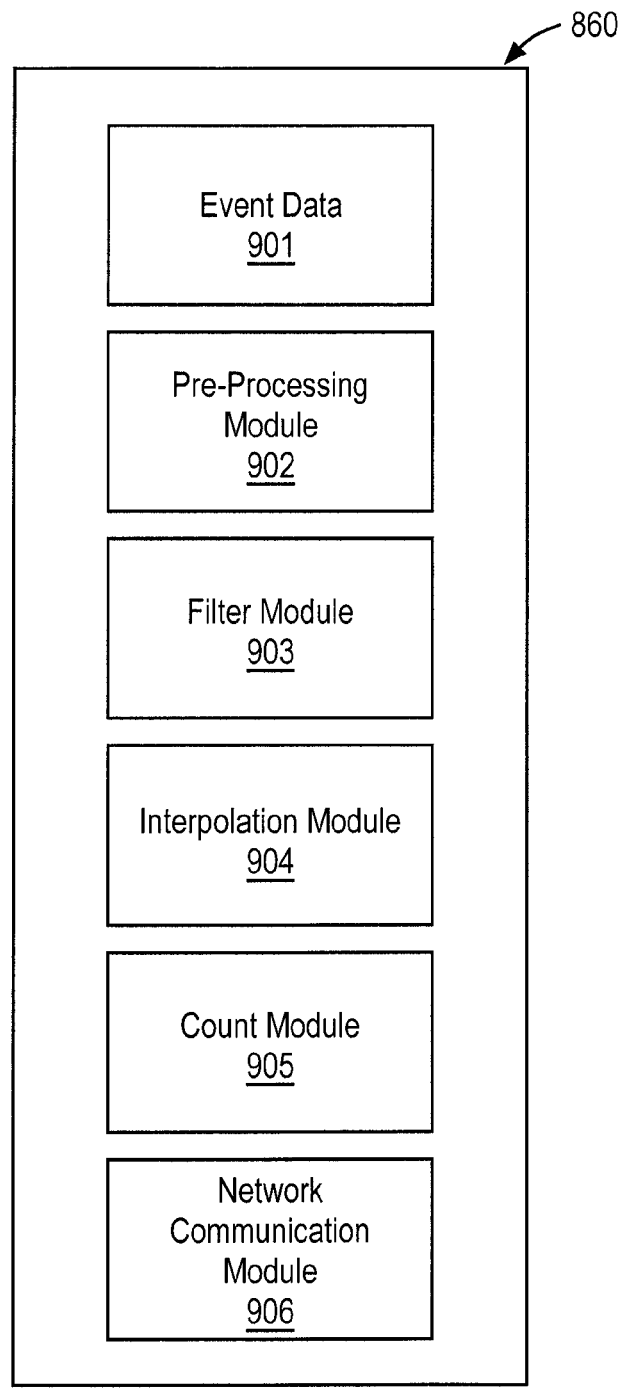
FIG. 49 illustrates a set of programs and data that is stored in memory of one embodiment of a computer system.

FIG. 49 illustrates a set of code (e.g., programs) and data that is stored in memory of one embodiment of a mobile travel behavior server, such as the mobile travel behavior server 161 set forth in FIG. 1. In one embodiment, the mobile travel behavior server uses the code, in conjunction with a processor, to implement the necessary operations to implement the processing for estimating travel behavior in a mobile network.

Referring to FIG. 49, the memory 4860 stores event data 4901 indicative of user equipment location. A pre-processing module 4902 which when executed by a processor is responsible for pre-processing received event data to produce pre-processed data. A filter module 4903 which when executed by a processor is responsible for filtering the pre-processed data to select a portion of user equipment location information in the pre-processed data. An interpolation module 4904 which when executed by a processor is responsible for performing straight line interpolation on pre-processed data of one or more individuals in the population to estimate intermediate positions of each of the one or more individual. A count module 4905 which when executed by a processor is responsible for counting population movement. The memory also includes a network communication module 4906 used for performing network communication and communication with the other devices (e.g., servers, clients, etc.).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   receiving mobile phone operational data indicative of user equipment location, the mobile phone operational data comprising location area update messages and periodic registration messages;
   filtering the mobile phone operational data based on time and area to select a portion of user equipment location information to produce filtered mobile phone operation data;
   performing travel estimation based on the filtered mobile phone operation data, including performing interpolation on data associated with one or more individuals in a population to estimate intermediate positions of a trajectory of each of the one or more individuals for a specified time period using a shortest path estimation algorithm that determines a shortest path between pairs of points based on geographic information associated with the user terminals, weights associated with geographic areas, and probabilities associated with likelihoods of a user terminal moving between geographic areas; and
   counting a number of individuals in population at a given time and at a given area.

2. The method defined in claim 1 wherein performing interpolation comprises applying a shortest path mesh sequence estimation algorithm.

3. The method defined in claim 1 wherein performing interpolation comprises:
   (a) defining boundary meshes containing first and second meshes;
   (b) assigning a probability of movement to each mesh that is adjacent to the first and second meshes; and
   (c) finding a most probable sequence of meshes connecting the first and second meshes using the shortest path algorithm.

4. The method defined in claim 3 wherein assigning a probability of movement is based on geographic information.

5. The method defined in claim 3 further comprising:
   repeating (a)-(c) for a plurality of links;
   storing an estimated trajectory of each of the plurality of links; and
   connecting all the plurality of link to create the trajectory.

6. The method defined in claim 3 wherein (a)-(c) are performed for the first and second meshes if a calculated velocity of an associated user terminal is greater than a threshold.

7. The method defined in claim 6 further comprising estimating a trajectory between the first and second meshes using a straight line algorithm if the calculated velocity is less than the threshold.

8. The method defined in claim 1 further comprising pre-processing received mobile phone operational data to produce pre-processed data by
   converting service area identity (SAI) data to latitude and longitude values; and
   estimating a location of an individual's user equipment based on the latitude and longitude values.

9. The method defined in claim 8 wherein the latitude and longitude values correspond to one selected from a group consisting of: sector center, sector edge, mesh center, and multiple points within a sector.

10. The method defined in claim 1 wherein counting a number of individuals in population at a given time and at a given area is performed per one or both of sector and mesh.

11. The method defined in claim 1 wherein the mobile phone operational data comprises user identification (UID) information and time stamp information.

12. An apparatus comprising:
    a memory to store instructions;
    a processor coupled to the memory to execute instructions from the memory, wherein in response to executing the instructions, the processor receives mobile phone operational data indicative of user equipment location, where the mobile phone operational data includes location area update messages and periodic registration messages, and
    further wherein the processor:
      filters the mobile phone operational data based on time and area to select a portion of user equipment location information to produce filtered mobile phone operation data;
      performs travel estimation based on the filtered mobile phone operation data, including performing interpolation on data associated with one or more individuals in a population to estimate intermediate positions of a trajectory of each of the one or more individuals for a specified time period using a shortest path estimation algorithm that determines a shortest path between pairs of points based on geographic information associated with the user terminals, weights associated with geographic areas, and probabilities associated with likelihoods of a user terminal moving between geographic areas; and
      counts a number of individuals in population at a given time and at a given area.

13. The apparatus defined in claim 12 wherein the processor performs interpolation by applying a shortest path mesh sequence estimation algorithm.

14. The apparatus defined in claim 12 wherein the processor performs interpolation by:
    (a) defining boundary meshes containing first and second meshes;
    (b) assigning a probability of movement to each mesh that is adjacent to the first and second meshes; and
    (c) finding a most probable sequence of meshes connecting the first and second meshes using the shortest path algorithm.

15. The apparatus defined in claim 14 wherein assigning a probability of movement is based on geographic information.

16. The apparatus defined in claim 14 wherein the processor:
    repeats (a)-(c) for a plurality of links;
    stores an estimated trajectory of each of the plurality of links; and
    connects all the plurality of link to create the trajectory.

17. The apparatus defined in claim 14 wherein the processor performs (a)-(c) for the first and second meshes if a calculated velocity of an associated user terminal is greater than a threshold.

18. The apparatus defined in claim 17 wherein the processor estimates a trajectory between the first and second meshes using a straight line algorithm if the calculated velocity is less than the threshold.

19. An article of manufacture having one or more non-transitory computer readable storage media storing executable instructions thereon which when executed cause a system to perform a method for estimating travel behavior in a mobile network, the method comprising:

receiving mobile phone operational data indicative of user equipment location, the mobile phone operational data comprising location area update messages and periodic registration messages;

filtering the mobile phone operational data based on time and area to select a portion of user equipment location information to produce filtered mobile phone operation data;

performing travel estimation based on the filtered mobile phone operation data, including performing interpolation on data associated with one or more individuals in a population to estimate intermediate positions of a trajectory of each of the one or more individuals for a specified time period using a shortest path estimation algorithm that determines a shortest path between pairs of points based on geographic information associated with the user terminals, weights associated with geographic areas, and probabilities associated with likelihoods of a user terminal moving between geographic areas; and counting a number of individuals in population at a given time and at a given area.

20. The article of manufacture defined in claim 19 wherein performing interpolation comprises:
(a) defining boundary meshes containing first and second meshes;
(b) assigning a probability of movement to each mesh that is adjacent to the first and second meshes; and
(c) finding a most probably sequence of meshes connecting the first and second meshes using the shortest path algorithm.

\* \* \* \* \*